United States Patent
Post et al.

(10) Patent No.: US 12,078,047 B2
(45) Date of Patent: Sep. 3, 2024

(54) FLUID INJECTION SYSTEMS, APPARATUS, AND METHODS INCLUDING FLEXIBLE HOSES FOR WELLHEAD SITES

(71) Applicant: FORUM US, INC., Houston, TX (US)

(72) Inventors: Steven Post, Weatherford, TX (US); Peter Middleton, Aledo, TX (US); Harry Hughes, Beeville, TX (US)

(73) Assignee: FORUM US, INC., Houston, TX (US)

(*) Notice: Subject to any disclaimer, the term of this patent is extended or adjusted under 35 U.S.C. 154(b) by 0 days.

(21) Appl. No.: 18/416,596

(22) Filed: Jan. 18, 2024

(65) Prior Publication Data
US 2024/0200434 A1  Jun. 20, 2024

Related U.S. Application Data

(63) Continuation of application No. 17/246,279, filed on Apr. 30, 2021, now Pat. No. 11,879,318.
(Continued)

(51) Int. Cl.
*E21B 43/26* (2006.01)
*B67D 7/00* (2010.01)
(Continued)

(52) U.S. Cl.
CPC .......... *E21B 43/2607* (2020.05); *B67D 7/002* (2013.01); *B67D 7/58* (2013.01);
(Continued)

(58) Field of Classification Search
CPC ..... E21B 43/2607; E21B 43/26; B67D 7/002; B67D 7/58; F04D 13/04; F16L 27/0861
See application file for complete search history.

(56) References Cited

U.S. PATENT DOCUMENTS

| 4,570,673 A | 2/1986 | Kendrick et al. |
| 10,662,749 B1 | 5/2020 | Hill et al. |

(Continued)

FOREIGN PATENT DOCUMENTS

WO  2019200083 A1  10/2019

OTHER PUBLICATIONS

"Moffat Subsea Stab Connector", Forum Energy Technologies, pp. 1-9, https://forumenergydev.wpengine.com/wp-content/uploads/2019/11/moffat-hot-stab-datasheet.pdf (last accessed Apr. 29, 2021).
(Continued)

*Primary Examiner* — James G Sayre
(74) *Attorney, Agent, or Firm* — Patterson + Sheridan, LLP

(57) ABSTRACT

Aspects of the disclosure relate to fluid injection systems, apparatus, methods, and associated components thereof that include flexible hoses for wellhead sites. In one implementation, a fluid injection system for wellhead sites includes a pump, a pump manifold, and a flexible hose coupled between the pump and the pump manifold. The flexible hose includes a first end coupled to the pump and a second end coupled to the pump manifold. The first end of the flexible hose includes a first end fitting coupled to the pump, and the first end fitting is oriented at an angle relative to a horizontal plane. The second end of the flexible hose includes a second end fitting coupled to the pump manifold, and the second end fitting is oriented vertically and perpendicularly to the horizontal plane.

19 Claims, 41 Drawing Sheets

Related U.S. Application Data

(60) Provisional application No. 63/053,230, filed on Jul. 17, 2020.

(51) Int. Cl.
*B67D 7/58* (2010.01)
*F04D 13/04* (2006.01)
*F16L 27/08* (2006.01)

(52) U.S. Cl.
CPC .............. *E21B 43/26* (2013.01); *F04D 13/04* (2013.01); *F16L 27/0861* (2013.01)

(56) References Cited

U.S. PATENT DOCUMENTS

| | | |
|---|---|---|
| 2013/0175039 A1 | 7/2013 | Guidry |
| 2014/0261695 A1 | 9/2014 | Dehring et al. |
| 2017/0122060 A1 | 5/2017 | Dille et al. |
| 2017/0275980 A1 | 9/2017 | Kajaria |
| 2019/0071946 A1 | 3/2019 | Painter et al. |
| 2019/0302810 A1* | 10/2019 | Kibler .................... B25J 13/006 |
| 2020/0103078 A1* | 4/2020 | Scott .................... E21B 43/2607 |
| 2020/0182385 A1 | 6/2020 | Westgarth et al. |
| 2020/0277845 A1 | 9/2020 | Kajaria |
| 2021/0131247 A1 | 5/2021 | Ungchusri et al. |
| 2021/0198953 A1 | 7/2021 | Robinson et al. |
| 2022/0145733 A1 | 5/2022 | Massey et al. |

OTHER PUBLICATIONS

Safety Mits, "Zero G Tool Handling System and Trolley", YouTube, Feb. 3, 2016, https://www.youtube.com/watch?V=ZpA428tL38s (last accessed Apr. 29, 2021).

Invitation to Pay Additional Fees dated Oct. 1, 2021 for Application No. PCT/US2021/038510.

International Search Report and Written Opinion dated Oct. 8, 2021 for Application No. PCT/US2021/038526.

PCT International Search Report and Written Opinion dated Dec. 1, 2021, for International Application No. PCT/ US2021/038510.

Canadian Office Action dated Apr. 29, 2024 for Application No. 3,183,377.

* cited by examiner

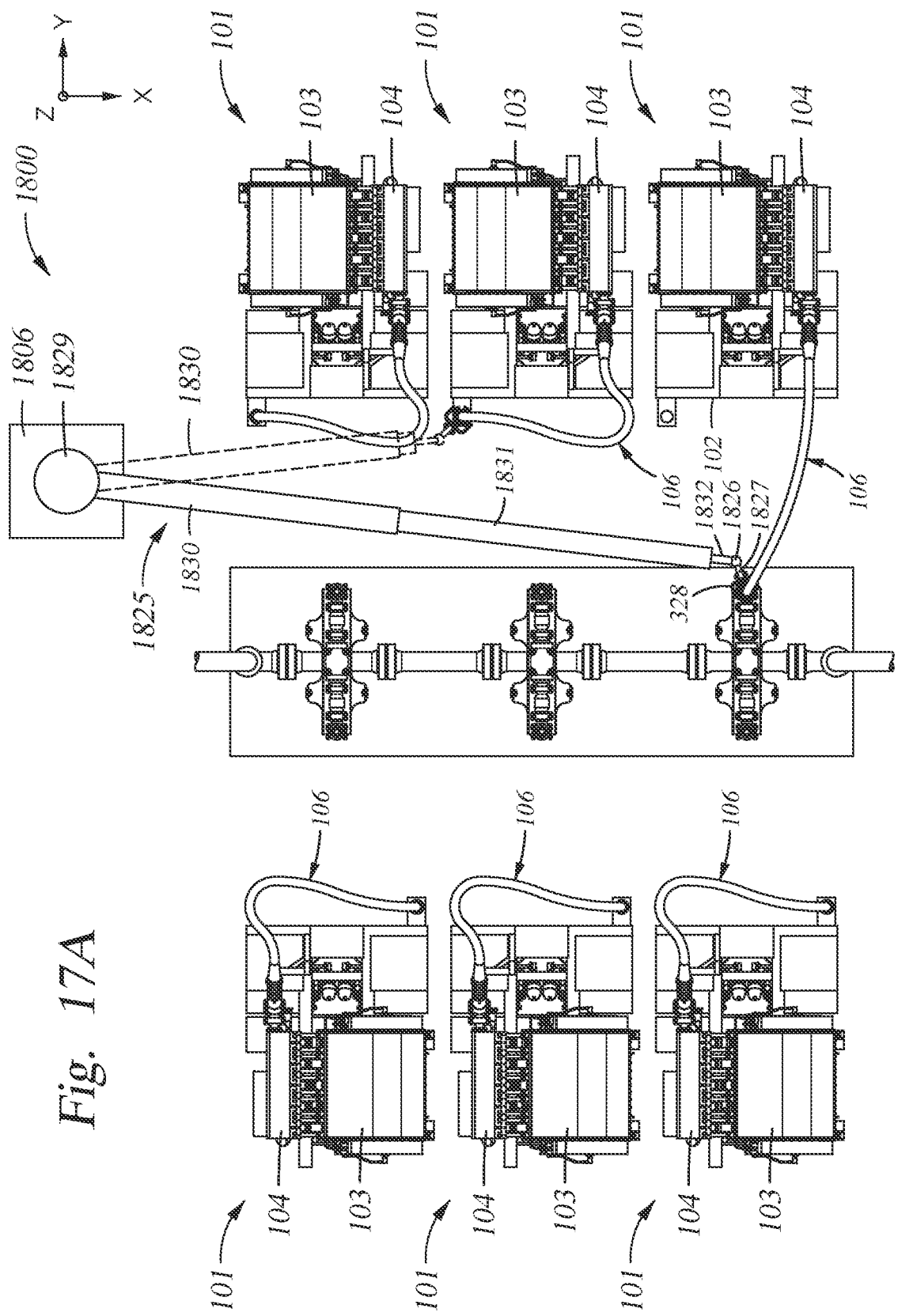

FLUID INJECTION SYSTEMS, APPARATUS, AND METHODS INCLUDING FLEXIBLE HOSES FOR WELLHEAD SITES

CROSS-REFERENCE TO RELATED APPLICATIONS

This application is a continuation of U.S. patent application Ser. No. 17/246,279, filed Apr. 30, 2021, which claims benefit of U.S. provisional patent application Ser. No. 63/053,230, filed Jul. 17, 2020, each of which is herein incorporated by reference in its entirety.

BACKGROUND

Field

Aspects of the disclosure relate to fluid injection systems, apparatus, methods, and associated components thereof that include flexible hoses for wellhead sites.

Description of the Related Art

Flexible hoses can involve operational limitations, such as limitations involved with the weight and fixed length of flexible hoses. Additionally, connecting and disconnecting flexible hoses to and from pump manifolds and pumps can delay operations and involve operational complexities. These issues can lead to reduced efficiency, difficulty of use and installation, increased costs, increased operational times, increased mobilization of resources, and complexity in design and operations.

Therefore, there is a need for fluid injection systems and methods that can quickly and effectively connect and disconnect flexible hoses to and from pump manifolds and pumps.

SUMMARY

Aspects of the disclosure relate to fluid injection systems, apparatus, methods, and associated components thereof that include flexible hoses for wellhead sites.

In one implementation, a fluid injection system for wellhead sites includes a pump, a pump manifold, and a flexible hose coupled between the pump and the pump manifold. The flexible hose includes a first end coupled to the pump and a second end coupled to the pump manifold. The first end of the flexible hose includes a first end fitting coupled to the pump, and the first end fitting is oriented at an angle relative to a horizontal plane. The second end of the flexible hose includes a second end fitting coupled to the pump manifold, and the second end fitting is oriented vertically and perpendicularly to the horizontal plane.

In one implementation, a fluid injection system for wellhead sites includes a pump and a pump manifold. The pump manifold includes a manifold block coupled to one or more manifold conduits, and a flexible hose coupled between the pump and the pump manifold. The flexible hose includes a first end coupled to the pump and a second end coupled to the manifold block. The first end of the flexible hose includes a first end fitting coupled to the pump, and the second end of the flexible hose includes a second end fitting coupled to the manifold block. The second end fitting is oriented at an angle relative to a horizontal plane extending through the manifold block.

In one implementation, a fluid injection system for wellhead sites includes a pump manifold, and a flexible hose including a first end to couple to a pump and a second end coupled to the pump manifold. The first end of the flexible hose includes a first end fitting. The second end of the flexible hose includes a second end fitting. The fluid injection system includes a disconnection device to couple the first end of the flexible hose to the pump.

In one implementation, a fluid injection system for wellhead sites includes one or more first pump manifolds each including a plurality of manifold blocks and a plurality of manifold conduits. The fluid injection system includes one or more second pump manifolds each including a second plurality of manifold blocks and a second plurality of manifold conduits. The fluid injection system includes one or more flexible hoses coupled between the one or more first pump manifolds and the one or more second pump manifolds. Each of the one or more flexible hoses includes a first end coupled to one of the one or more first pump manifolds and a second end coupled to one of the one or more second pump manifolds. The first end of the flexible hose includes a first end fitting coupled to an end of the respective one of the one or more first pump manifolds. The second end of the flexible hose includes a second end fitting coupled to an end of the respective one of the one or more second pump manifolds.

In one implementation, a fluid injection system for wellhead sites includes a pump, a pump manifold, and a flexible hose coupled between the pump and the pump manifold. The flexible hose includes a first end coupled to the pump and a second end coupled to the pump manifold. The first end of the flexible hose includes a first end fitting coupled to the pump, and the first end fitting is oriented horizontally in a horizontal plane. The second end of the flexible hose includes a second end fitting coupled to the pump manifold, and the second end fitting is oriented vertically and perpendicularly to the horizontal plane.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 17A is a schematic partial top view of a fluid injection system deployed at a wellhead site, according to one implementation.

Figure 1A:
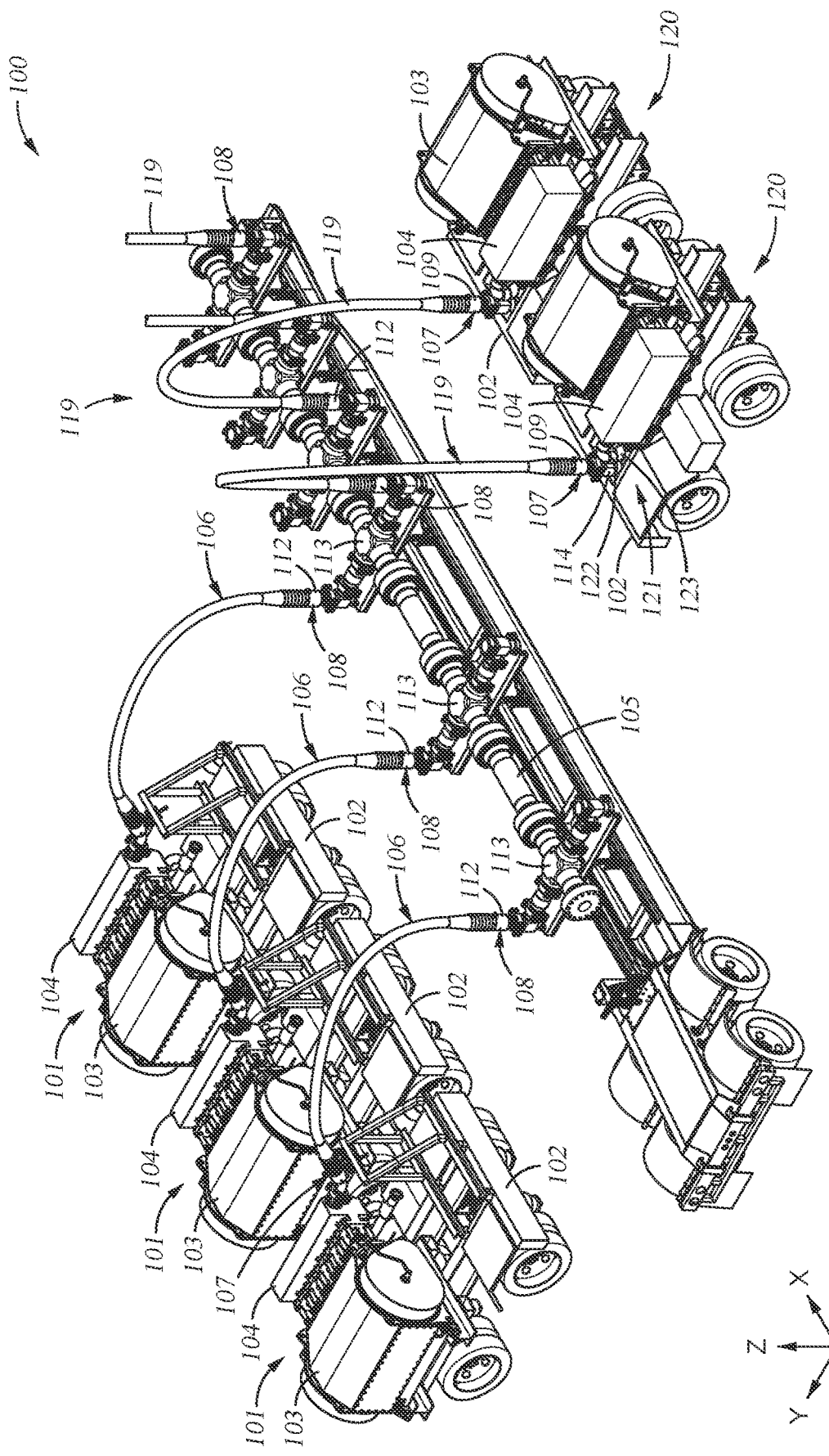
FIG. 1A is a schematic partial view of a fluid injection system deployed at a wellhead site, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the disclosure relate to fluid injection systems, apparatus, methods, and associated components thereof that include flexible hoses for wellhead sites.

The present disclosure contemplates that use of terms such as "coupled," "couples", and/or "coupling," can include direct coupling and/or indirect coupling, such as coupling through other components. The present disclosure also contemplates that use of terms such as "coupled," "couples", and/or "coupling," can include but are not limited to connecting, welding, interference fitting, brazing, and/or fastening using fasteners, such as pins, rivets, screws, bolts, and/or nuts. The present disclosure also contemplates that use of terms such as "coupled," "couples", and/or "coupling," can include but are not limited to components being integrally formed together as a unitary body.

Figure 1B:
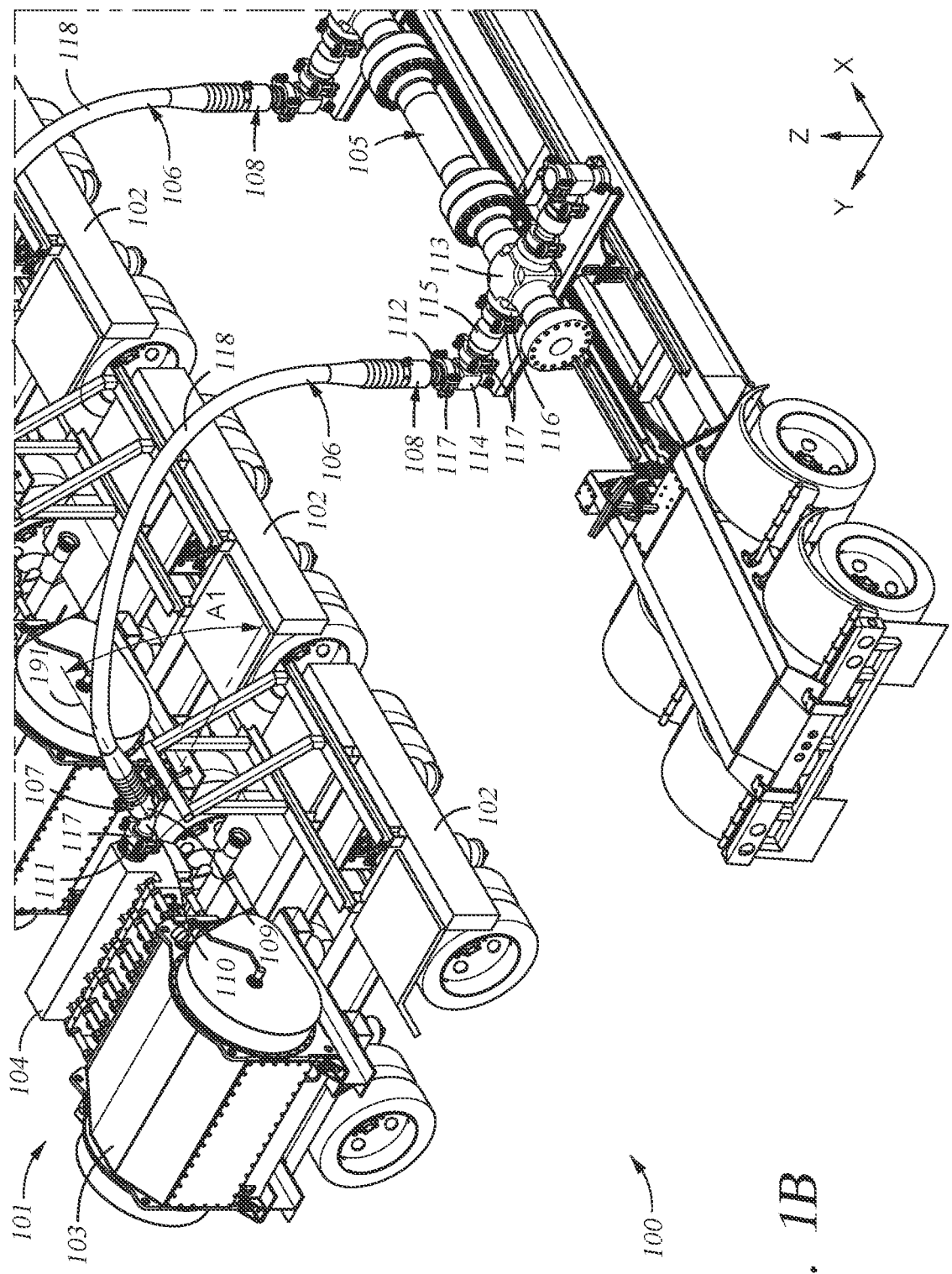
FIG. 1B is an enlarged schematic view of the fluid injection system shown in FIG. 1A.
Figure 1C:
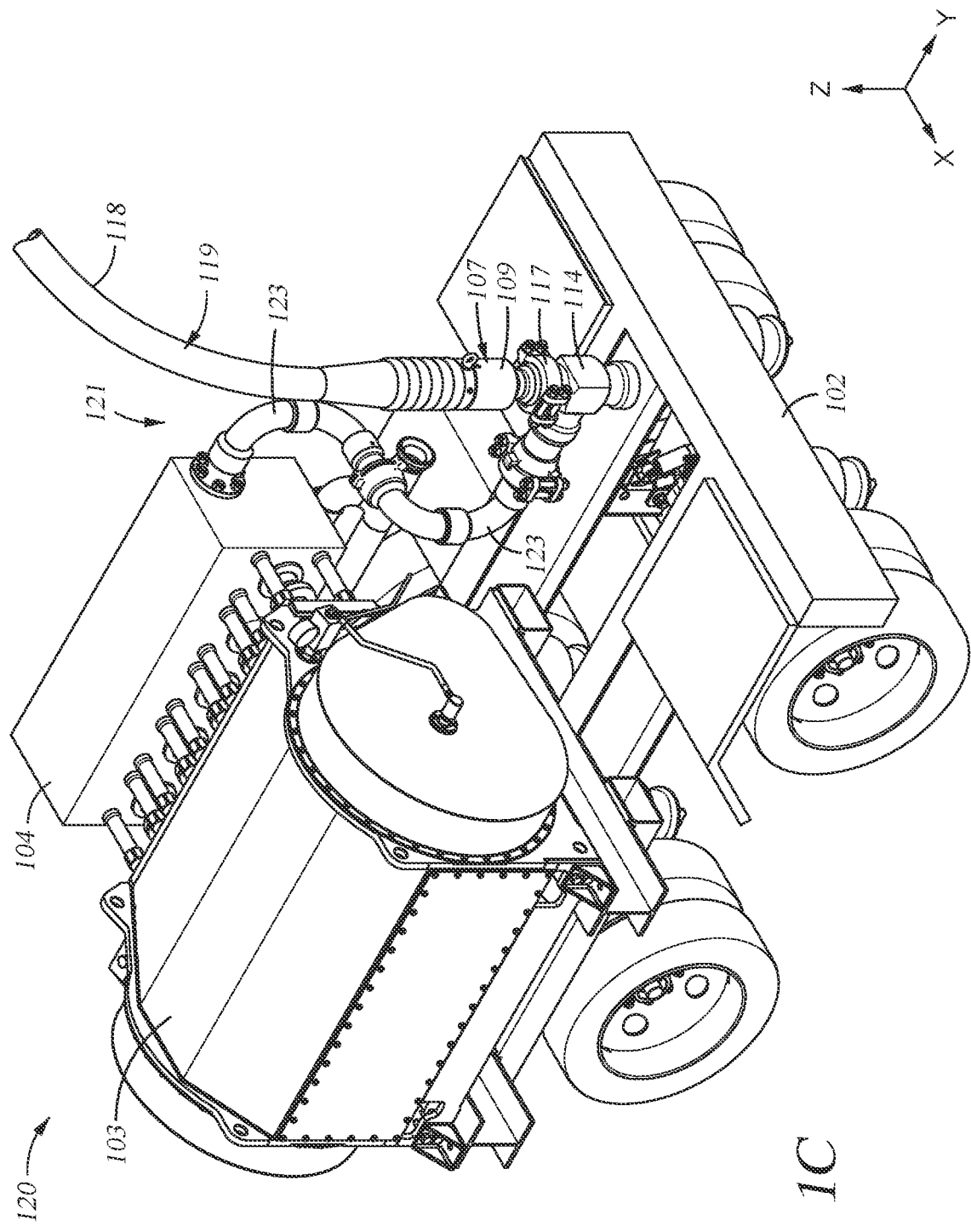
FIG. 1C is an enlarged schematic view of a second pump of the fluid injection system shown in FIG. 1A.

FIG. 1A is a schematic partial view of a fluid injection system 100 deployed at a wellhead site, according to one implementation. FIG. 1B is an enlarged schematic view of the fluid injection system 100 shown in FIG. 1A. FIG. 1C is an enlarged schematic view of a second pump 120 of the fluid injection system 100 shown in FIG. 1A.

The fluid injection system 100 includes a plurality of pumps 101 (such as frac pumps) mounted to a plurality of trailers 102. Each of the pumps 101 includes a power end 103 and a fluid end 104. The fluid injection system 100 also includes a pump manifold 105 disposed between the pumps 101 and fluidly coupled to the pumps 101 to supply fluids, such as frac fluids to wellheads. For each of the pumps 101, the fluid injection system 100 includes a flexible hose 106 coupled between the respective pump 101 and the pump manifold 105. Each flexible hose 106 includes a first end 107 coupled to a respective fluid end 104 and a second end 108 coupled to a manifold block 113 of the pump manifold 105.

The first end 107 of each flexible hose 106 is oriented (e.g., mounted) at an angle A1 relative to a horizontal plane (e.g., the X-Y plane) that extends through the fluid end 104 to which the first end 107 is coupled. The first end 107 includes a first end fitting 109 that is coupled to the fluid end 104. The first end fitting 109 is oriented (e.g., mounted) at the angle A1 relative to the horizontal plane. The angle A1 is within a range of 30 degrees to 60 degrees, such as 40 degrees to 50 degrees. In one embodiment, which can be combined with other embodiments, the angle A1 is 45 degrees.

In one embodiment, which can be combined with other embodiments, the angle A1 is 5 degrees or less such that the first end 107 of the flexible hose 106 is coupled horizontally to the fluid end 104 and the first end fitting 109 of the first end 107 extends horizontally from the fluid end 104 and toward the pump manifold 105. In such an embodiment, the first end fitting 109 and the first end 107 are oriented in a plane that is parallel to a horizontal plane (e.g., the X-Y plane) that extends through the fluid end 104 to which the first end 107 is coupled. In such an embodiment, a horizontal joint may be used in place of the elbow joint 110. A central axis 191 extending through a center of the first end fitting 109 extends horizontally along the horizontal plane (e.g., the X-Y plane) and is parallel to a horizontal axis (e.g., the Y-axis).

The first end fitting 109 is coupled to the fluid end 104 through at least an elbow joint 110 and a flange 111. The second end 108 of the flexible hose 106 includes a second end fitting 112 coupled to a manifold block 113 (such as a cross block). The second end fitting 112 is oriented vertically and perpendicularly to the horizontal plane (e.g., the X-Y plane). The second end fitting 112 is coupled to the manifold block 113 through at least an angled joint 114, a valve 115, and an adapter 116. The fluid injection system 100 includes a plurality of clamp assemblies 117 that coupled components together. The present disclosure contemplates that angled joints may include one or more of L-shaped joints, elbow joints, solid blocks having an angled outer face, and/or angled end fittings. The angled end fittings may be integrally formed with end fittings of flexible hoses. In one example, the angled joint 114 includes a tee/ell connection. The angled joint 114 includes a turn that is within a range of 0 degrees to 90 degrees. In one embodiment, which can be combined with other embodiments, the turn of the angled joint 114 is 45 degrees or 90 degrees. In the implementation shown in FIG. 1A, the angled joint 114 includes a 90 degree turn. A flexible section 118 of the flexible hose 106 includes a single bend between the first end 107 and the second end 108. The single bend of the flexible section 118 is a curved bend that is a U-shaped bend.

The fluid injection system 100 includes a plurality of second flexible hoses 119. A second flexible hose 119 is coupled to a second pump 120. The second flexible hose 119 includes one or more of the aspects, features, components, and/or properties of the flexible hose 106. The first end 107 of the second flexible hose 119 is coupled to a second fluid end 104 of the second pump 120. The first end fitting 109 of the first end 107 of the second flexible hose 119 is oriented vertically and perpendicularly to the horizontal plane (e.g., the X-Y plane). The first end fitting 109 is coupled to a piping assembly 121 mounted to the trailer 102 of the second pump 120. The piping assembly is coupled to the fluid end 104 of the second pump 120. The piping assembly 121 includes one or more of an angled joint 114, one or more pipe conduits 122, and/or elbow joints 123.

The second end fitting 112 of the second end 108 of the second flexible hose 119 is coupled to a manifold block 113 of the pump manifold 105. The second end fitting 112 of the second flexible hose 119 is oriented vertically and perpendicularly to the horizontal plane (e.g., the X-Y plane).

Figure 2A:
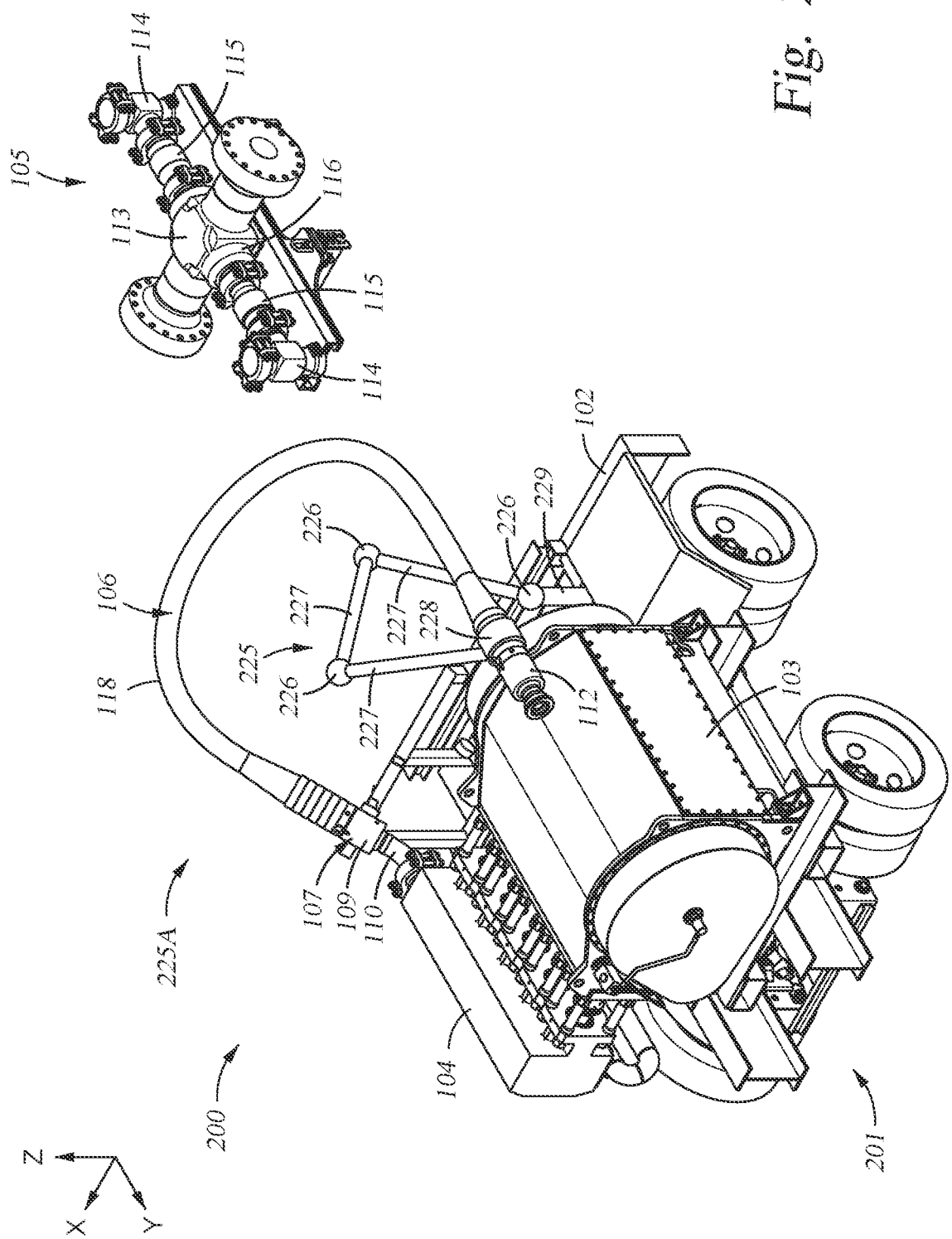
FIG. 2A is a schematic partial isometric back view of a fluid injection system including an articulation arm device in a storage position, according to one implementation.

FIG. 2A is a schematic partial isometric back view of a fluid injection system 200 including an articulation arm device 225 in a storage position 225A, according to one implementation.

Figure 2B:
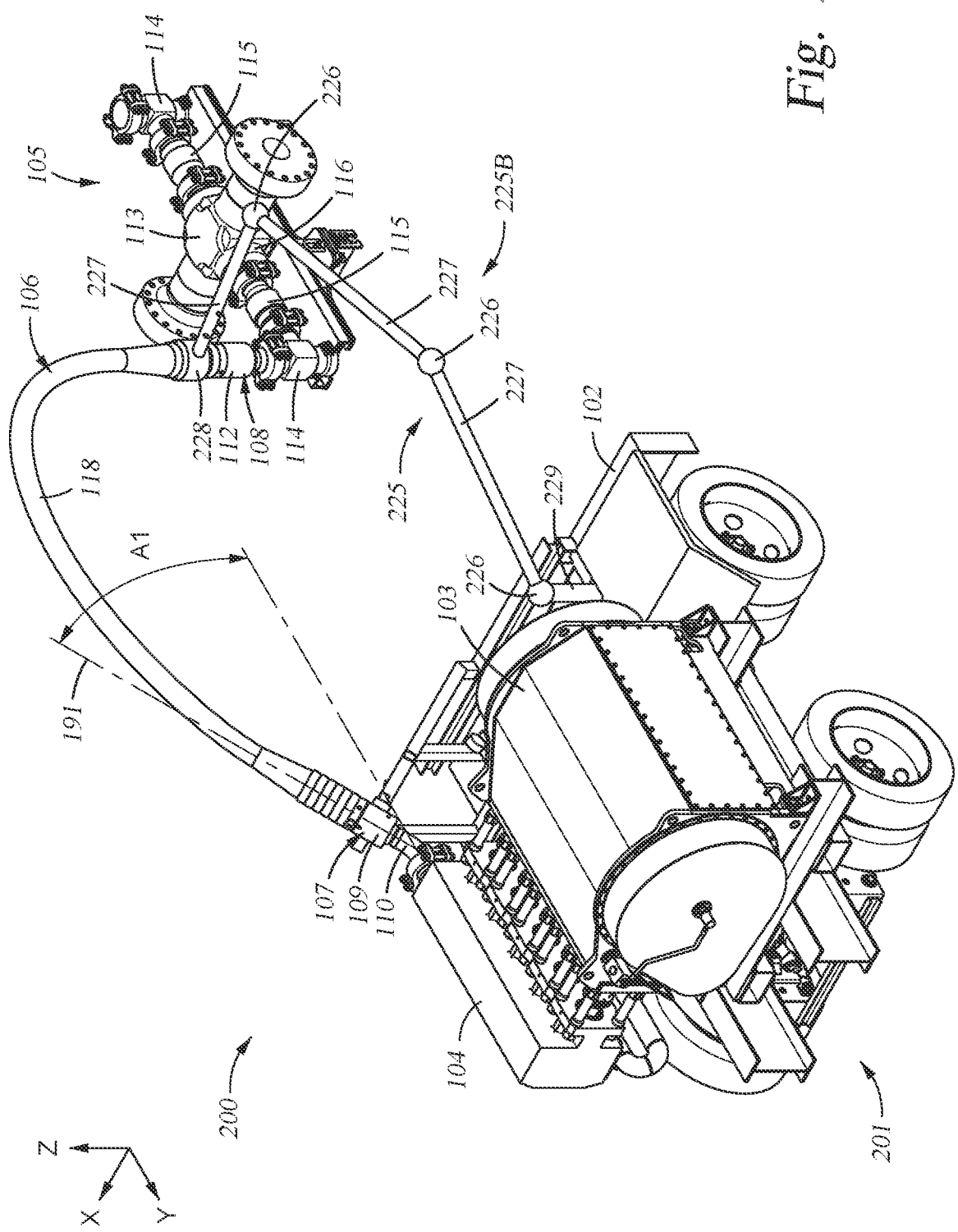
FIG. 2B is a schematic partial isometric back view of the fluid injection system shown in FIG. 2A including the articulation arm device in a deployed position, according to one implementation.

FIG. 2B is a schematic partial isometric back view of the fluid injection system 200 shown in FIG. 2A including the articulation arm device 225 in a deployed position 225B, according to one implementation.

Figure 2C:
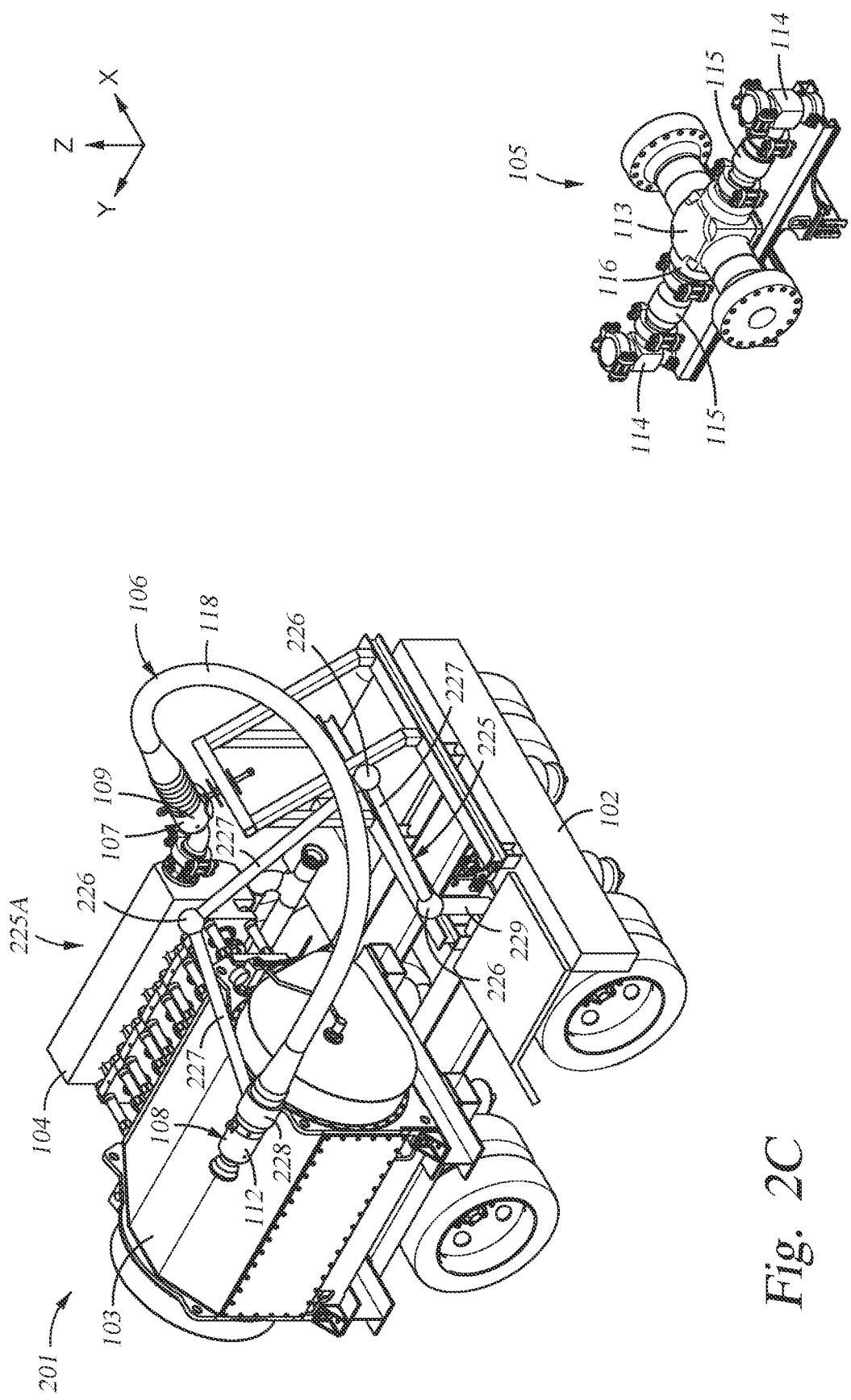
FIG. 2C is a schematic partial isometric front view of the fluid injection system shown in FIG. 2A including the articulation arm device in the storage position, according to one implementation.

FIG. 2C is a schematic partial isometric front view of the fluid injection system 200 shown in FIG. 2A including the articulation arm device 225 in the storage position 225A, according to one implementation.

Figure 2D:
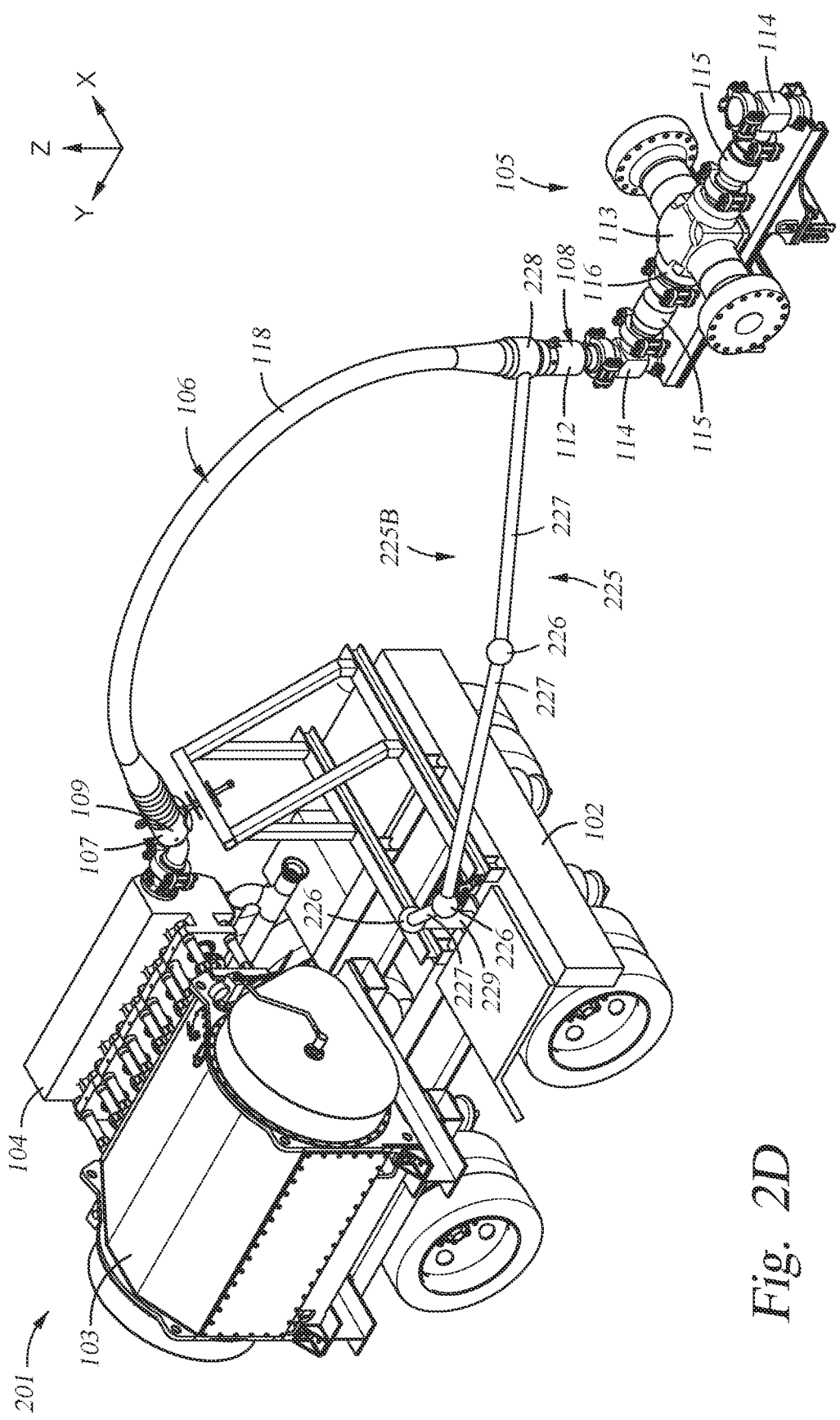
FIG. 2D is a schematic partial isometric front view of the fluid injection system shown in FIG. 2A including the articulation arm device in the deployed position, according to one implementation.

FIG. 2D is a schematic partial isometric front view of the fluid injection system 200 shown in FIG. 2A including the articulation arm device 225 in the deployed position 225B, according to one implementation.

The articulation arm device 225 is mounted to the trailer 102 using a base 229 coupled to the trailer 102. The articulation arm device 225 includes one or more pivot joints 226 (two are shown) coupled between two or more arms 227 (three are shown). The articulation arm device 225 also includes a pivot joint 226 coupled between the base 229 and a first arm 227. FIG. 2A illustrates the articulation arm device 225 in the storage position 225A, and the articulation arm device 225 in the deployed position 225B. The storage position 225A is for storage of the flexible hose 106, such as during transportation of the flexible hose 106 and the pump 201. The deployed position 225B is for deployment of the flexible hose 106, such as during use of the pump 101 to pump frac fluids into the pump manifold 105. In one embodiment, which can be combined with other embodiments, each of the pivot joints 226 is movable in one or more degrees of freedom, such as up to six degrees of freedom. In one embodiment, which can be combined with other embodiments, each of the pivot joints 226 is movable in six degrees of freedom including heaving, swaying, walking, yawing, pitching, and rolling.

The articulation arm device 225 also includes a connection device 228 coupled to an end arm 227 (a third arm 227) of the two or more arms 227. The connection device 228 is configured to connect to and support the second end 108 of the flexible hose 106. In the storage position 225A, the second end 108 of the flexible hose 106 is suspended from and supported by the connection device 228 of the articulation arm device 225. The connection device 228 grips the second end 108 and moves the second end 108 to couple the second end 108 to the pump manifold 105. The second end 108 is moved above the pump manifold 105 by articulating the articulation arm device 225. In one embodiment, which can be combined with other embodiments, the connection device 228 includes a clamp assembly that is configured to clamp to the second end 108 of the flexible hose 106. In one embodiment, which can be combined with other embodiments, the connection device 228 includes a pin assembly that is configured to pin the second end 108 of the flexible hose 106 to the connection device 228. The arms 227 are pivotable relative to the respective pivot joints 226 to which the respective arms 227 are coupled. Each of the pivot joints 226 may include a ball joint and/or a hinge plate. The pivot joints 226 may be locked to lock the articulation arm device 225 such that the arms 227 do not pivot relative to the pivot joints 226. In one example, each of the pivot joints 226 is locked during the storage position 225A of the articulation arm device 225. In one embodiment, which can be combined with other embodiments, the articulation arm device 225 includes one or more springs, one or more shock absorbers, and/or one or more actuators coupled to one or more of the arms 227. The actuators can be hydraulic, pneumatic, electric, mechanical, and/or any combination thereof for actuating the multi-point articulation arm device 225 to manipulate and/or support the flexible hose 106.

The one or more springs compress and/or decompress upon pivoting of one or more of the arms 227. The articulation arm device 225 includes an adjustable trolley that is movable along the base 229 to move the arms 227. In one example, a second arm 227 between the first arm 227 and the end arm 227 includes a spring that compresses and/or decompresses upon articulation of the articulation arm device 225. In one embodiment, which can be combined with other embodiments, the articulation arm device 225 balances forces acting on the arms 227 to place the second end 108 of the flexible hose 106 in a near zero gravity ("zero-g") condition.

A disconnection device may be used to quickly disconnect the connection device 228 from the second end 108 of the flexible hose 106. The disconnection device may be hydraulic, electrical, pneumatic, or mechanical. In one embodiment, which can be combined with other embodiments, the disconnection device includes a hydraulic latch. The disconnection device can reduce the rig-up time to deploy the flexible hose 106 and reduce downtime for frac pumping operations.

The present disclosure discloses various methods. As an example, a method of deploying the pump 201 (a frac pump) mounted to the trailer 102. The method includes supporting the second end 108 of the flexible hose 106 on the end arm 227 of the articulation arm device 225. The method also includes moving the second end 108 of the flexible hose 106 above the manifold block 113 of the pump manifold 105. The moving the second end 108 of the flexible hose 106 includes articulating the articulation arm device 225 mounted to the trailer 102. The articulating the articulation arm device 225 includes pivoting two or more arms 227 of the articulation arm device 225 relative to one or more pivot joints 226 coupled between the two or more arms 227.

The method also includes coupling the second end 108 of the flexible hose 106 to the manifold block 113 of the pump manifold 105, and pumping a frac fluid from the fluid end 104 of the pump 201 and through the flexible hose 106 and into the pump manifold 105. The method also includes, after the coupling and prior to the pumping, disconnecting the end arm 227 of the articulation arm device 225 from the flexible hose 106.

Figure 3A:
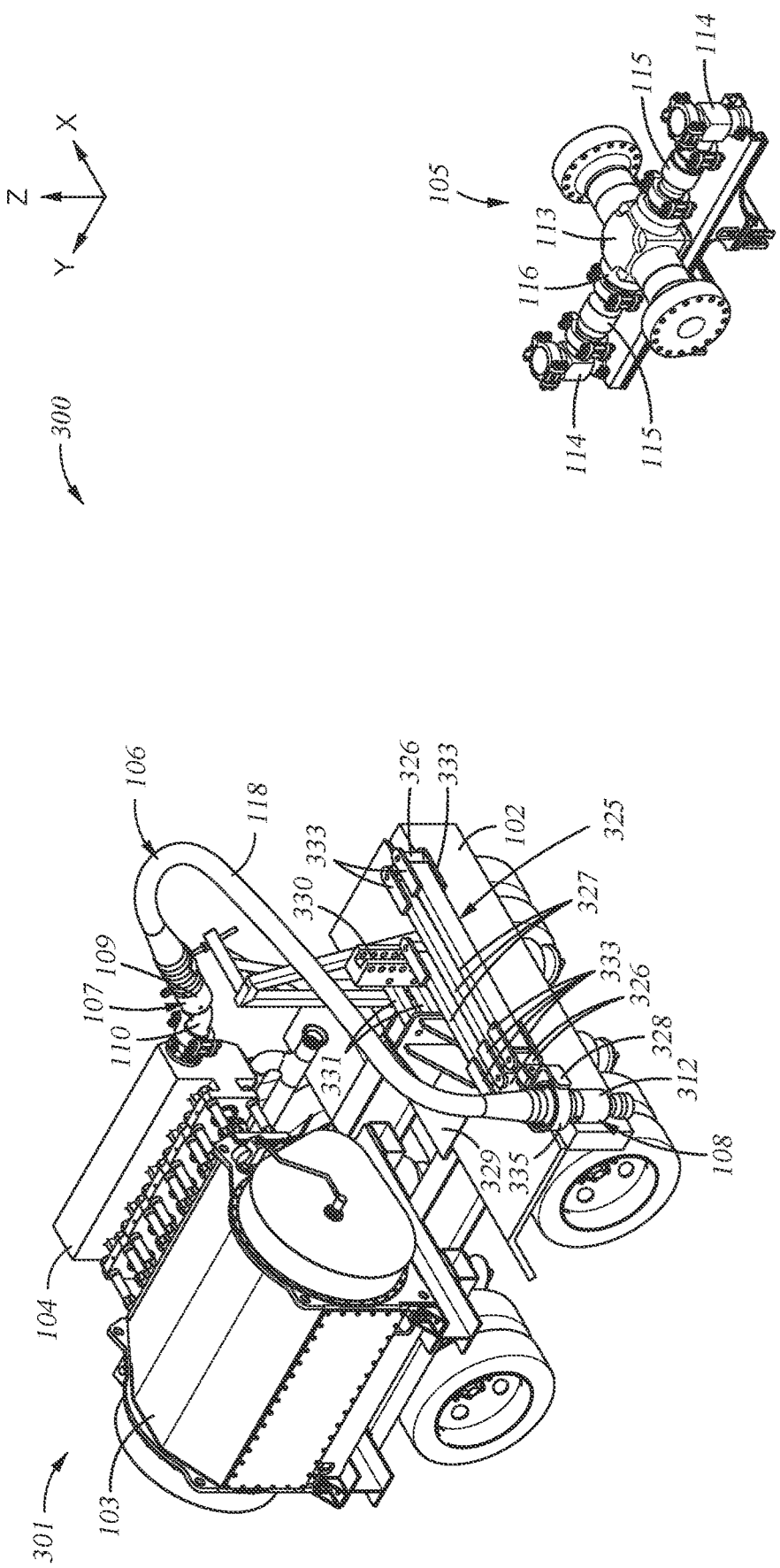
FIG. 3A is a schematic partial isometric front view of a fluid injection system including an articulation arm device at a wellhead site, according to one implementation.

FIG. 3A is a schematic partial isometric front view of a fluid injection system 300 including an articulation arm device 325 at a wellhead site, according to one implementation. In FIG. 3A, the articulation arm device 325 is in a storage position, a retracted position, and a lower position.

Figure 3B:
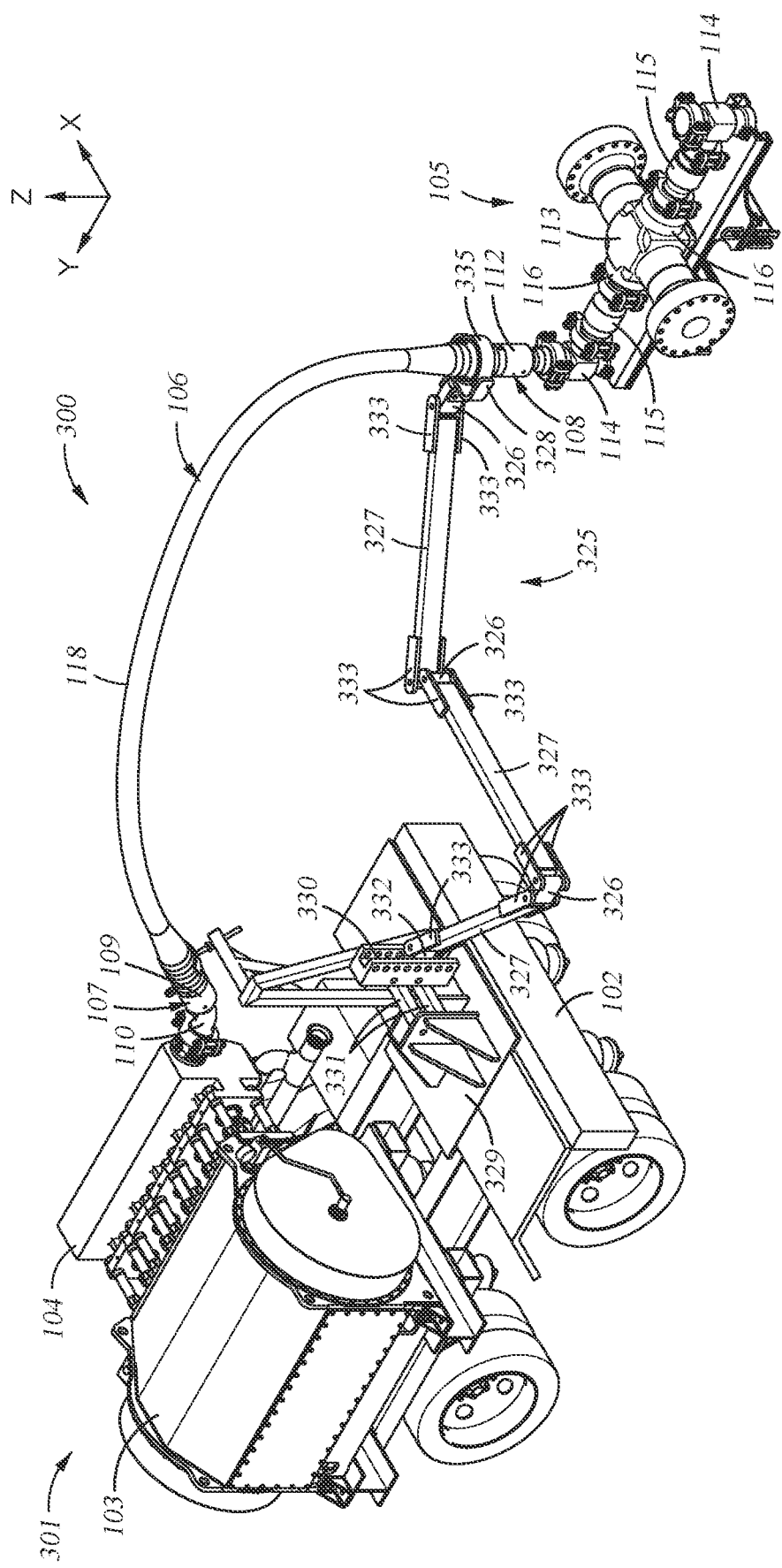
FIG. 3B is a schematic partial isometric front view of the fluid injection system including the articulation arm device shown in FIG. 3A, according to one implementation.

FIG. 3B is a schematic partial isometric front view of the fluid injection system 300 including the articulation arm device 325 shown in FIG. 3A, according to one implementation. In FIG. 3B, the articulation arm device 325 is in a deployed position, an extended position, and a raised position.

The articulation arm device 325 includes a base 329 mounted to the trailer 102, a vertical column 330, and a pair of bars 331 coupled between the base 329 and the vertical column 330. The articulation arm device 325 also includes an adjustable block 332 that is movable up and down along the vertical column 330. Each of the adjustable block 332 and the vertical column 330 includes pin openings for insertion of pins to lock the adjustable block 332 in place along the vertical column 330. The articulation arm device 325 includes one or more arms 327 (three are shown) coupled to the vertical column 330 through the adjustable block 332, and a connection device 328 coupled to an end arm 327 of the arms. The connection device 328 is similar to the connection device 228 shown in FIGS. 2A-2D, and includes one or more of the features, components, aspects, and/or properties thereof. The articulation arm device 325 also includes a plurality of hinge plates 326 (three are shown). The connection device 328 is coupled to the end arm 327 through one of the hinge plates 326. The connection device 328 is configured to connect to and support the second end 108 of the flexible hose 106.

The articulation arm device 325 includes a plurality of pairs of links 333 (six are shown). A first arm 327 is coupled to the vertical column 330 through one pair of links 333 coupled between the first arm 327 and the adjustable block 332. The articulation arm device 325 is movable up and down by, for example, moving the vertical column 330 up and down to move the arms 327 up and down (e.g., along the Z-axis). Moving the arms 327 up and down moves the second end 108 connected to the connection device 328 up and down. The second end 108 may be moved downward to couple the second end 108 to the manifold block 113 through the angled joint 114.

The articulation arm device 325 articulates horizontally (e.g., along the X-Y plane) to extend the arms 327 outward to move the second end 108 of the flexible hose 106. The articulation arm device 325 may be horizontally articulated manually, such as by an operator manually moving the connection device 328 and the second end 108 horizontally and above the angled joint 114 of the manifold block 113.

The flexible hose 106 includes a rotatable joint 335 that is at least part of a disconnection device that quickly disconnects the connection device 328 from the flexible hose 106. The rotatable joint 335 includes a ring disposed about the flexible hose 106. The disconnection device of the connection device 328 can disconnect the connection device 328 from the flexible hose 106 after the second end 108 is coupled to the angled joint 114, and the frac fluid may be subsequently pumped into the pump manifold 105. Disconnecting the connection device 328 from the flexible hose 106 facilitates reduced fatigue and increased operating life for the articulation arm device 325 as the articulating arm device 325 experiences less vibrations during frac operations.

Figure 3C:
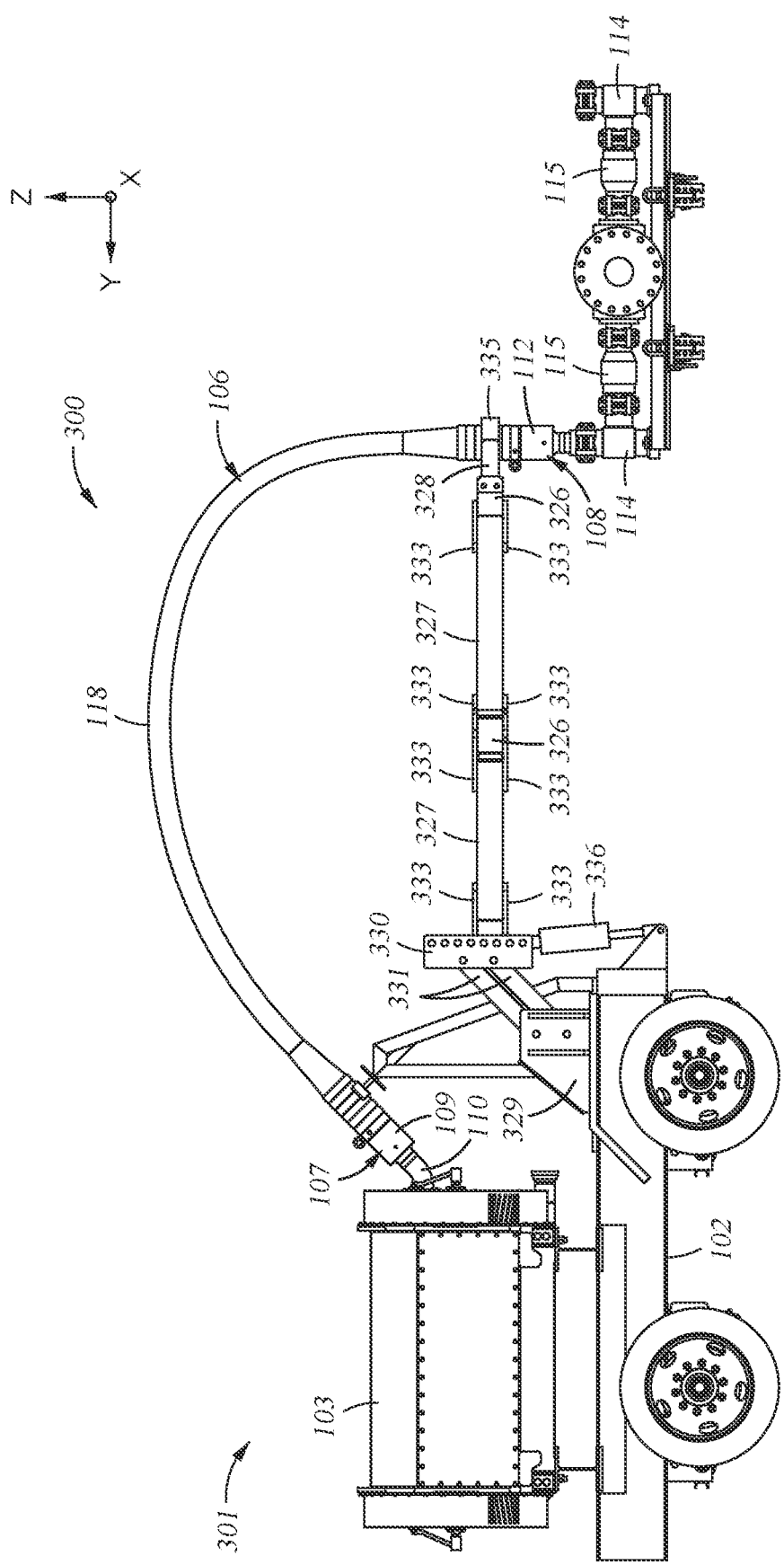
FIG. 3C is a partial side schematic view of the fluid injection system including the articulation arm device shown in FIG. 3A, according to one implementation.

FIG. 3C is a partial side schematic view of the fluid injection system 300 including the articulation arm device 325 shown in FIG. 3A, according to one implementation. The articulation arm device 325 includes an actuator 336 mounted to the trailer 102 and coupled to the vertical column 330. The actuator 336 may be powered electrically, hydraulically, pneumatically, or mechanically. The actuator 336, when actuated, vertically moves the vertical column 330 up and down to move the arms 227 up and down. The articulation arm device 325 is shown after the second end fitting 112 of the second end 108 is coupled to the angled joint 114 of the manifold block 113, before the connection device 328 is disconnected from the second end 108 of the flexible hose 106. After the connection device 328 is disconnected from the flexible hose 106, the articulation arm device 325 is retracted toward the trailer 102.

The present disclosure contemplates that the angle A1 of the first end fitting 109 is within a range of 30 degrees to 60 degrees, such as 40 degrees to 50 degrees. In one embodiment, which can be combined with other embodiments, the angle A1 is 45 degrees. The present disclosure also contemplates that other values may be used for the angle A1 in relation to the articulation arm device 325, such as 0 degrees or 90 degrees.

It is believed that, using aspects described herein (such as aspects of the articulation arm device 325), a single operator (e.g., a single human) may rig up and coupled the flexible hose 106 to the pump manifold 105 in less than 20 minutes (such as less than 10 minutes) to commence frac pump operations through the flexible hose 106.

Figure 4A:
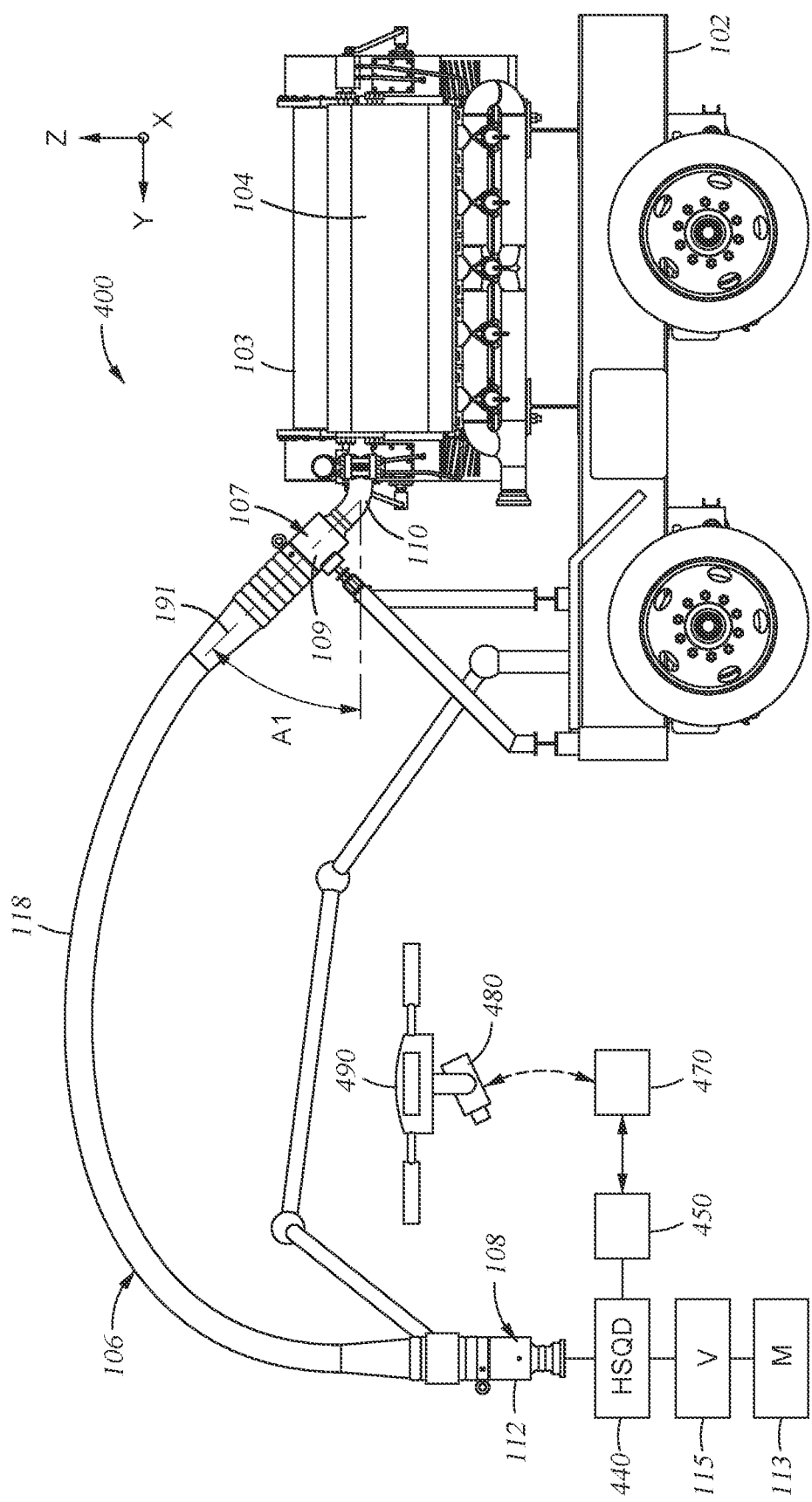
FIG. 4A is a schematic partial side view of a fluid injection system deployed at a wellhead site, according to one implementation.

FIG. 4A is a schematic partial side view of a fluid injection system 400 deployed at a wellhead site, according to one implementation. In the fluid injection system 400, the second end fitting 112 is removably coupled to a disconnection device 440 that quickly disconnects the second end 108 of the flexible hose 106 from the manifold block 113. The disconnection device 440 is coupled to the manifold block 113 through a valve 115. The valve 115 may be a swing valve, a check valve, a dart valve, or a plug valve. In one embodiment, which can be combined with other embodiments, the disconnection device 440 is remotely operable using a remote system to connect and disconnect the second end fitting 112 to and from the pump manifold 105. The disconnection device 440 is remotely operated from a remote structure 470, such as a data van, that is in communication with a controller 450 that actuates the disconnection device 440. A camera 480 provides a live image feed of the disconnection device 440 and the flexible hose 106 to an operator in the remote structure 470. In one example, the camera 480 is mounted to the bridge 503 of the overhead crane 501 (shown in FIG. 5). In one example, the camera 480 is mounted to a drone 490. In one embodiment, which can be combined with other embodiments, the disconnection device 440 includes robotics systems for remote operation and/or automated operation of the disconnection device 440. The disconnection device 440 facilitates connecting the flexible hose 106 to the pump manifold 105 and disconnecting the flexible hose 106 from the pump manifold 105 while the pump manifold 105 is under operating pressure supplied by frac pumps. In one embodiment, which can be combined with other embodiments, the robotics systems include a pre-programmed robot and a system including a feedback loop control. The feedback loop control can use sensors on the equipment (such as the disconnection device 440 and/or the flexible hose 106), and/or drone video feedback. In one embodiment, which can be combined with other embodiments, the disconnection device 440 includes a dry break coupling device. The disconnection device 440 can be mechanically actuated, pneumatically actuated, electrically actuated, and/or hydraulically actuated.

The implementation in FIG. 4A illustrates the valve 115 as vertically above the manifold block 113 and the disconnection device 440 vertically above the valve 115. The present disclosure contemplates that the valve 115 may be disposed horizontally to the left or right of the manifold block 113, and the disconnection device 440 may be disposed horizontally to the left or right of the valve 115.

Figure 4B:
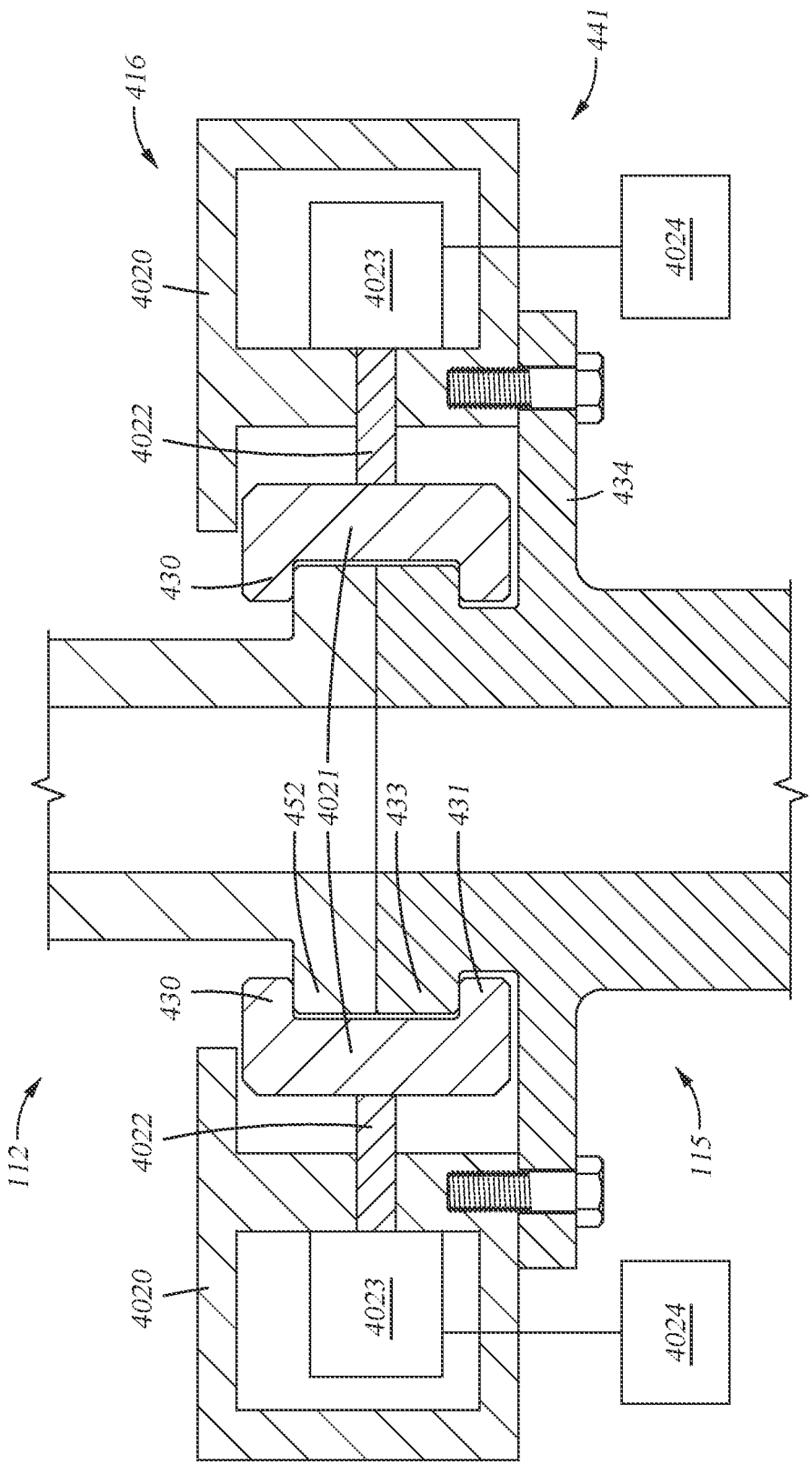
FIG. 4B is a schematic partial cross-sectional view of a disconnection device that may be used as the disconnection device shown in FIG. 4A, according to one implementation.

In one embodiment, which can be combined with other embodiments, the disconnection device 440 includes a fastener clamp device where tightening of one or more screws or movement of one or more pins clamps together a plurality of clamps (such as two clamps or three clamps) about a hub connection. FIG. 4B is a schematic partial cross-sectional view of a disconnection device 441 that may be used as the disconnection device 440 shown in FIG. 4A, according to one implementation. The disconnection device 441 includes an actuator 4023 and a lock ring assembly 416.

The lock ring assembly 416 includes one or more housing bodies 4020 disposed about a plurality of ring wedges 4021. In one example, four ring wedges 4021 are used. The ring wedges 4021 are separate segments that, when in contact form a ring. Each of the ring wedges 4021 includes an upper shoulder 430 and a lower shoulder 431. The ring wedges 4021 are movable inward and outward to engage and disengage from a latch 452 of the flexible hose 106. In one example, the latch 452 is a flange formed on the second end fitting 112 of the flexible hose 106. The ring wedges 4021 each include a piston rod 4022 coupled to the actuator 4023. Each actuator 4023 is connected to a power source 4024. The power sources 4024 supply power to the actuators 4023 to actuate the piston rods 4022 to move the ring wedges 4021 inward and outward. In one embodiment, which can be combined with other embodiments, the actuators 4023 include hydraulic chambers, each piston rod 4022 includes a piston head disposed in one of the hydraulic chambers, and the power sources 4024 are hydraulic fluid sources that supply and remove hydraulic fluid from the hydraulic chambers to bias the ring wedges 4021 inward and outward.

In the implementation shown, the latch 452 is a shoulder of the second end fitting 112 of the flexible hose 106. When engaged with the latch 452, the upper shoulders 430 of the ring wedges 4021 are above and engaged with the latch 452 to couple the flexible hose 106 to the valve 115 coupled to the manifold block 113. Ring wedges 4021 may be biased outward to disengage the upper shoulders 430 from the latch 452 such that the outer diameter of the latch 452 is lesser than the upper shoulders 430 such that the second end fitting 112 may be moved upward and outside of the lock ring assembly 416.

The valve 115 includes a shoulder 433 engaged with the lower shoulders 431 of the ring wedges 4021 when the ring wedges 4021 are biased inward to engage the latch 452. The valve 115 also includes a second shoulder 434 coupled to the one or more housing bodies 4020 of the lock ring assembly 416. The present disclosure contemplates that actuators other than a hydraulic actuator, such as a mechanical actuator, an electric actuator, and/or a pneumatic actuator, may be used in place of or in addition to the actuator 4023 described. For example, power sources 4024 other than hydraulic power sources, such as electric power sources, mechanical power sources, and/or pneumatic power sources may be used.

The latch 452 is used to couple the flexible hose 106 to, and decouple the flexible hose 106 from, the valve 115, as described above.

The ring wedges 4021 are actuated between a locked position and an unlocked position. In the locked position, the ring wedges 4021 are engaged with the latch 452 and the shoulder 433. In the unlocked position, the ring wedges 4021 are disposed at a gap from the latch 452 and the shoulder 433. In the locked position, the second end fitting 112 of the flexible hose 106 is locked to the disconnection device 441.

Figure 4C:
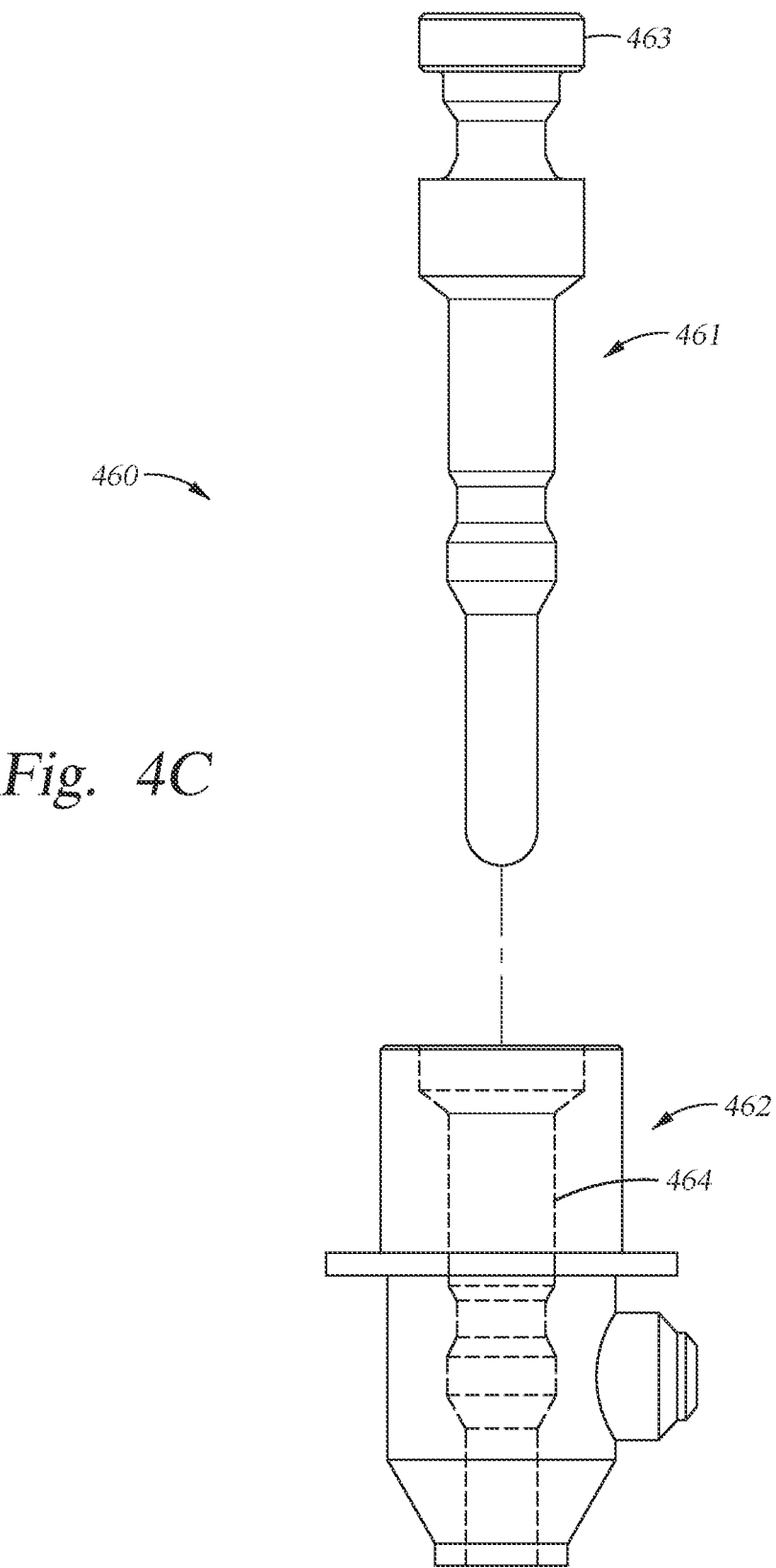
FIG. 4C is a schematic partial cross-sectional view of a disconnection device that may be used as the disconnection device shown in FIG. 4A, according to one implementation.

FIG. 4C is a schematic partial cross-sectional view of a disconnection device 460 that may be used as the disconnection device 440 shown in FIG. 4A, according to one implementation. The disconnection device 460 is a hot stab device, and the hot stab device includes a male stab 461 to be inserted into a female receptacle 462. The female receptacle 462 is coupled to the valve 115. The male stab 461 is coupled to the second end fitting 112 or is at least partially integrally formed with the second end fitting 112. In one example, a flange 463 is coupled to the second end fitting 112. The female receptacle 462 includes a central opening profile 464 that corresponds to portions of the male stab 461.

When the male stab 461 is inserted into the female receptacle 462, the second end fitting 112 of the flexible hose 106 is locked to the pump manifold 105. When the male stab 461 is removed from the female receptacle 462, the flexible hose 106 is unlocked from the pump manifold 105 and may be removed from the pump manifold 105.

Figure 5:
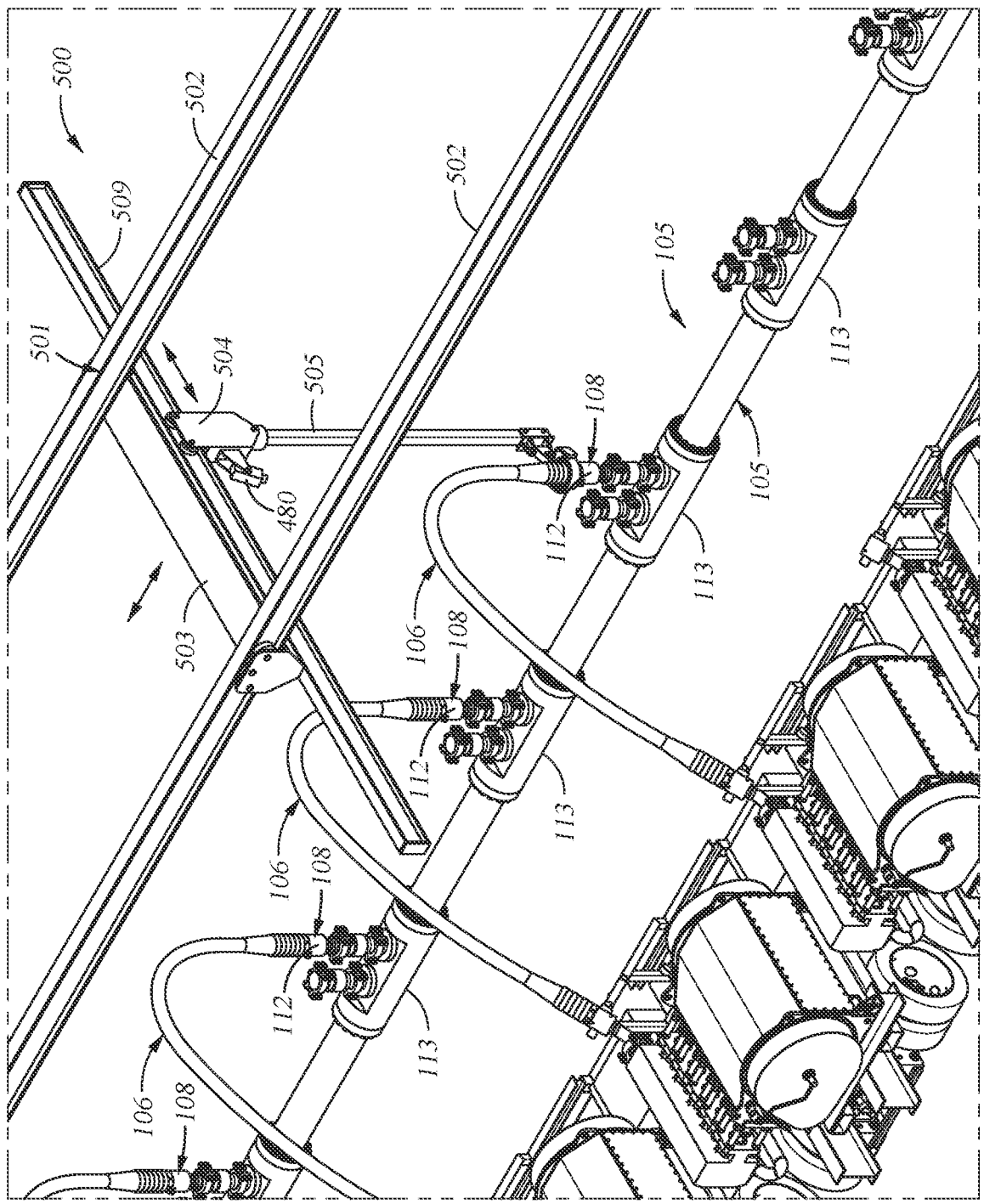
FIG. 5 is a schematic view of a fluid injection system including an overhead crane, according to one implementation.

FIG. 5 is a schematic view of a fluid injection system 500 including an overhead crane 501, according to one implementation. The overhead crane 501 includes a pair of rails 502 and a bridge 503 coupled to and disposed between the pair of rails 502. The bridge 503 is movable along the rails 502 along the X-axis. The bridge 503 includes a trolley support rail 509. The overhead crane 501 also includes a trolley 504 that is coupled to and movable along the trolley support rail 509 of the bridge 503 and along the Y-axis. The trolley 504 includes a lift support member 505. In one embodiment, which can be combined with other embodiments, the lift support member 505 is a bar. In one embodiment, which can be combined with other embodiments, the lift support member 505 is a cable, such as a hoist line, disposed on a cable guide of the trolley 504. The overhead crane 501 is mounted to the pump manifold 105. The pair of rails 502 are coupled to a frame of the pump manifold 105, such as a frame of a skid or trailer of the pump manifold 105. The present disclosure contemplates that a single overhead crane 501 can service an entire fleet of frac pumps and pump manifolds.

The overhead crane 501 is used to lift, move, and lower the flexible hose 106. As an example, the overhead crane 501 is used to move the second end fitting 112 and lower the second end fitting 112 onto a manifold block 113 of the pump manifold 105 such that the second end fitting 112 can be coupled to the manifold block 113.

Figure 6:
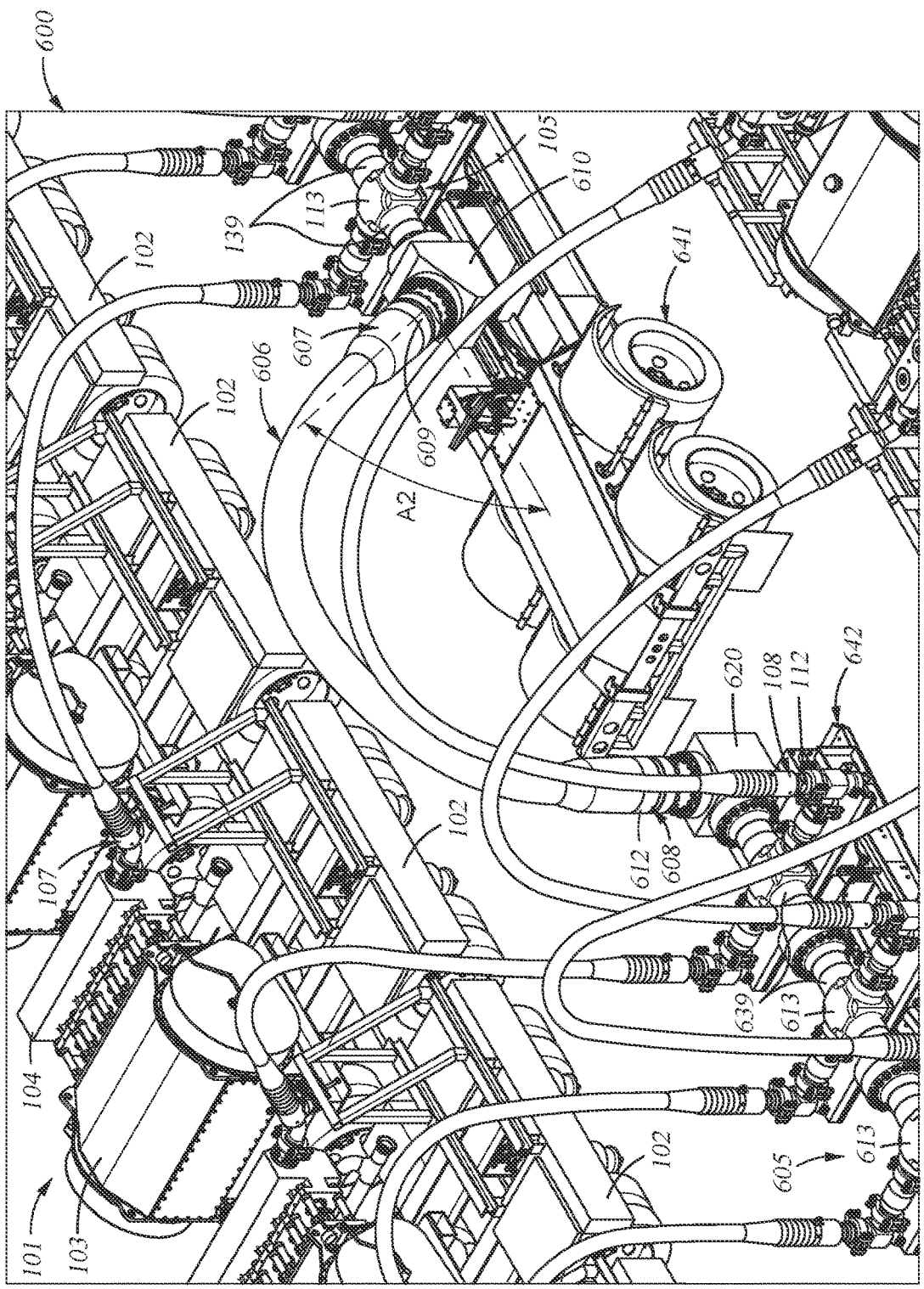
FIG. 6 is an enlarged partial schematic isometric view of a fluid injection system, according to one implementation.

FIG. 6 is enlarged partial schematic isometric view of a fluid injection system 600, according to one implementation. The pump manifold 105 is part of one or more first pump manifolds. The fluid injection system 600 includes one or more second pump manifolds 605 that include one or more of the aspects, features, components, and/or properties of the first pump manifold 105. The one or more first pump manifolds 105 can be coupled to an instrumentation skid. One or more large bore flexible hoses 606 are coupled between the one or more first pump manifolds 105 and the one or more second pump manifolds 605. The one or more flexible hoses 606 includes one or more of the aspects, features, components, and/or properties of the flexible hose 106 described above. The one or more flexible hoses 606 each include an internal flow bore that has a diameter of 5.0 inches or greater.

Each of the one or more flexible hoses 606 includes a first end 607 coupled to one of the one or more first pump manifolds 105 and a second end 608 coupled to one of the second pump manifolds 605. The first end 607 includes a first end fitting 609 that is coupled to an angled block 610 disposed at a rear end of one of the first pump manifolds 105. The angled block 610 includes an angled outer surface to which the first end fitting 609 is coupled. The first end fitting 609 is oriented (e.g., mounted) at an angle A2 relative to the horizontal plane (e.g., the X-Y plane). The angle A2 is within a range of 30 degrees to 60 degrees, such as 40 degrees to 50 degrees. In one embodiment, which can be combined with other embodiments, the angle A2 is 45 degrees. The present disclosure contemplates that the first end fitting 609 may be oriented vertically and perpendicularly to the horizontal plane. The second end fitting 612 is coupled to a front block 620 disposed at a front end of one of the second pump manifolds 605. The second end fitting 612 is oriented vertically and perpendicularly to the horizontal plane. The present disclosure contemplates that the second end fitting 612 may be oriented at an angle relative to the horizontal plane.

Each of the first pump manifolds 105 includes a respective plurality of manifold blocks 113 and a respective plurality of manifold conduits 139. Each of the second pump manifolds 605 includes a respective second plurality of manifold blocks 613 and a respective plurality of manifold conduits 639. The one or more first pump manifolds 105 and the one or more second pump manifolds 605 are each mounted on a respective trailer skid 641.

FIG. 6 illustrates a single first pump manifold 105 on a first trailer skid 641, a single second pump manifold 605 on a second trailer skid 642, and a single flexible hose 606 coupled between the single first pump manifold 105 and the single second pump manifold 605. The present disclosure contemplates that that fluid injection system 600 can also include another first pump manifold 105 on the first trailer skid 641, another second pump manifold 605 on the second trailer skid 642, and a second flexible hose 606. In such embodiments, the first trailer skid 641 includes two first pump manifolds 105, the second trailer skid 642 includes two second pump manifolds 605, and two flexible hoses 606 are coupled between the two first pump manifolds 105 and the two second pump manifolds 605.

Figure 7:
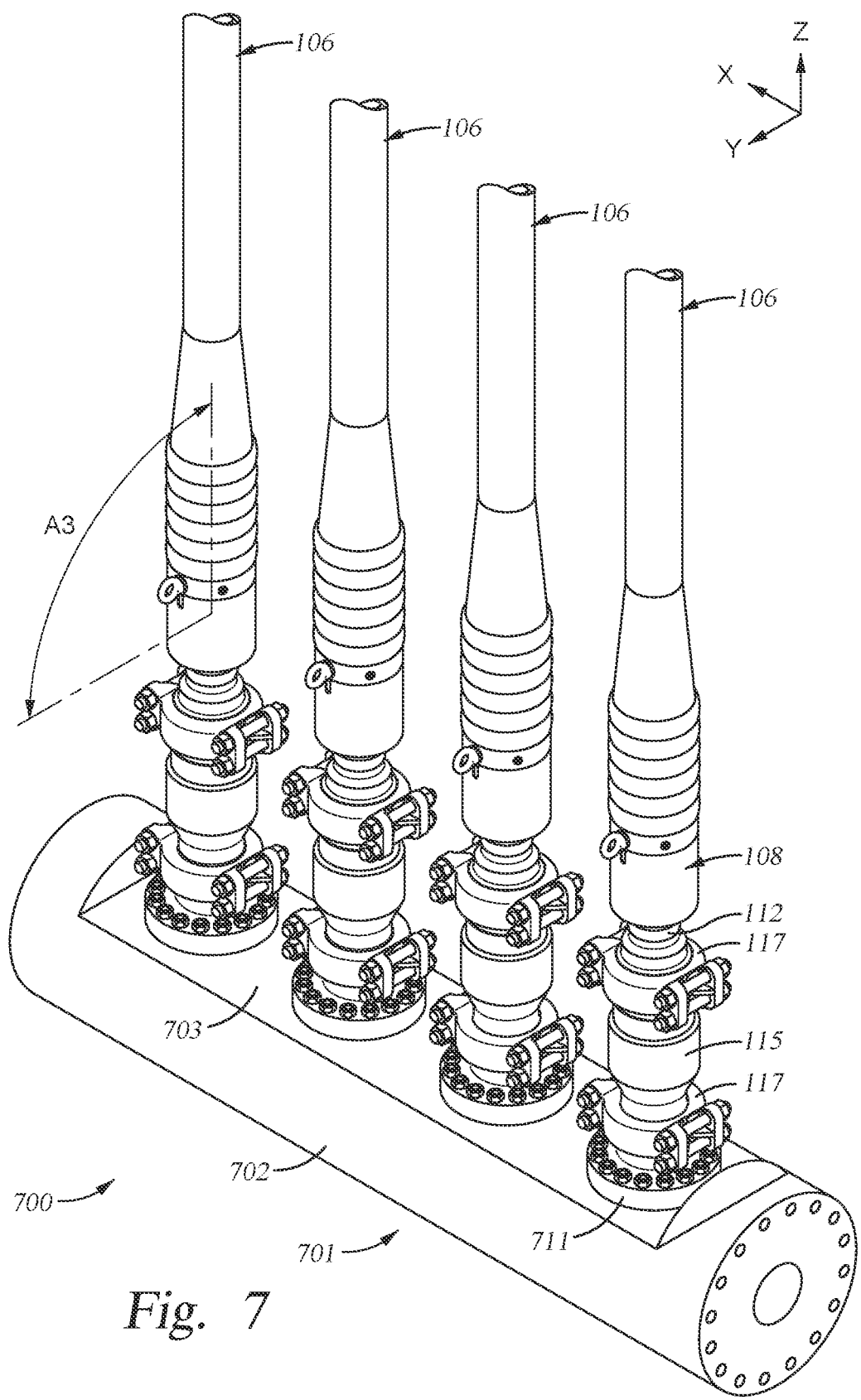
FIG. 7 is a schematic partial isometric view of a manifold device, according to one implementation.

FIG. 7 is a schematic partial isometric view of a manifold device 700, according to one implementation. The manifold device 700 includes a manifold block 701 and a plurality of flexible hoses 106 coupled to the manifold block 701. Each flexible hose 106 is coupled to the manifold block 701 through a valve 115. Each valve 115 is coupled to the manifold block 701 through a flange 711. The manifold block 701 includes an outer circumferential surface 702 and a recessed outer surface 703 formed in the outer circumferential surface 702. The valves 115 are coupled to the recessed outer surface 703 through the flanges 711 that are interfacing and in contact with the recessed outer surface 703. The flanges 711, valves 115, and second end fittings 112 are coupled together using clamp assemblies 117.

The second end fitting 112 is oriented (e.g., mounted) at an angle A3 relative to the horizontal plane (e.g., the X-Y plane) that extends through the manifold block 701. In one embodiment which can be combined with other embodiments, the angle A3 is within a range of 85 degrees to 95 degrees. In one embodiment, which can be combined with other embodiments, the angle A3 is 90 degrees. In one embodiment, which can be combined with other embodiments, the angle A3 is within a range of 0 degrees to 90 degrees. In one embodiment, which can be combined with other embodiments, the angle A3 is 45 degrees.

By orienting the flexible hoses 106 vertically and/or at the angle A3 into the manifold block 701, the need for an additional piece of iron or iron components such as adapters and/or angled joints may be omitted and still have an acceptable bore intersection for the mainline flow regime of the manifold device 700.

The present disclosure contemplates that the valves 115 may be omitted. The present disclosure also contemplates that the second end fittings 112 of the flexible hoses 106 may be coupled directly to the recessed outer surface 703.

Figure 18A:
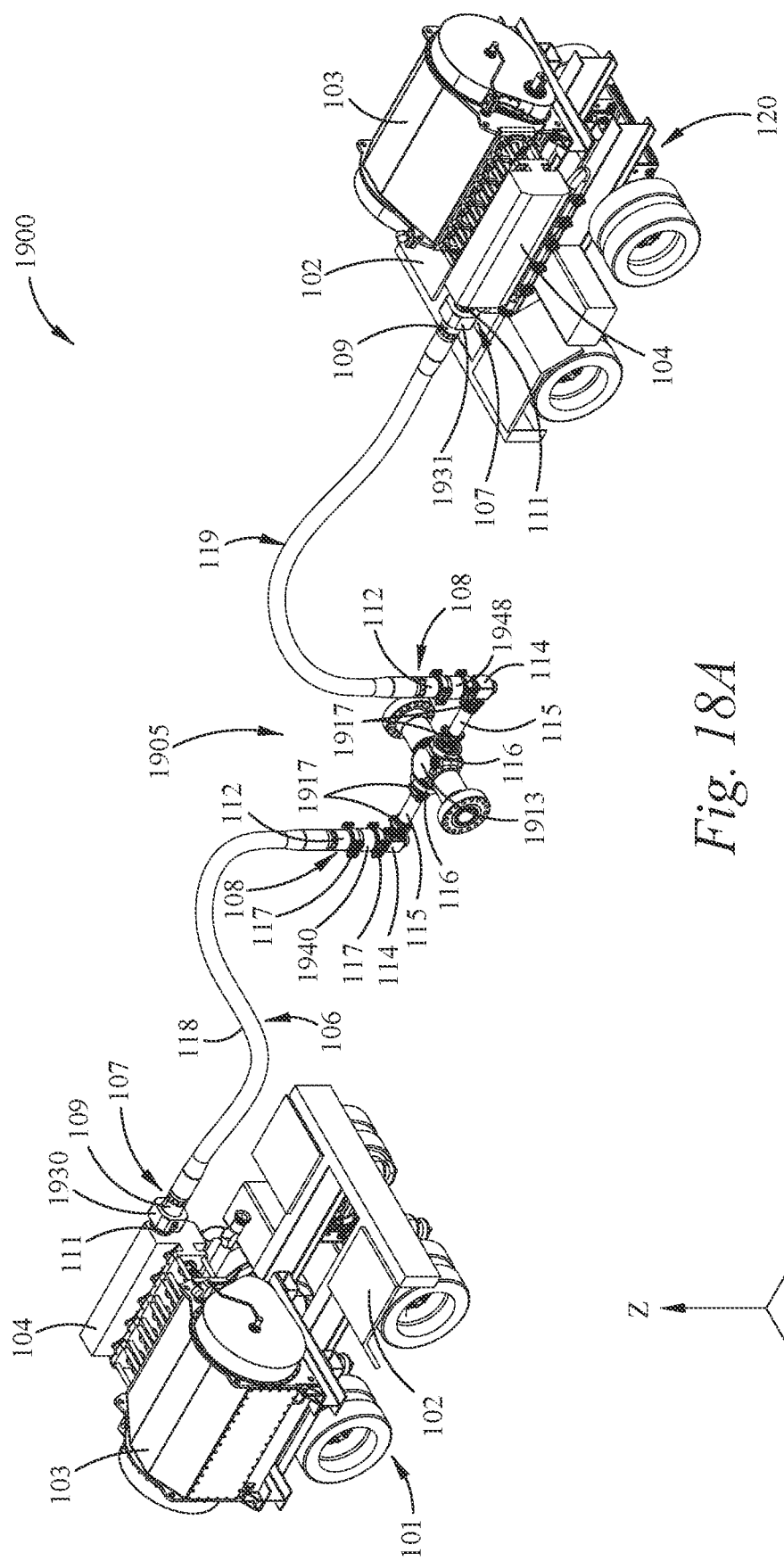
FIG. 18A is a schematic partial view of a fluid injection system deployed at a wellhead site, according to one implementation.
Figure 18B:
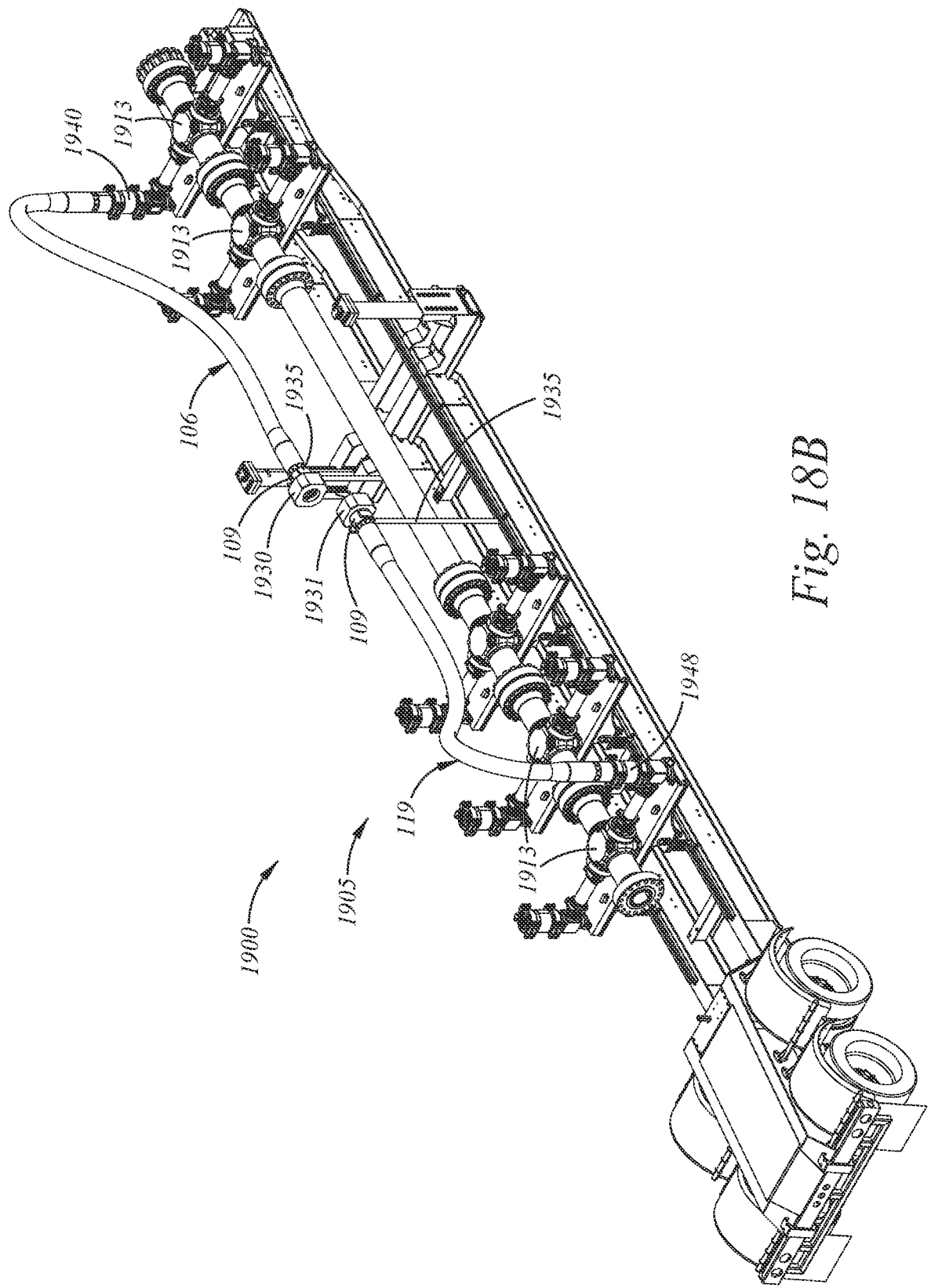
FIG. 18B is a schematic partial view of the pump manifold of the fluid injection system shown in FIG. 18A, according to one implementation.
Figure 18C:
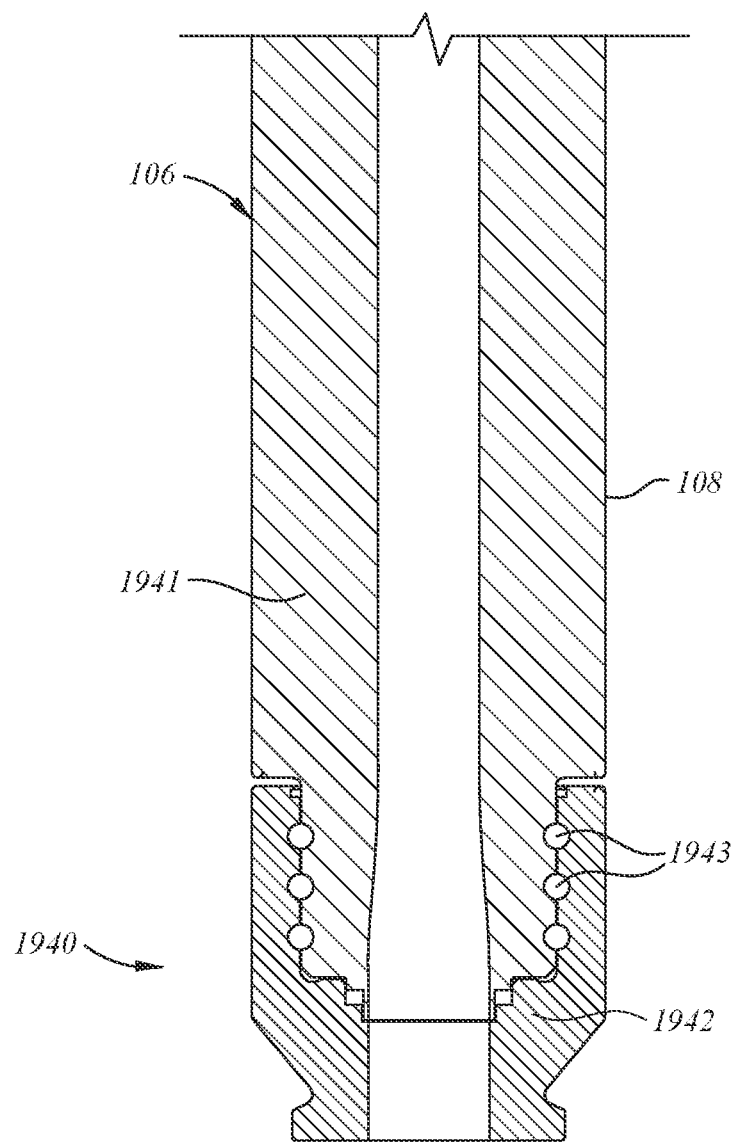
FIG. 18C is a schematic cross sectional view of the rotatable joint shown in FIG. 18A and FIG. 18B, according to one implementation.

The present disclosure contemplates a rotatable joint, such as the rotatable joint 1940 or the rotatable joint 1948 shown in FIGS. 18A-18C, can be coupled (such as vertically coupled) between the second end 108 of each flexible hose 106 and the respective valve 115. The rotatable joint can be coupled between the second end 108 of each flexible hose 106 and the recessed outer surface 703 of the manifold block 701. The rotatable joints can be coupled directly to the recessed outer surface 703 or coupled directly to the flanges 711.

Figure 8A:
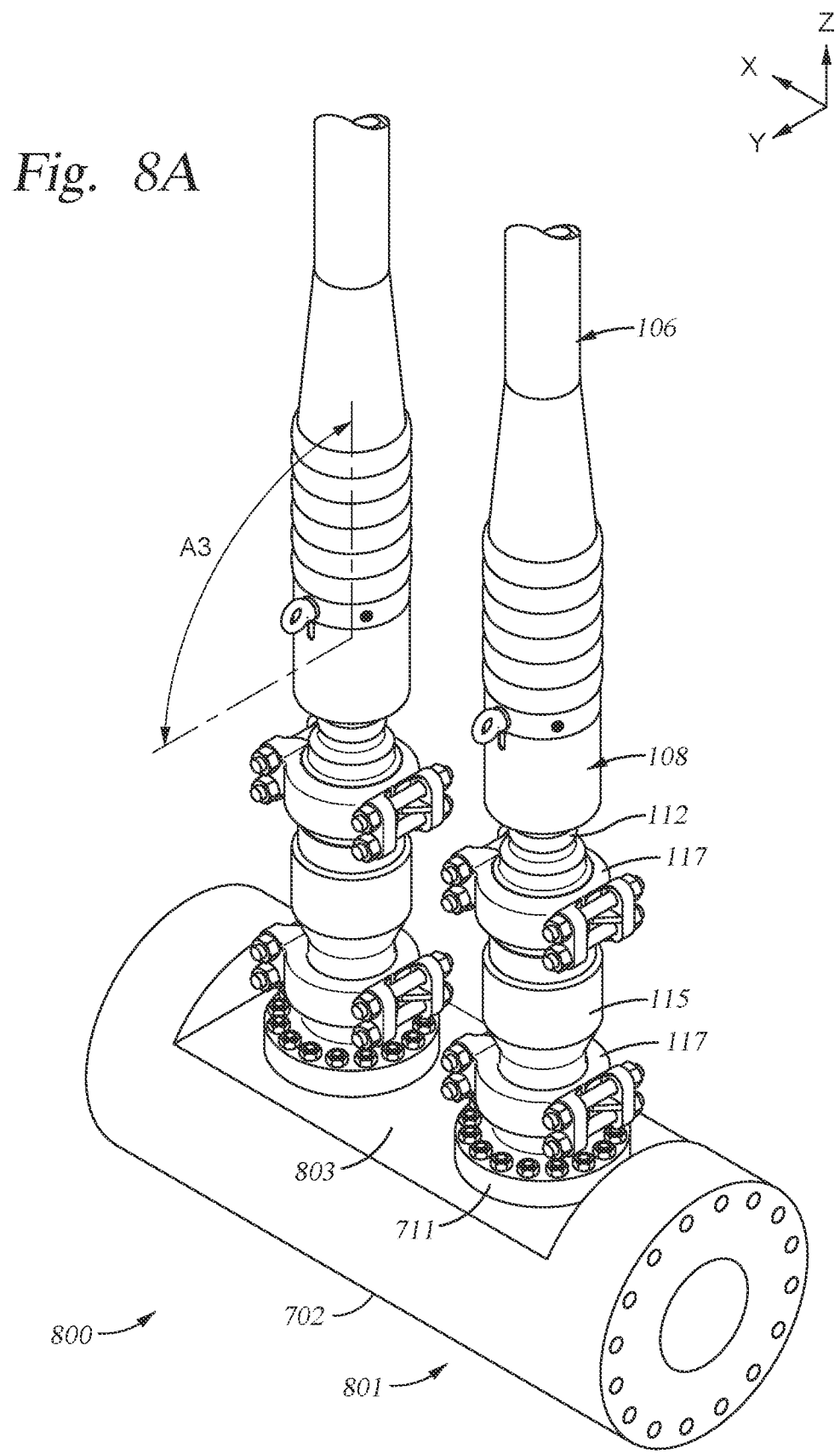
FIG. 8A is a schematic partial isometric view of a manifold device, according to one implementation.

FIG. 8A is a schematic partial isometric view of a manifold device 800, according to one implementation. The manifold device 800 includes a manifold block 801 and a plurality of flexible hoses 106 coupled to the manifold block 801. The manifold block 801 is shorter than the manifold block 701 shown in FIG. 7. The manifold block 801 includes a recessed outer surface 803 formed in the outer circumferential surface 702. The present disclosure contemplates that the valves 115 may be omitted. The present disclosure also contemplates that the second end fittings 112 of the flexible hoses 106 may be coupled directly to the recessed outer surface 803.

Figure 8B:
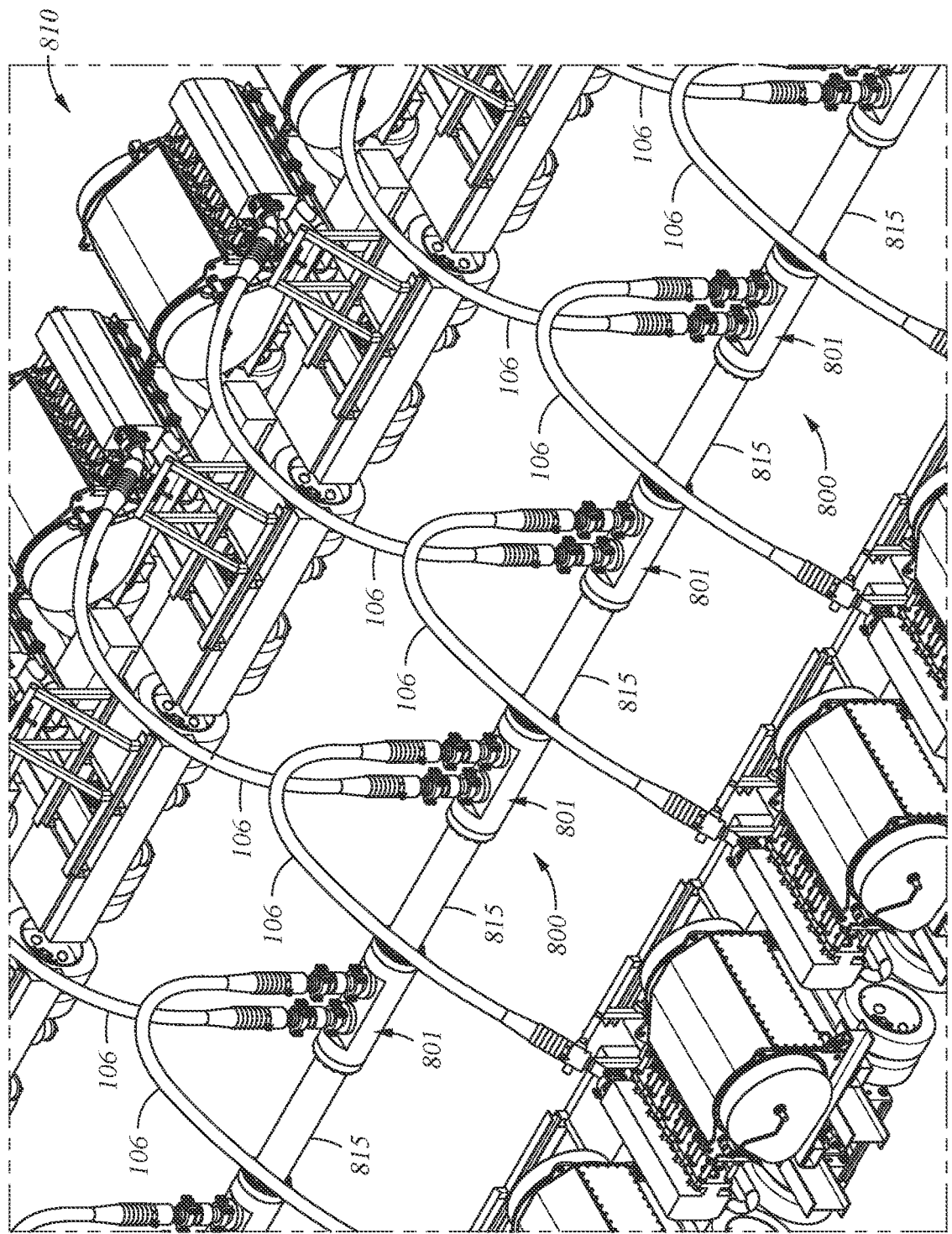
FIG. 8B is an enlarged schematic partial isometric view of a fluid injection system that includes a plurality of manifold devices of the implementation shown in FIG. 8A, according to one implementation.

FIG. 8B is an enlarged schematic partial isometric view of a fluid injection system 810 that includes a plurality of manifold devices 800 of the implementation shown in FIG. 8A, according to one implementation. The plurality of manifold blocks 801 are coupled to a plurality of manifold conduits 815.

Figure 9A:
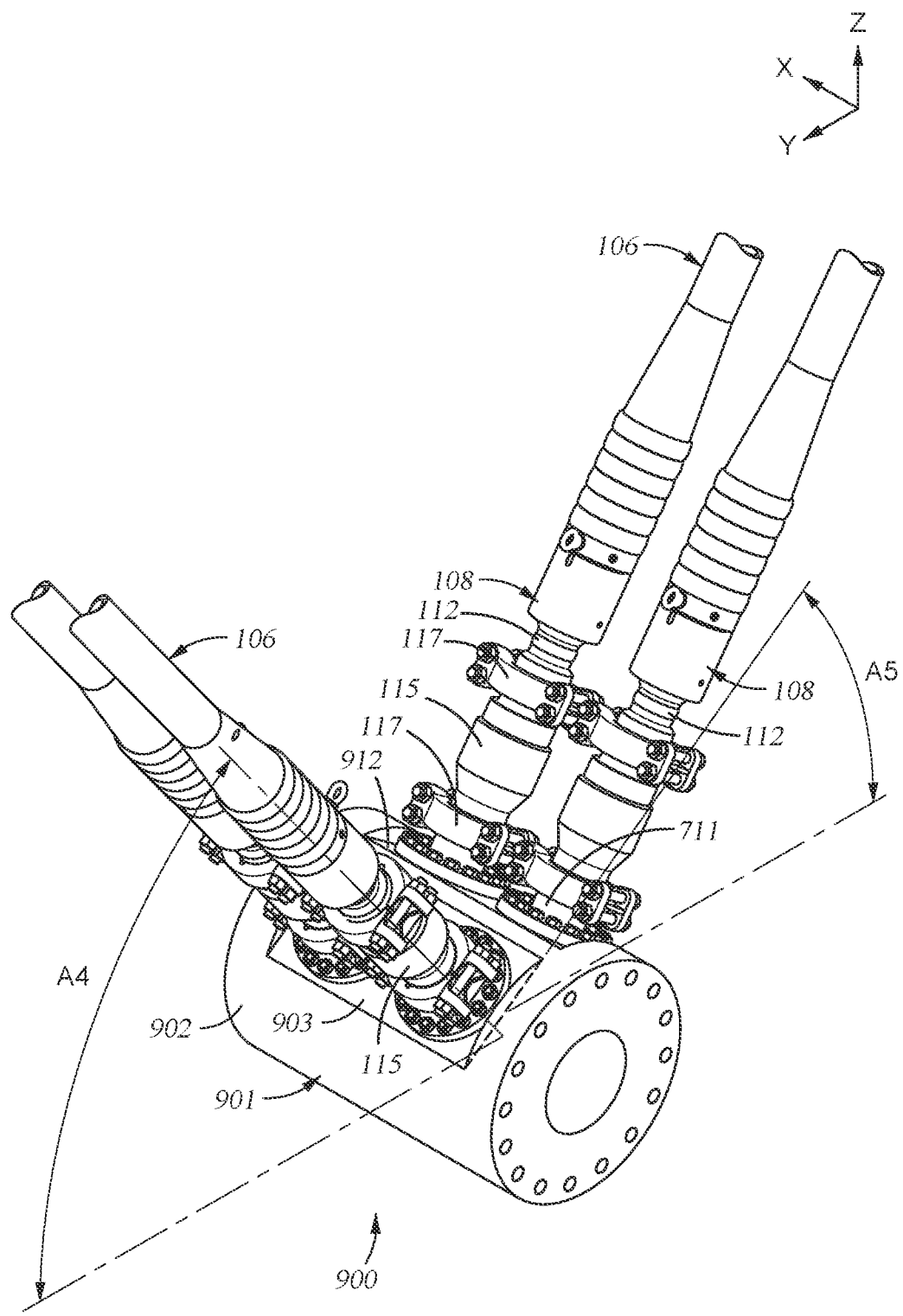
FIG. 9A is a schematic partial isometric view of a manifold device, according to one implementation.

FIG. 9A is a schematic partial isometric view of a manifold device 900, according to one implementation. The manifold device 900 includes a manifold block 901 and a plurality of flexible hoses 106 coupled to the manifold block 901. Each flexible hose 106 is coupled to the manifold block 901 through a valve 115. Each valve 115 is coupled to the manifold block 901 through a flange 711. The manifold block 901 includes an outer circumferential surface 902 and a first recessed outer surface 903 formed in the outer circumferential surface 902. The valves 115 are coupled to the first recessed outer surface 903 through the flanges 711 that are interfacing and in contact with the first recessed outer surface 903.

The second end fitting 112 is oriented (e.g., mounted) at an angle A4 relative to the horizontal plane (e.g., the X-Y plane) that extends through the manifold block 901. The angle A4 is within a range of 30 degrees to 75 degrees, such as 55 degrees to 65 degrees. In one embodiment, which can be combined with other embodiments, the angle A4 is 60 degrees.

The first recessed outer surface 903 is formed on a first side of the manifold block 901. The manifold block 901 also includes a second recessed outer surface 912 formed in the outer circumferential surface 902 on a second side of the manifold block 901. The first recessed outer surface 903 is formed on a first side of a vertical plane extending through a center of the manifold block 901, and the second recessed outer surface 912 is formed on a second side of the vertical plane extending through the center of the manifold block 901 such that the second recessed outer surface 912 opposes the first recessed outer surface 903. The first recessed outer surface 903 is a first tapered outer surface of the manifold block 901 and the second recessed outer surface 912 is a second tapered outer surface of the manifold block 901.

Each of the first recessed outer surface 903 and the second recessed outer surface 912 is oriented at a taper angle A5 relative to the horizontal plane (e.g., the X-Y plane) that extends through the manifold block 901. The taper angle A5 is within a range of 30 degrees to 75 degrees, such as 55 degrees to 65 degrees. In one embodiment, which can be combined with other embodiments, the taper angle A5 is 60 degrees.

The present disclosure contemplates that the valves 115 may be omitted. The present disclosure also contemplates that the second end fittings 112 of the flexible hoses 106 may be coupled directly to the respective first recessed outer surface 903 and the second recessed outer surface 912.

The present disclosure contemplates a rotatable joint, such as the rotatable joint 1940 or the rotatable joint 1948 shown in FIGS. 18A-18C, can be coupled (such as coupled at an angle) between the second end 108 of each flexible hose 106 and the respective valve 115. The rotatable joint can be coupled between the second end 108 of each flexible hose 106 and the respective recessed outer surface 903, 912 of the manifold block 901. The rotatable joints can be coupled directly to the recessed outer surfaces 903, 912 or coupled directly to the flanges 711.

Figure 9B:
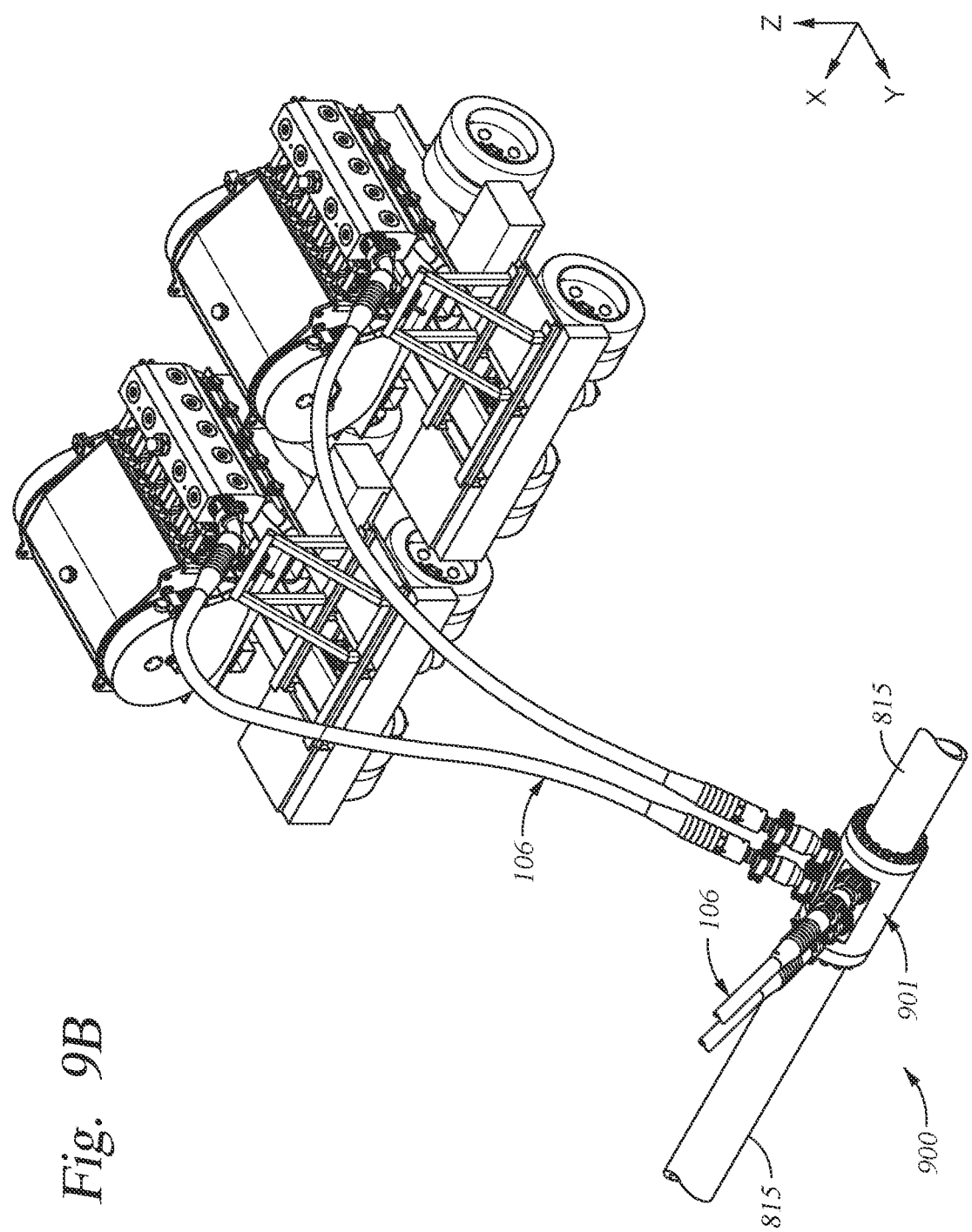
FIG. 9B is an enlarged schematic partial isometric view of a fluid injection system that includes a plurality of manifold devices of the implementation shown in FIG. 9A, according to one implementation.

FIG. 9B is an enlarged schematic partial isometric view of a fluid injection system 910 that includes a plurality of manifold devices 900 of the implementation shown in FIG. 9A, according to one implementation. The plurality of manifold blocks 901 are coupled to a plurality of manifold conduits 815.

Figure 9C:
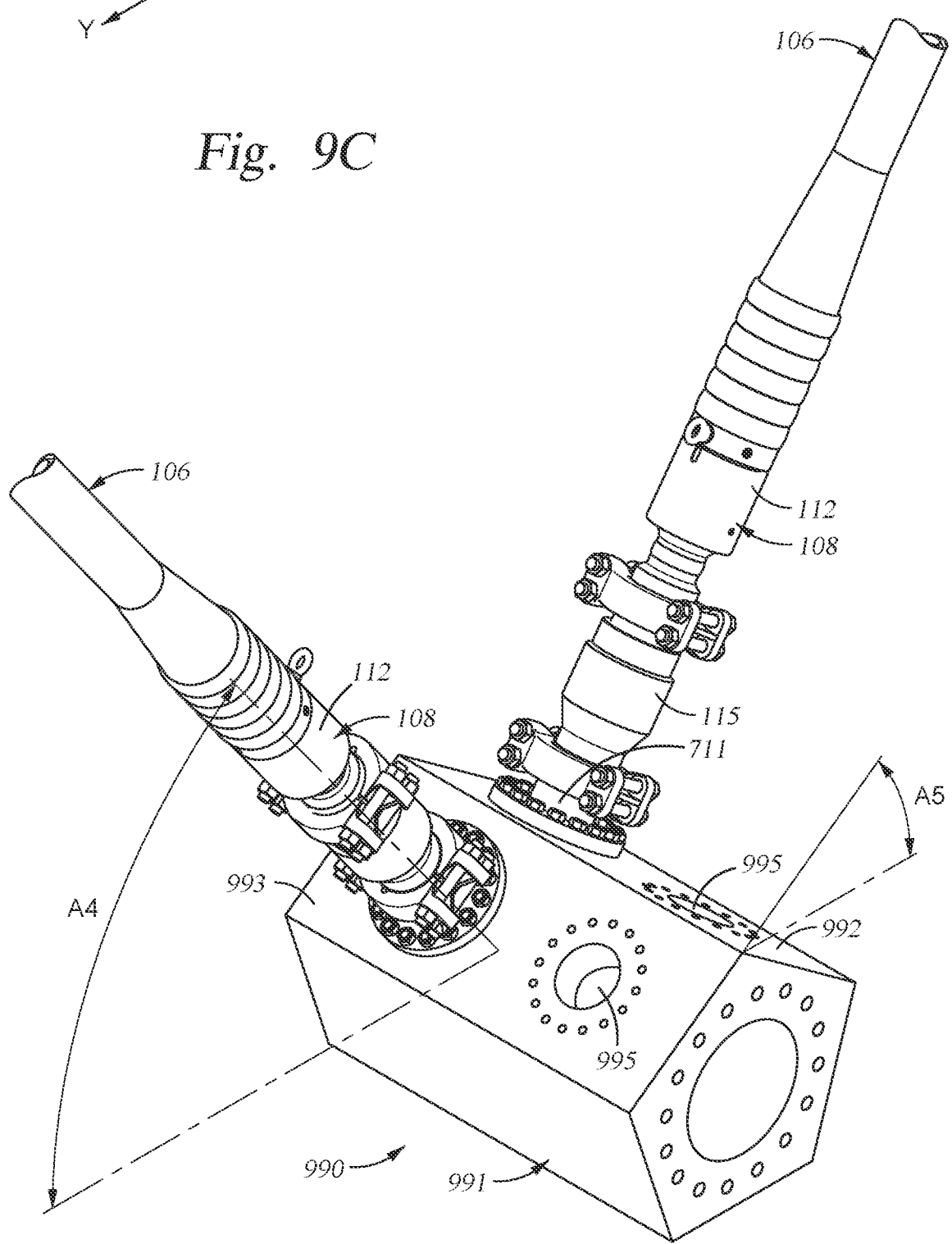
FIG. 9C is a schematic partial isometric view of a manifold device, according to one implementation.

FIG. 9C is a schematic partial isometric view of a manifold device 990, according to one implementation. The manifold device 990 is similar to the manifold device 900 shown in FIG. 9A, and includes one or more of the features, components, aspects, and/or properties thereof. The manifold device 990 includes a manifold block 991 that is similar to the manifold block 901 shown in FIG. 9A. The manifold block 991 is pentagonal in shape, and the manifold block 901 is circular in shape. The manifold block 991 includes a first tapered outer surface 993 formed at the taper angle A5 and a second tapered outer surface 992 formed at the taper angle A5. The second tapered outer surface 992 is formed on a side that opposes the side of the first tapered outer surface 993. In FIG. 9C, two hose openings 995 are shown in the manifold block 991 for fluidly coupling to two flexible hoses 106 which are not shown in FIG. 9C.

Figure 10A:
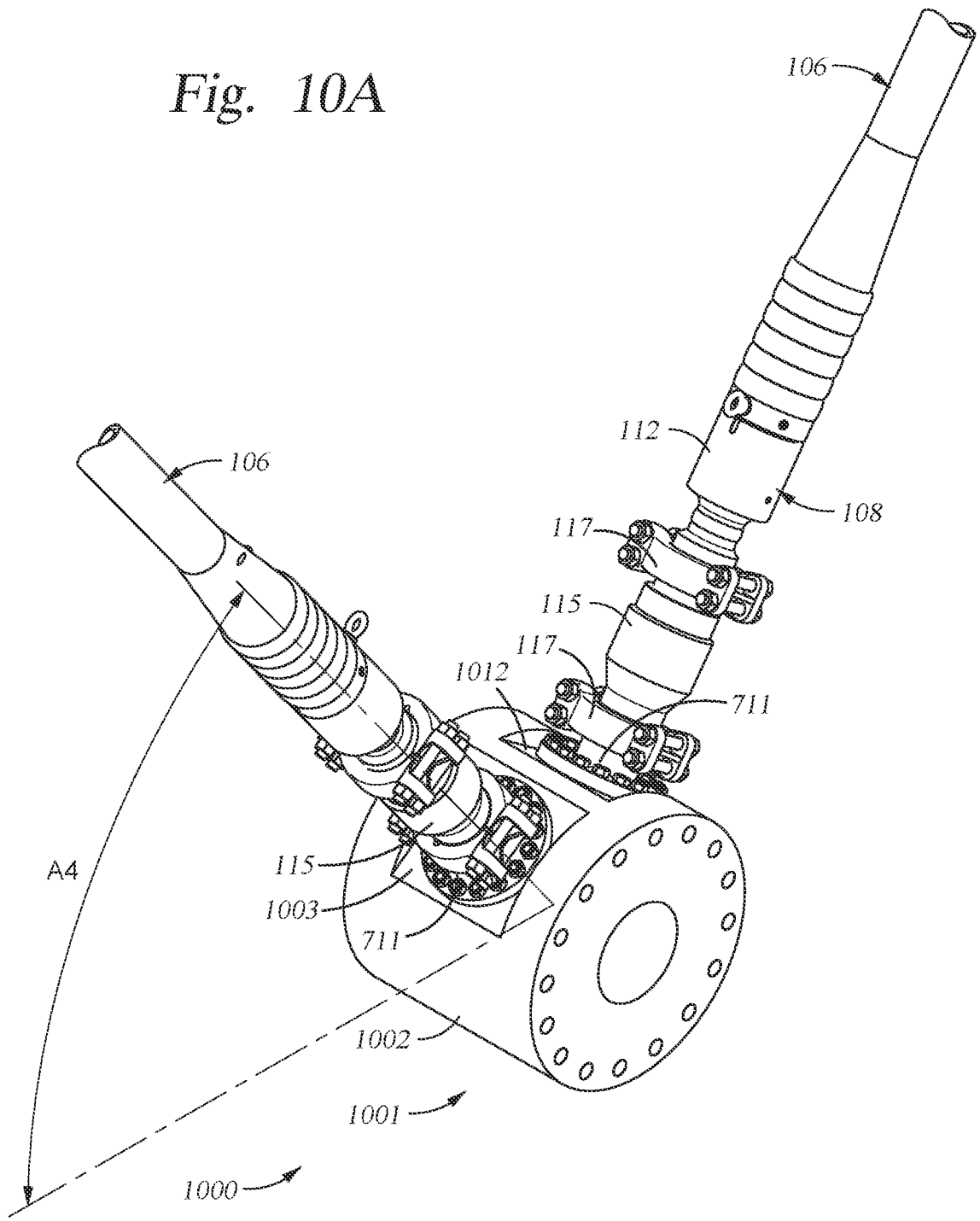
FIG. 10A is a schematic partial isometric view of a manifold device, according to one implementation.

FIG. 10A is a schematic partial isometric view of a manifold device 1000, according to one implementation. The manifold device 1000 includes a manifold block 1001 and a plurality of flexible hoses 106 coupled to the manifold block 1001. The manifold block 1001 is shorter than the manifold block 901 shown in FIG. 9. The manifold block 1001 includes a first recessed outer surface 1003 formed in an outer circumferential surface 1002, and a second recessed outer surface 1012 formed on a side of the manifold block 1001 that is opposite of the first recessed outer surface 1003. The first recessed outer surface 1003 is similar to the first recessed outer surface 903, and is shorter than the first recessed outer surface 903. The second recessed outer surface 1012 is similar to the second recessed outer surface 912, and is shorter than the second recessed outer surface 912.

The present disclosure contemplates that the valves 115 may be omitted. The present disclosure also contemplates that the second end fittings 112 of the flexible hoses 106 may be coupled directly to the respective first recessed outer surface 1003 and the second recessed outer surface 1012.

Figure 10B:
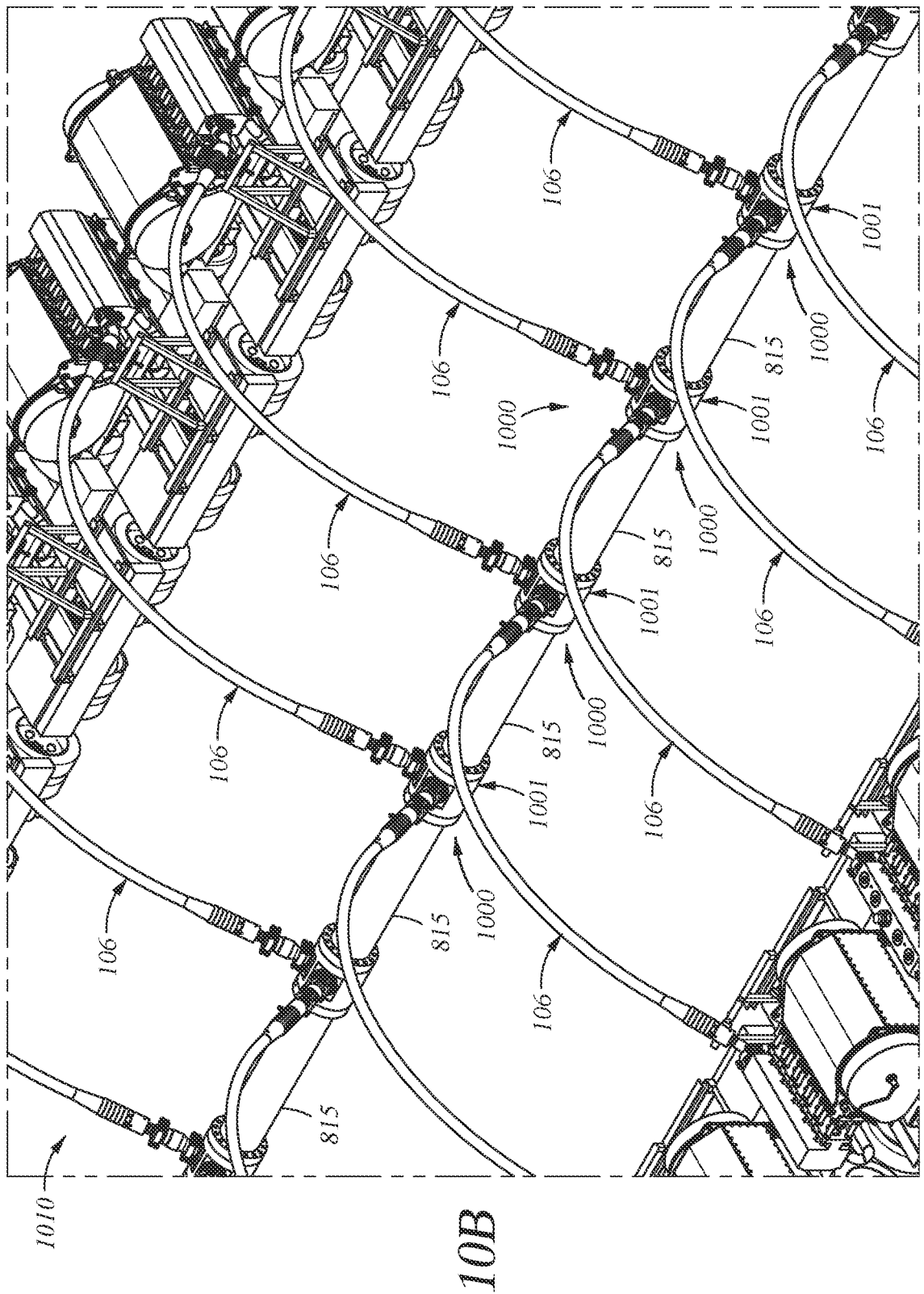
FIG. 10B is an enlarged schematic partial isometric view of a fluid injection system that includes a plurality of manifold devices of the implementation shown in FIG. 10A, according to one implementation.

FIG. 10B is an enlarged schematic partial isometric view of a fluid injection system 1010 that includes a plurality of manifold devices 1000 of the implementation shown in FIG. 10A, according to one implementation. The plurality of manifold blocks 1001 are coupled to a plurality of manifold conduits 815.

Figure 11:
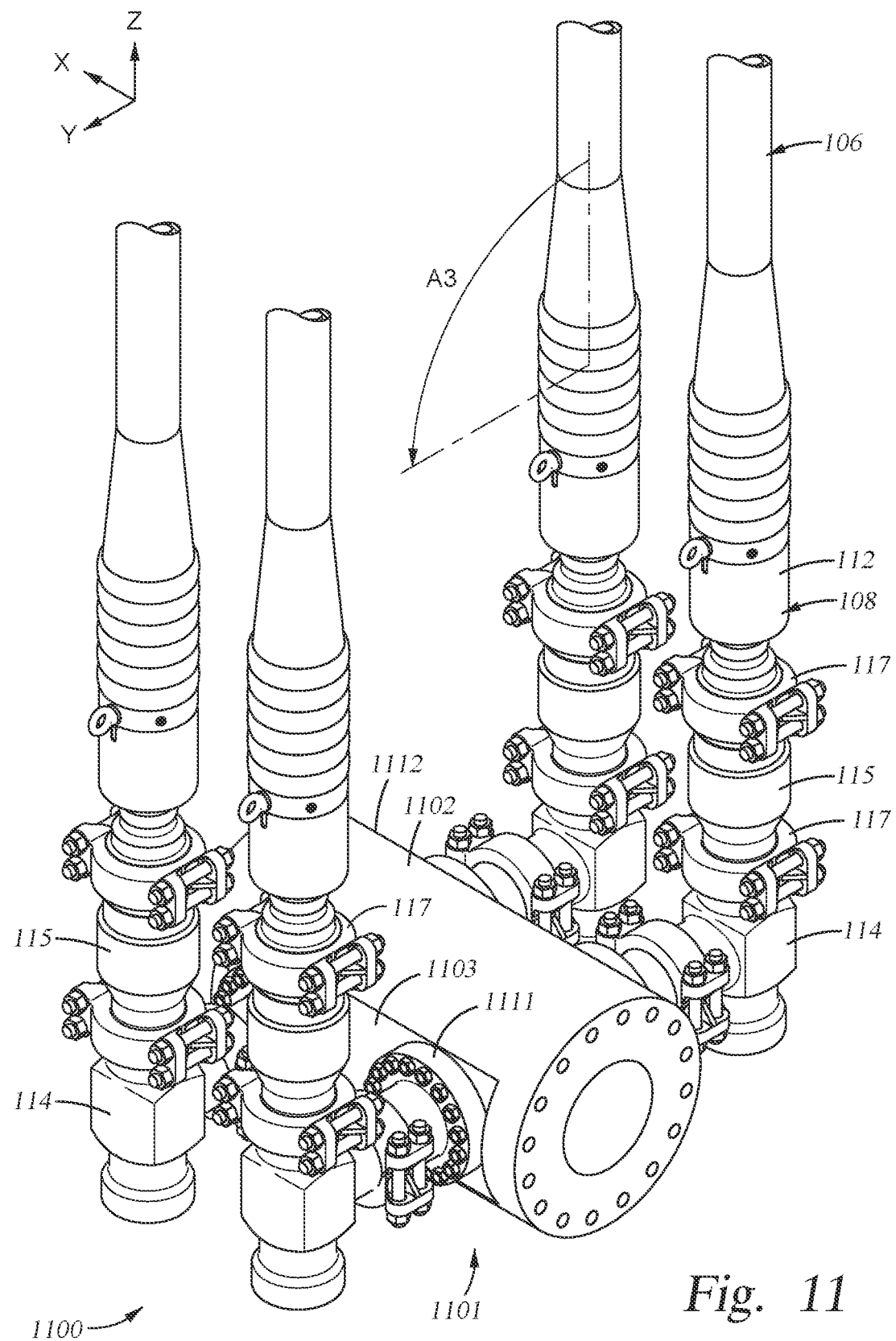
FIG. 11 is a schematic partial isometric view of a manifold device, according to one implementation.

FIG. 11 is a schematic partial isometric view of a manifold device 1100, according to one implementation. The manifold device 1100 includes a manifold block 1101 and a plurality of flexible hoses 106 coupled to the manifold block 1101. The manifold block 1101 includes a first recessed outer surface 1103 formed in an outer circumferential surface 1102, and a second recessed outer surface 1112 formed on a side of the manifold block 1101 that is opposite of the first recessed outer surface 1103. Each of the first recessed outer surface 1103 and the second recessed outer surface 1112 is a vertical surface that is disposed vertically and perpendicularly to the horizontal plane (e.g., the X-Y plane). The second end fittings 112 are oriented vertically and perpendicularly to the horizontal plane (e.g., the X-Y plane). The present disclosure contemplates that the second end fittings 112 can be oriented horizontally and in the horizontal plane (e.g., the X-Y plane). In one embodiment, which can be combined with other embodiments, the angled joints 114 are omitted and the second end fittings 112 are oriented horizontally.

The second end fittings 112 are coupled to the valves 115, and the valves 115 are coupled to angled joints 114. Each of the angled joints 114 is coupled to the respective vertical surface 1103, 1112 through a flange 1111.

The present disclosure contemplates that the valves 115 and/or the angled joints 114 may be omitted. The present disclosure also contemplates that the second end fittings 112 of the flexible hoses 106 may be coupled directly to the respective first recessed outer surface 1103 and the second recessed outer surface 1112.

Figure 12A:
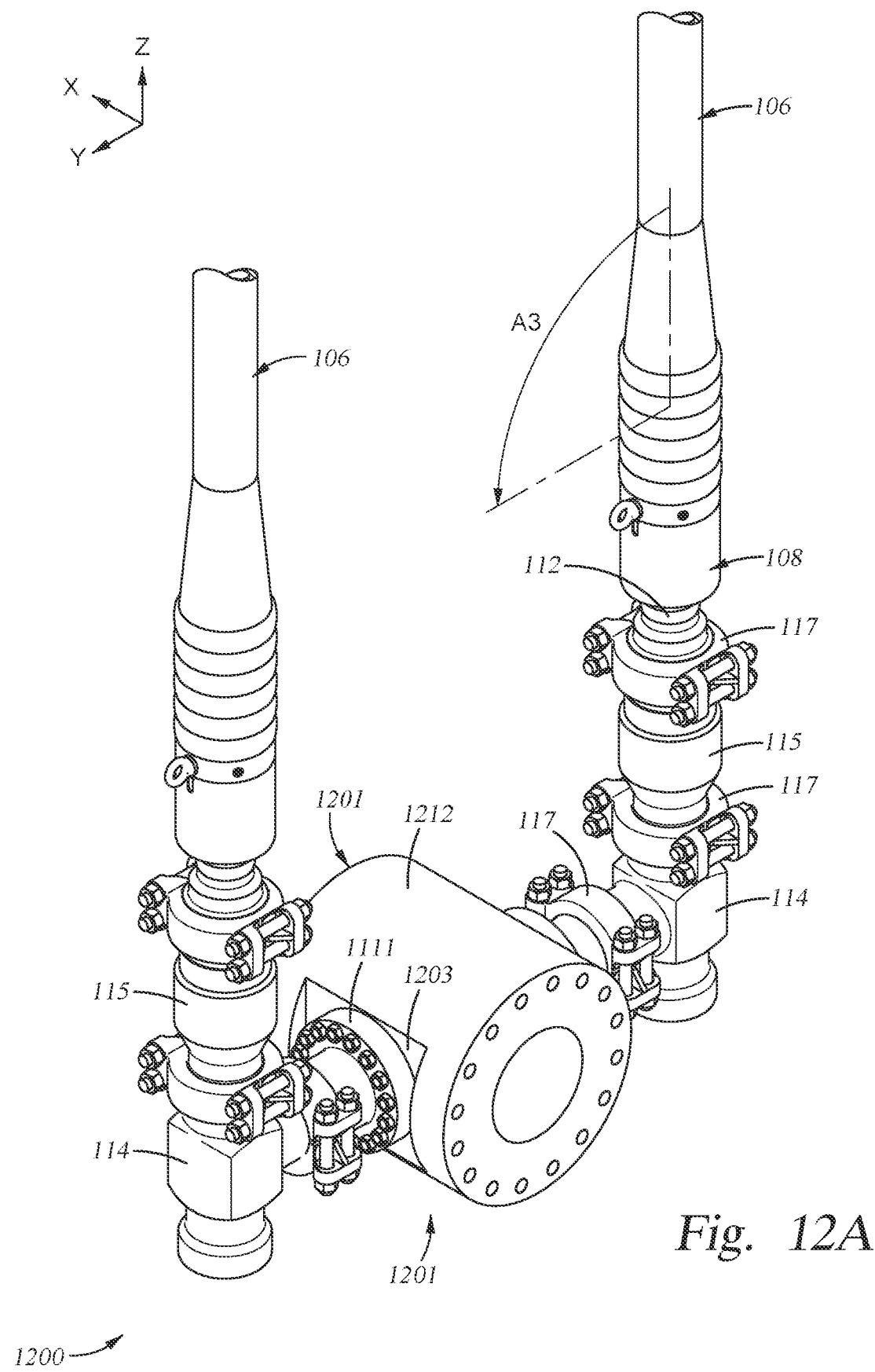
FIG. 12A is a schematic partial isometric view of a manifold device, according to one implementation.

FIG. 12A is a schematic partial isometric view of a manifold device 1200, according to one implementation. The manifold device 1200 includes a manifold block 1201 and a plurality of flexible hoses 106 coupled to the manifold block 1201. The manifold block 1201 is shorter than the manifold block 1101 shown in FIG. 11. The manifold block 1201 includes a first recessed outer surface 1203 formed in an outer circumferential surface 1202, and a second recessed outer surface 1212 formed on a side of the manifold block 1201 that is opposite of the first recessed outer surface 1203. The first recessed outer surface 1203 is similar to the first recessed outer surface 1103, and is shorter than the first recessed outer surface 1103. The second recessed outer surface 1212 is similar to the second recessed outer surface 1112, and is shorter than the second recessed outer surface 1112.

The present disclosure contemplates that the valves 115 and/or the angled joints 114 may be omitted. The present disclosure also contemplates that the second end fittings 112 of the flexible hoses 106 may be coupled directly to the respective first recessed outer surface 1203 and the second recessed outer surface 1212.

Figure 12B:
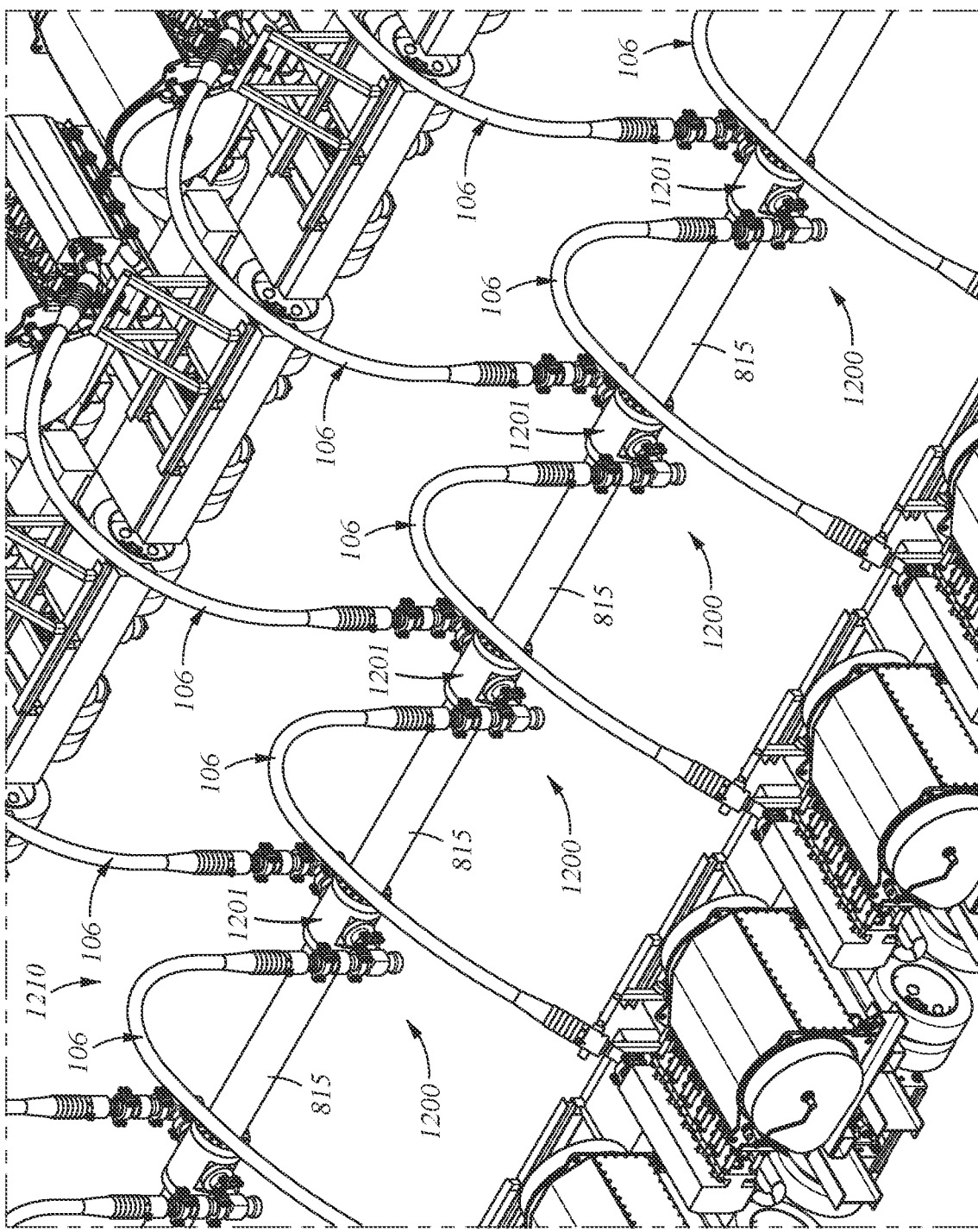
FIG. 12B is a schematic partial isometric view of a fluid injection system that includes a plurality of manifold devices of the implementation shown in FIG. 12A, according to one implementation.

FIG. 12B is an enlarged schematic partial isometric view of a fluid injection system 1210 that includes a plurality of manifold devices 1200 of the implementation shown in FIG. 12A, according to one implementation. The plurality of manifold blocks 1201 are coupled to a plurality of manifold conduits 815.

Figure 13A:
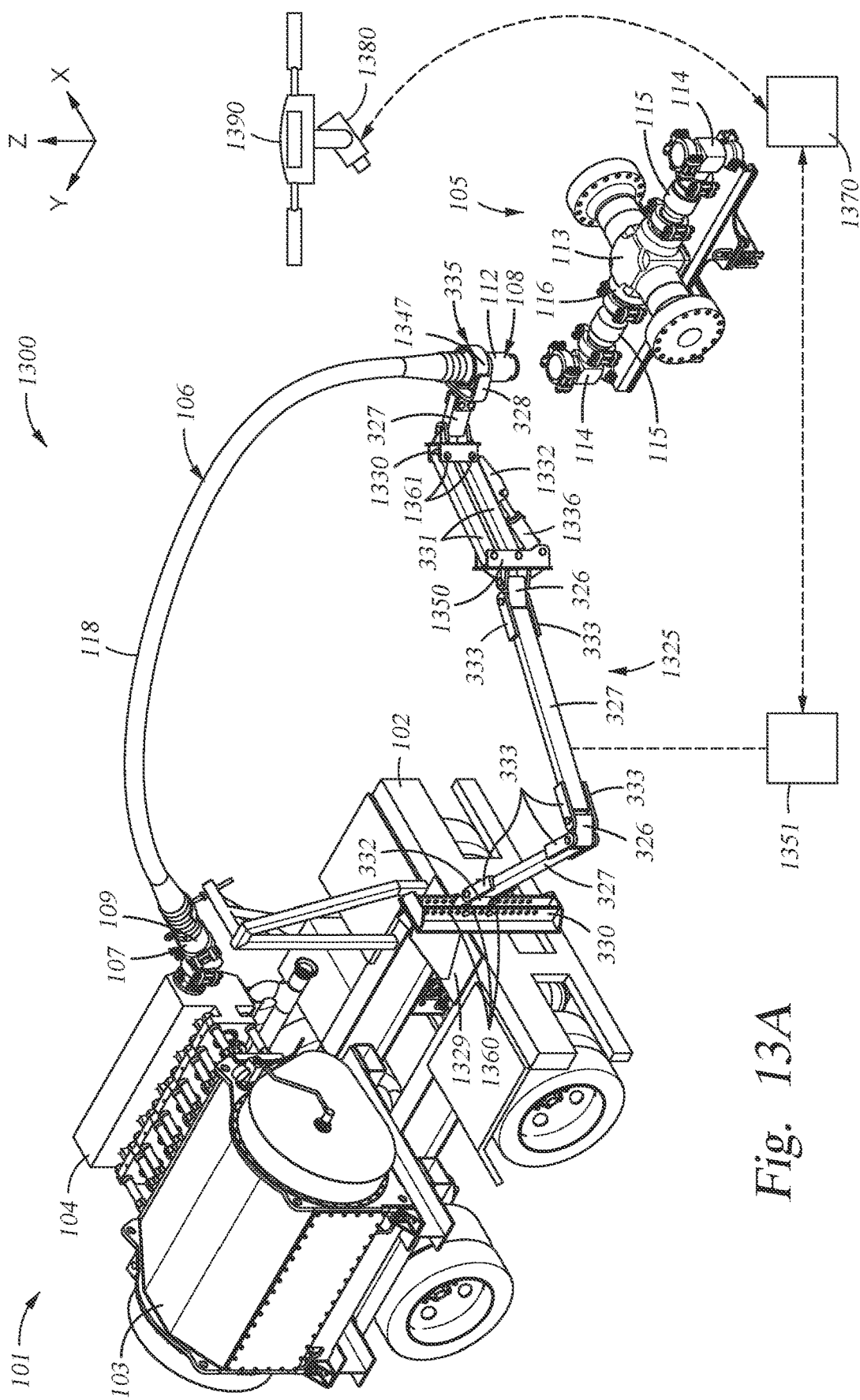
FIG. 13A is a schematic partial isometric front view of a fluid injection system including an articulation arm device at a wellhead site, according to one implementation.

FIG. 13A is a schematic partial isometric front view of a fluid injection system 1300 including an articulation arm device 1325 at a wellhead site, according to one implementation. In FIG. 13A, the articulation arm device 1325 is in an extended position.

The articulation arm device 1325 is mounted to the trailer 102. The articulation arm device 1325 includes a base 1329 mounted to the trailer 102, a first vertical column 330 coupled to the base 1329, a first adjustable block 332 coupled to the first vertical column 330, and a first arm 327 coupled to the first adjustable block 332 through a hinge plate 326. In one embodiment, which can be combined with other embodiments, the first adjustable block 332 may be an upper adjustable block, and the articulation arm device 1325 may include a lower adjustable block coupled to the first arm 327 and movable along the first vertical column 330.

In one embodiment, which can be combined with other embodiments, the base 1329 and the first vertical column 330 are integrally formed as a single body mounted to the trailer 102. A second arm 327 is coupled to the first arm 327 through a hinge plate 326. A second vertical column 1350 is coupled to the second arm 327 through a hinge plate 326. A pair of bars 331 are coupled between the second vertical column 1350 and a third vertical column 1330. An end arm 327 (a third arm) is coupled to the third vertical column 1330. A connection device 328 is coupled to the end arm 327 through a hinge plate 326. The present disclosure contemplates that the end arm 327 may be omitted such that the second arm 327 is an end arm, and the connection device 328 is coupled to the third vertical column 1330 through the end arm 327 that may be a hinge plate. In one embodiment, which can be combined with other embodiments, the end arm 327 is a hinge plate.

The flexible hose 106 includes a rotatable joint 335 disposed about the flexible hose 106. The rotatable joint 335 includes an inner ring disposed about the second end 108 of the flexible hose 106 and an outer ring 1347 disposed about the inner ring. The outer ring 1347 is rotatable relative to the inner ring. The connection device 328 includes a pair of prongs 1348 that extend inward and into the outer ring 1347 of the rotatable joint 335. The rotatable joint 335 and the prongs 1348 are at least part of a disconnection device that quickly disconnects the connection device 328 from the rotatable joint 335 of the flexible hose 106.

The articulation arm device 1325 also includes a plurality of pairs of links 333, and an actuator 1336 disposed between the second vertical column 1350 and the third vertical column 1330. The actuator 1336 is coupled between the second vertical column 1350 and padeyes of a lower bar of the pair of bars 331. In one embodiment, which can be combined with other embodiments, the actuator 1336 is a double-arm actuator. The actuator 1336 can be hydraulic, pneumatic, electric, mechanical, and/or any combination thereof for actuating the articulation arm device 1325 to manipulate and/or support the flexible hose 106. The actuator 1336 may also include a spring to create a near "zero-g" effect.

The first vertical column 330 includes a first plurality of pin openings 1360 for adjusting the height of the first adjustable block 332 that is coupled to the first arm 327. The first vertical column 330 may be a drop hitch. The connection device 328 of the articulation arm device 1325 includes the rotatable joint 335 to allow rotation and pivoting of the connection device 328 that connects to the flexible hose 106.

The third vertical column 1330 includes a second plurality of pin openings 1361. The present disclosure contemplates that the third vertical column 1330 may include pin openings 1361 for adjusting the height of the end arm 327. The third vertical column 1330 may be a drop hitch.

In one embodiment, which can be combined with other embodiments, one or more of the links 333 may be replaced with padeyes. In such an embodiment, the lower adjustable block is coupled to a lower padeye of a first arm 327 of the articulation arm device 1325, and the upper adjustable block is coupled to an upper padeye of the first arm 327. A first end of the second arm 327 is coupled between a lower padeye and an upper padeye of the first arm 327. A second end of the second arm 327 is coupled between two padeyes of the second vertical column 1350. In such an embodiment, one or more of the hinge plates 326 may be omitted.

The actuator 1336 is coupled between the second vertical column 1350 and padeyes 1332 of the lower bar 331. Actuation of the actuator 1336 biases the lower bar 331 to raise and/or lower the third vertical column 1330. In one embodiment, which can be combined with other embodiments, the end arm 327 is a pivotable rod, and the connection device 328 is coupled to the pivotable rod using a sleeve of the connection device 328. The pivotable rod is coupled between two padeyes of the third vertical column 1330 and is pivotable in a horizontal plane (e.g., the X-Y plane).

Figure 13B:
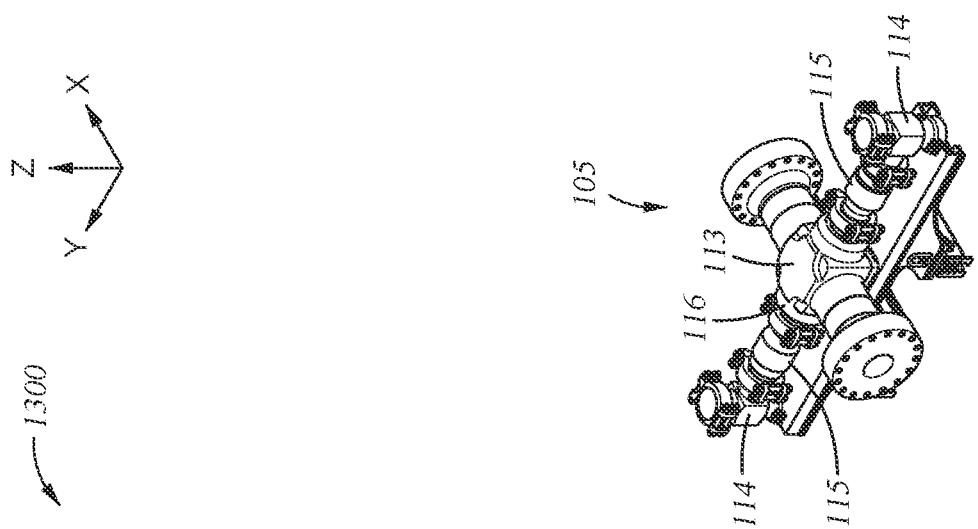
FIG. 13B is a schematic partial isometric front view of the fluid injection system shown in FIG. 13A, according to one implementation.
Figure 13B:
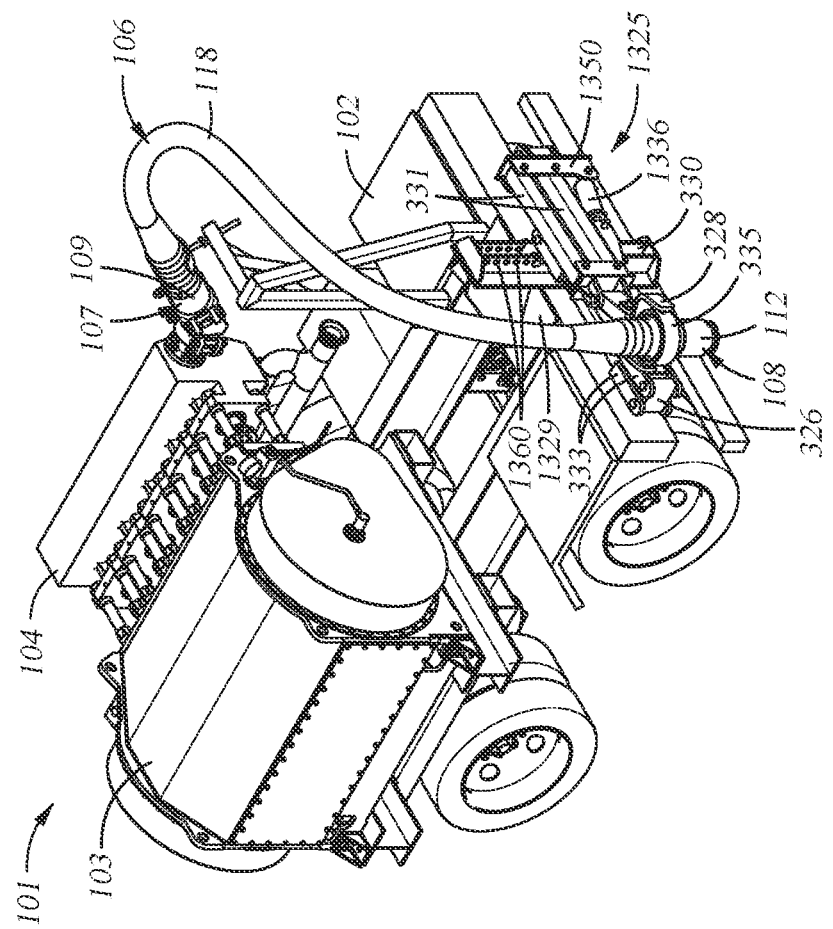

FIG. 13B is a schematic partial isometric front view of the fluid injection system 1300 shown in FIG. 13A, according to one implementation. In FIG. 13B, the articulation arm device 1325 is in a retracted position. In FIG. 13B, the connection device 328 of the articulation arm device 1325 supports the second end fitting 112 of the second end 108 vertically and perpendicularly to the horizontal plane (e.g., the X-Y plane) in a storage position on the trailer 102 of the pump 101.

Figure 13C:
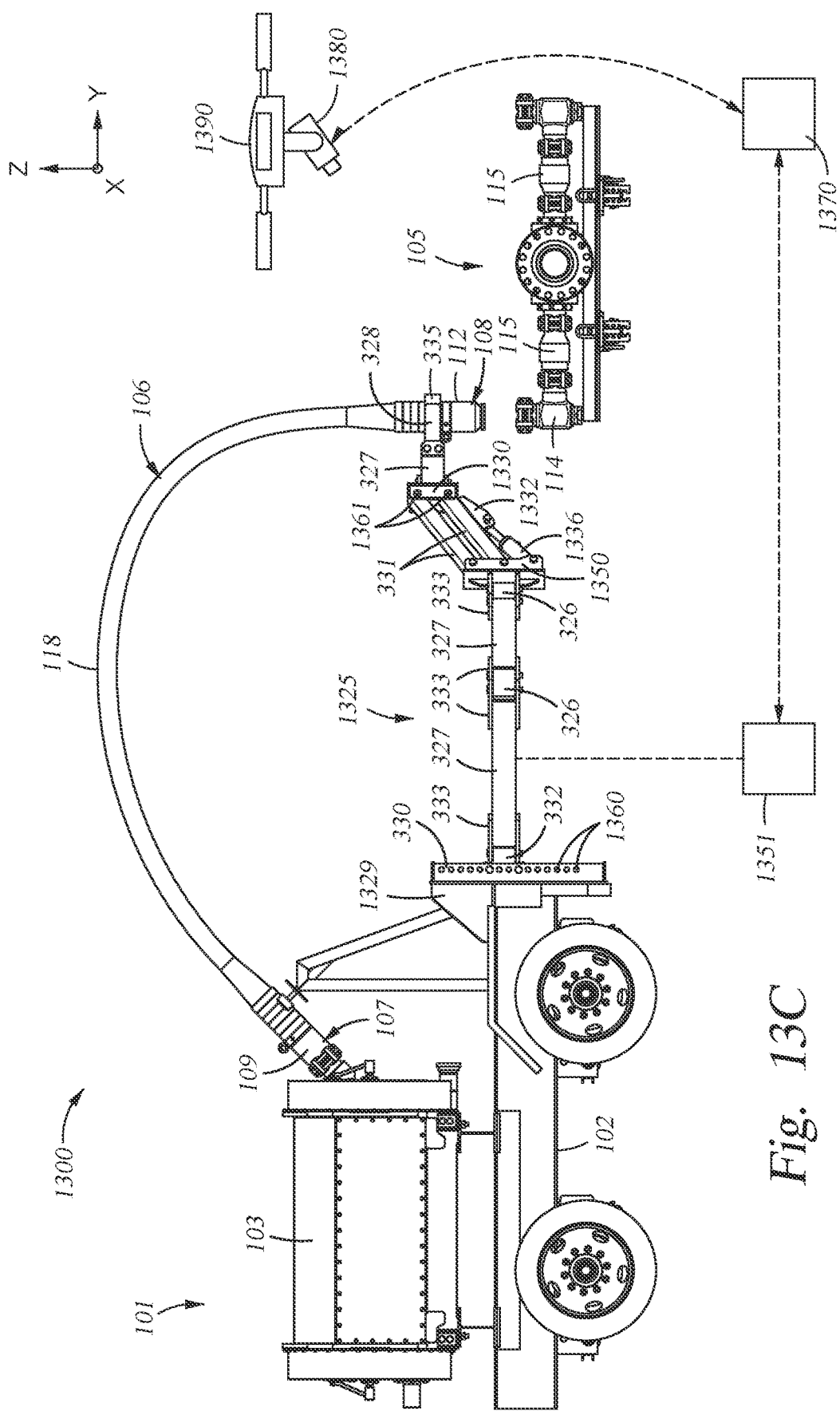
FIG. 13C is a schematic partial side view of the fluid injection system shown in FIG. 13A in the extended position, according to one implementation.

FIG. 13C is a schematic partial side view of the fluid injection system 1300 shown in FIG. 13A in the extended position, according to one implementation. In FIG. 13C, the fluid injection system 1300 is shown after the second end 108 of the flexible hose 106 is positioned above the angled joint 114 to couple the second end 108 to the pump manifold 105.

Figure 13D:
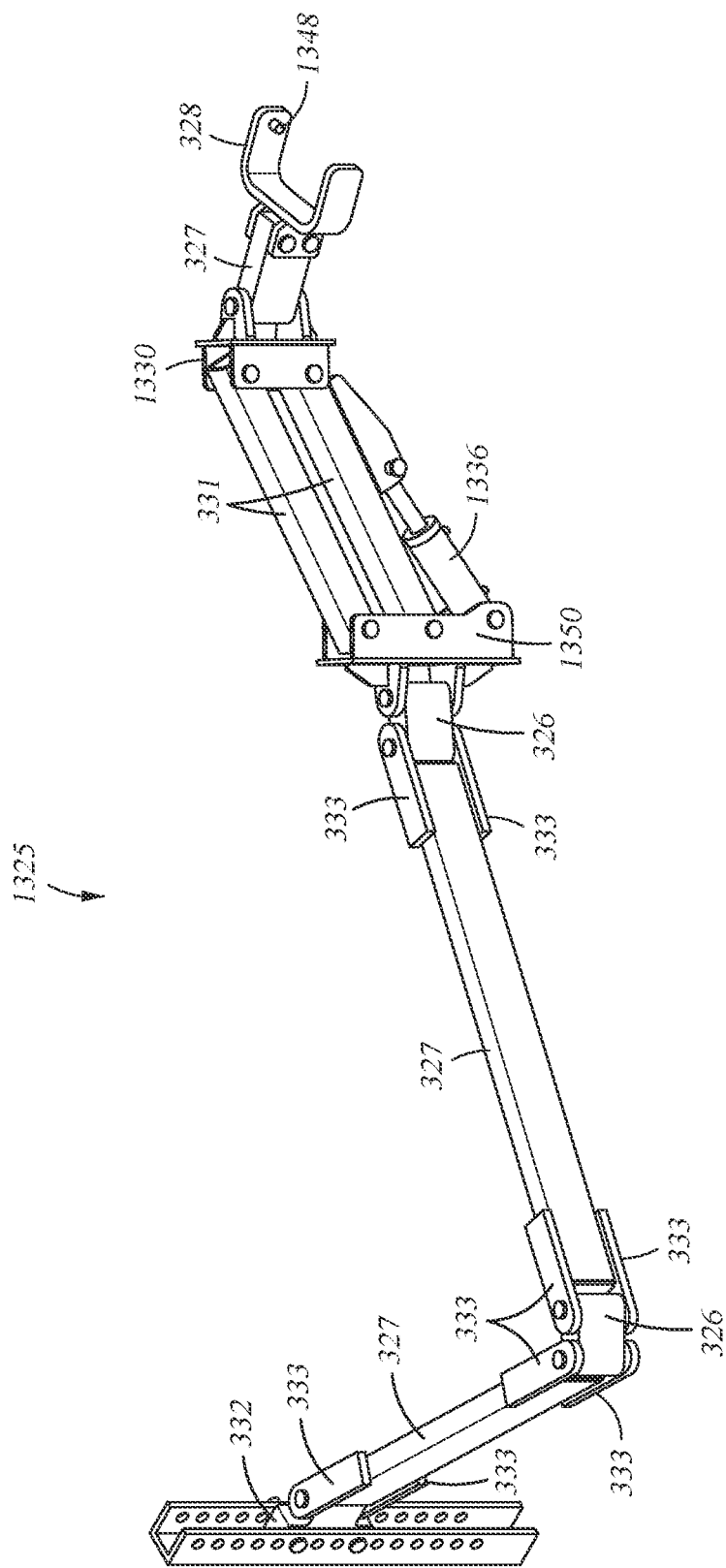
FIG. 13D is a schematic isometric view of the articulation arm device shown in FIG. 13A, according to one implementation.

FIG. 13D is a schematic isometric view of the articulation arm device 1325 shown in FIG. 13A, according to one implementation.

Figure 14A:
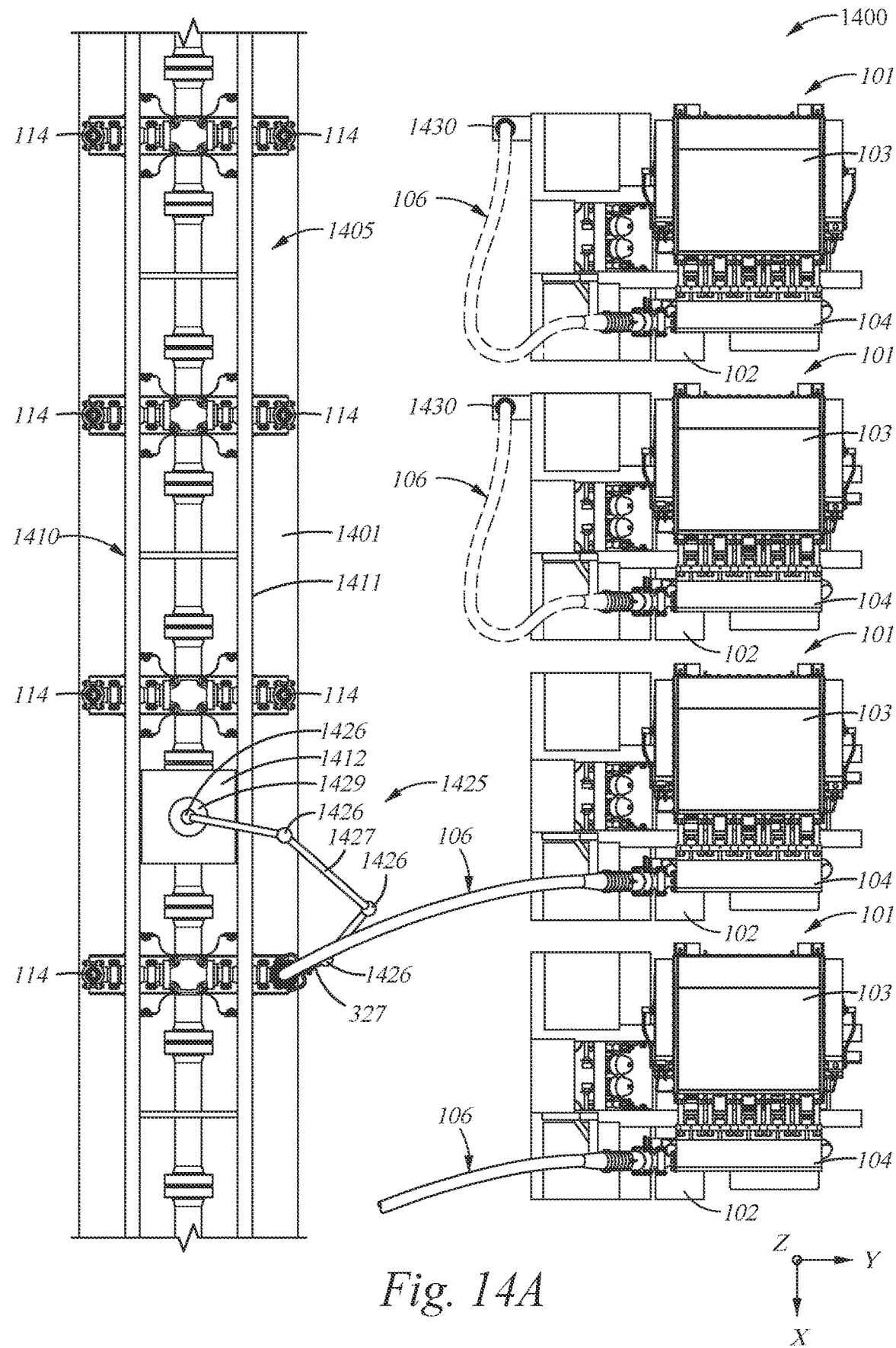
FIG. 14A is a schematic partial top view of a fluid injection system, according to one implementation.
Figure 14B:
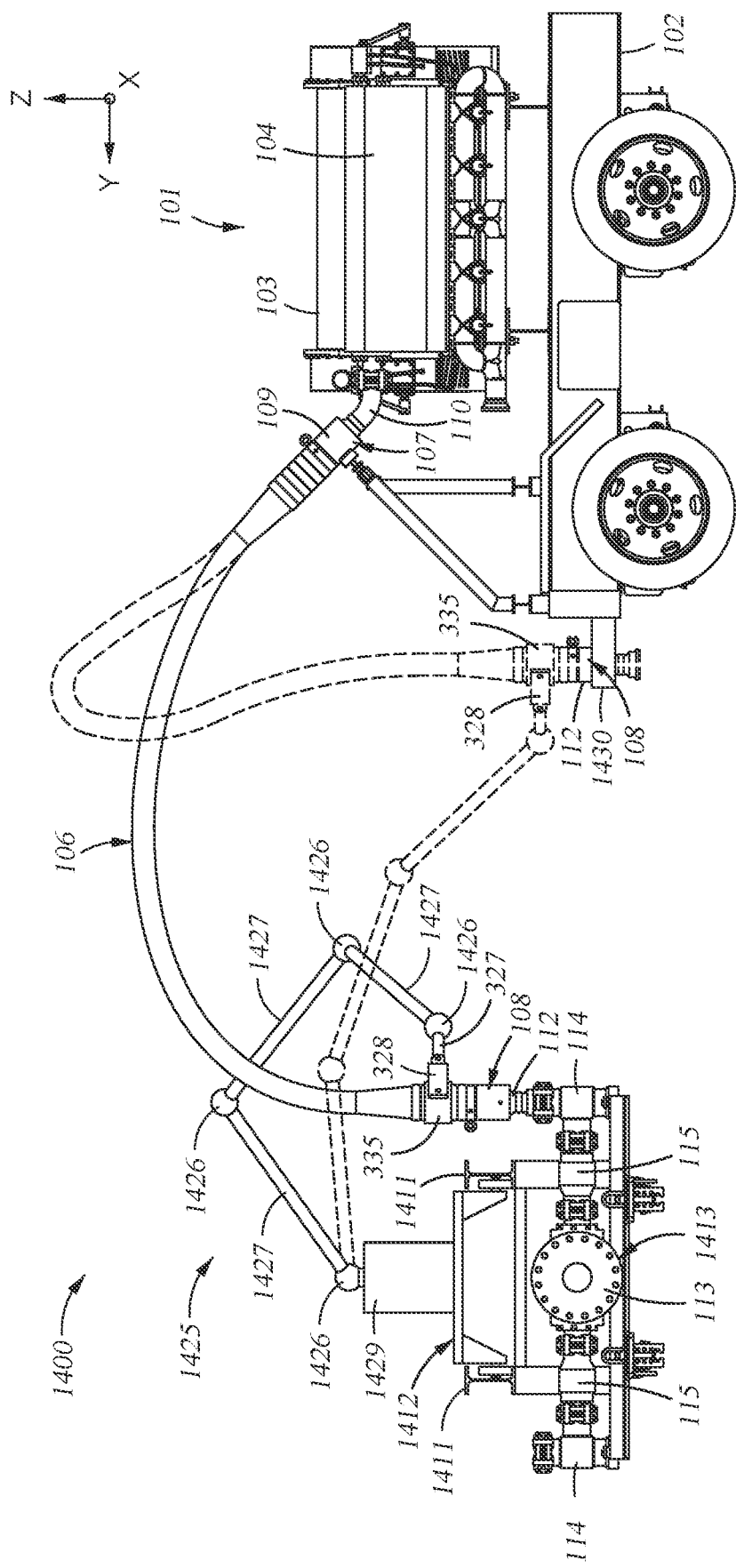
FIG. 14B is a schematic partial side view of the fluid injection system shown in FIG. 14A, according to one implementation.

FIG. 14A is a schematic partial top view of a fluid injection system 1400, according to one implementation. FIG. 14B is a schematic partial side view of the fluid injection system 1400 shown in FIG. 14A, according to one implementation.

The fluid injection system 1400 includes a pump manifold 1405 mounted on a platform 1401. The platform 1401 may include a skid and/or a trailer. The pump manifold 1405 includes a plurality of manifold blocks 113 disposed along a mainline 1413 of the pump manifold 1405. The pump manifold 1405 also includes a plurality of angled joints 114 and a plurality of valves 115 on opposing sides of the mainline 1413. The pump manifold 1405 includes an articulation arm system 1410 mounted to the platform 1401 and above the mainline 1413. The articulation arm system 1410 includes a pair of rails 1411 mounted to the platform 1401 and a trolley 1412 disposed between the rails 1411 above the pump manifold 1405. The trolley 1412 is movable along the rails 1411. The articulation arm system 1410 also includes an articulation arm device 1425 mounted to and movable using the trolley 1412. In one embodiment, which can be combined with other embodiments, the articulation arm system 1410 including the articulation arm device 1425 functions as an overhead crane system while facilitating reduction of complexities and/or components used in overhead crane systems.

The articulation arm device 1425 can be similar to the 225, 325, 1325 articulation arm devices, and may include one or more of the aspects, features, components, and/or properties thereof. The articulation arm device 1425 includes a base 1429 mounted to the trolley 1412 and one or more pivot joints 1426 (four are shown) coupled between two or more arms 1427 (three are shown). The articulation arm device 1425 also includes an end arm 317 and a connection device 328 that connects to a rotatable joint 335 disposed about the flexible hose 106. A retainer 1430 is mounted to the trailer 102. The second end fitting 112 at the second end 108 of the flexible hose 106 is retained in the retainer 1430 during transportation of the flexible hoses 106 on the trailers 102.

The articulation arm device 1425 is used to move the second end 108 out of the retainer 1430 and over the angled joint 114 to connect the flexible hose 106 to the angled joint 114. The articulation arm device 1425 is movable using the trolley 1412 such that a single articulation arm device 1425 can be used to quickly and reliably connect and disconnect a plurality of flexible hoses 160 to and from the pump manifold 1405. In FIG. 14A and FIG. 14B, the flexible hoses 106 are shown in ghost as retained in the retainers 1430, and in solid as connected to the angled joints 114 of the pump manifold 1405. The trolley 1412 and the articulation arm device 1425 mounted thereto are movable horizontally along the rails 1411 past a plurality of trailers 102 of a plurality of pumps 101 such that a single articulation arm device 1425 can be used to connect and disconnect second ends 108 of a plurality of flexible hoses 106 of different pumps 101 to and from a plurality of angled joints 114.

Figure 15:
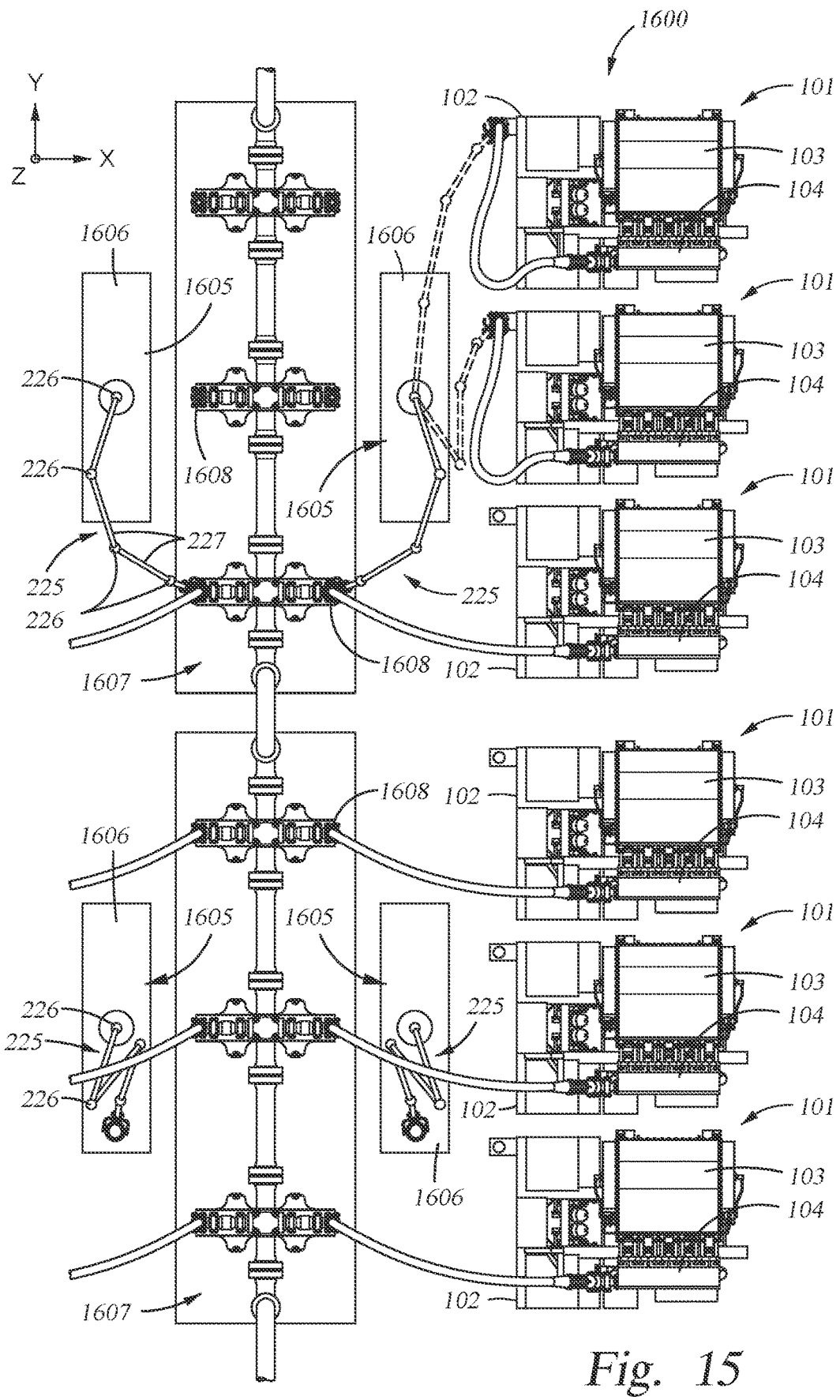
FIG. 15 is a schematic partial top view of a fluid injection system deployed at a wellhead site, according to one implementation.

FIG. 15 is a schematic partial top view of a fluid injection system 1600 deployed at a wellhead site, according to one implementation. The fluid injection system 1600 includes an articulation arm pod system. The fluid injection system 1600 includes a plurality of articulation arm pods 1605 mounted to the ground. Each articulation arm pod 1605 of the plurality of articulation arm pods 1605 includes a respective articulation arm device 225 mounted to a platform 1606, such as a skid and/or a trailer, that is mounted to the ground. Each articulation arm pod 1605 is disposed between one or more pumps 101 of a plurality of pumps 101 and one or more pump manifolds 1607 of a plurality of pump manifolds 1607. The articulation arm device 225 of each articulation arm pod 1605 is configured to couple a plurality of flexible hoses 106 to and from a plurality of angled joints 1608 of the pump manifolds 1607.

Figure 16:
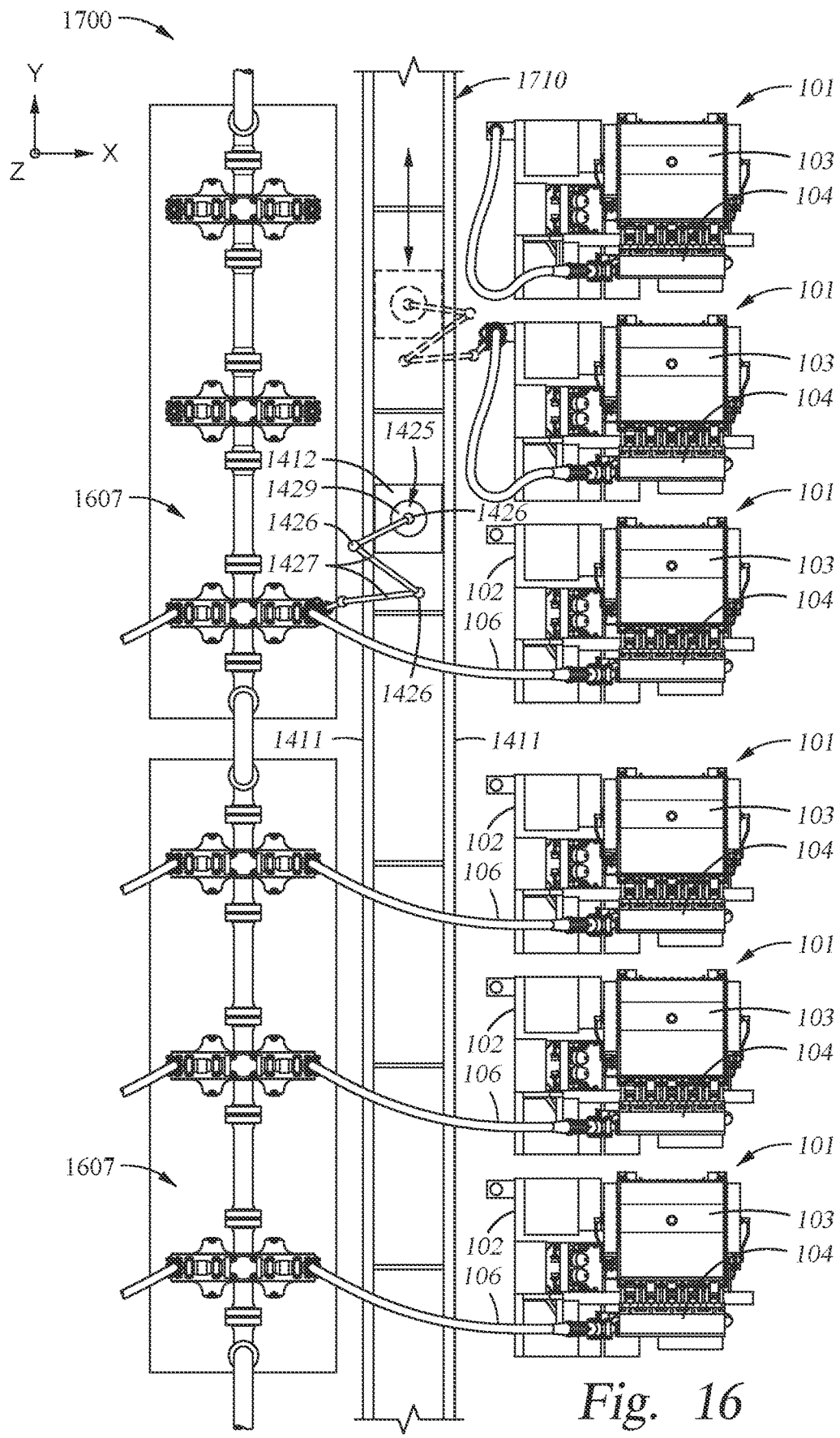
FIG. 16 is a schematic partial top view of a fluid injection system deployed at a wellhead site, according to one implementation.

FIG. 16 is a schematic partial top view of a fluid injection system 1700 deployed at a wellhead site, according to one implementation. The fluid injection system 1700 includes an articulation arm system 1710 that is similar to the articulation arm system 1410, and includes one or more aspects, features, components, and/or properties thereof. The articulation arm system 1710 is mounted to the ground between the pumps 101 and the pump manifolds 1607. The pair of rails 411 are mounted to the ground between one or more pumps 101 and one or more pump manifolds 1607. The trolley 412 having the articulation arm device 1425 mounted thereto is movable along the pair of rails 411 horizontally between the one or more pumps 101 and the one or more pump manifolds 1607.

Figure 17B:
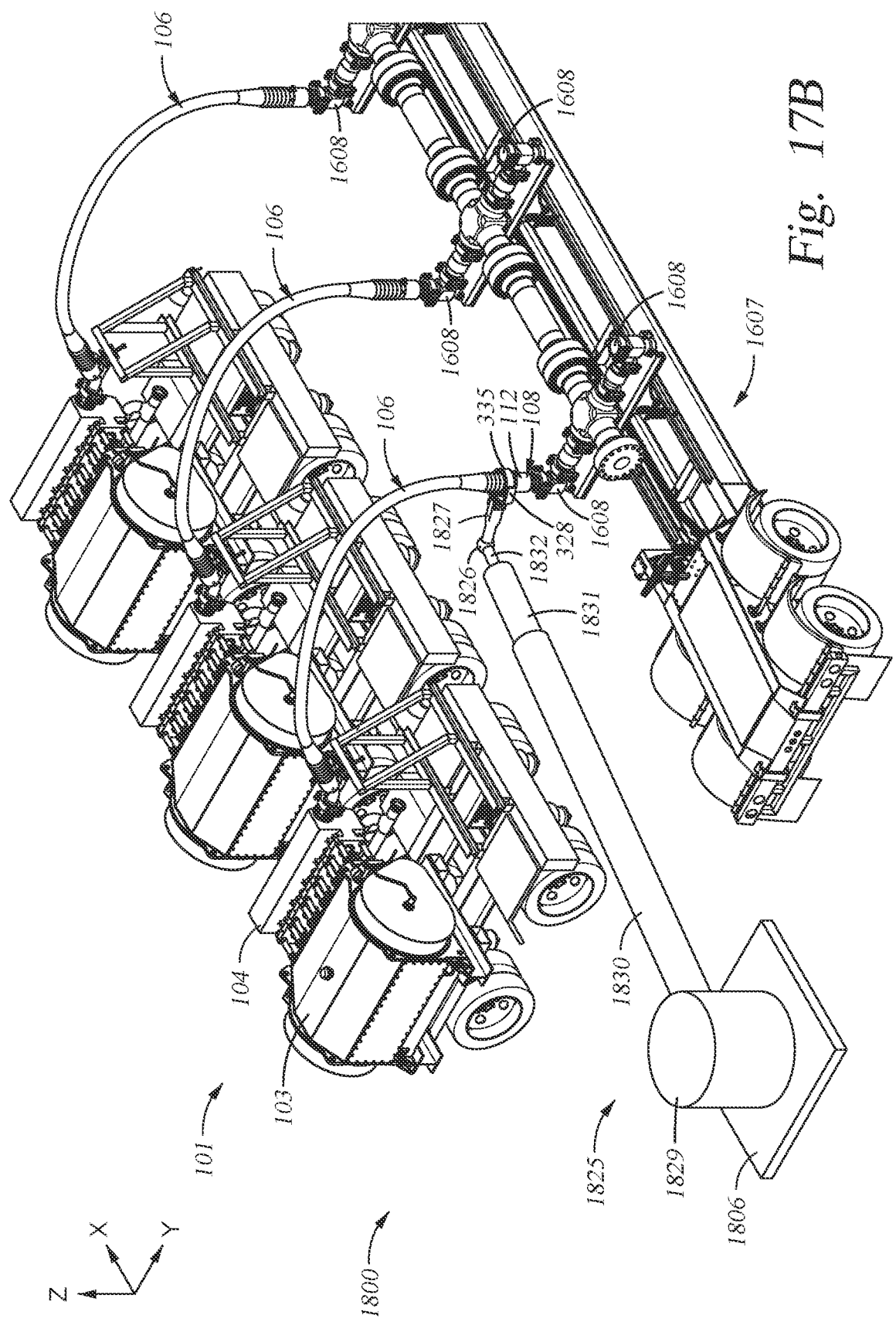
FIG. 17B is a schematic partial perspective view of the fluid injection system shown in FIG. 17A, according to one implementation.

FIG. 17A is a schematic partial top view of a fluid injection system 1800 deployed at a wellhead site, according to one implementation. FIG. 17B is a schematic partial perspective view of the fluid injection system 1800 shown in FIG. 17A, according to one implementation.

The fluid injection system 1800 includes an articulation arm device 1825 mounted on the ground. The articulation arm device 1825 is mounted between the pumps 101 and the pump manifolds 1607 and is horizontally offset from the pumps 101 and the pump manifolds 1607 (as shown in FIG. 17A). The articulation arm device 1825 is mounted to a platform 1806, such as a skid and/or a trailer, mounted on the ground.

The articulation arm device 1825 includes a base 1829 mounted to the platform 1806 and an extendable boom coupled to the base 1829. The extendable boom includes a pivotable cylinder 1830 coupled to the base 1829. One or more rods 1831, 1832 are coupled to the pivotable cylinder 1830 and are extendable relative to the pivotable cylinder 1830. The articulation arm device 1825 includes a first rod 1831 coupled to the pivotable cylinder 1830 and a second rod 1832 coupled to the first rod 1831. The first rod 1831 is extendable outward relative to the pivotable cylinder 1830. The second rod 1832 is extendable outward relative to the first 1831. In one embodiment, which can be combined with other embodiments, the first rod 1831 and the second rod 1832 are configured to telescope into and out of the pivotable cylinder 1830. The articulation arm device 1825 includes one or more pivot joints 1826 and one or more arms 1827 coupled between the second rod 1831 and a connection device 328 of the articulation arm device 1825. A pivot joint 1826 is coupled to an end of the second rod 1832, and an arm 1827 is coupled between the pivot joint 1826 and the connection device 328. In one example, the arm 1827 is a hinge plate. In one example, the connection device 328 is pivotable relative to the arm 1827.

FIG. 18A is a schematic partial view of a fluid injection system 1900 deployed at a wellhead site, according to one implementation. The fluid injection system 1900 is similar to the fluid injection system 100 shown in FIGS. 1A-1C, and includes one or more of the features, components, aspects, and/or properties thereof.

The fluid injection system 1900 includes a manifold block 1913 of a pump manifold 1905. Part of the pump manifold 1905 is shown in FIG. 18A. The pump manifold 1905 is shown in FIG. 18B. The valves 115 are coupled to the angled joints 114 and the manifold block 1913 (through adapters 116) using one or more fasteners 1917 (such as clamps and/or hammer unions). The first end fitting 109 of the flexible hose 106 is coupled to the flange 111 that is coupled to the fluid end 104 of a pump 101. The first end fitting 109 is oriented horizontally and in a plane that is parallel to a horizontal plane (e.g., the X-Y plane). Although FIG. 18A illustrates the first end fitting 109 is coupled to the pump 101 in a horizontal orientation, the present disclosure contemplates that the first end fitting 109 may be coupled to the pump 101 in a vertical orientation or an angled orientation. The first end fitting 109 is coupled to the flange 111 using a disconnection device 1930 that is coupled to the first end fitting 109 at the first end 107. In one embodiment, which can be combined with other embodiments, the disconnection device 1930 is similar to the disconnection devices 440, 441, and/or 460 shown in FIGS. 4A-4C, and includes one or more of the features, components, aspects, and/or properties thereof. In one embodiment, which can be combined with other embodiments, the disconnection device 1930 is similar to the disconnection device used in relation to connection device 228 and/or the disconnection device used in relation to the connection device 328, and includes one or more of the features, components, aspects, and/or properties thereof.

The disconnection device 1930 can be mechanically actuated, pneumatically actuated, electrically actuated, and/or hydraulically actuated. In one embodiment, which can be combined with other embodiments, the disconnection device 1930 includes a fastener clamp device where tightening of one or more screws or movement of one or more pins clamps together a plurality of clamps (such as two clamps or three clamps) about a hub connection. In one embodiment, which can be combined with other embodiments, the disconnection device 1930 includes a hydraulic latch. The present disclosure contemplates that the disconnection device 1930 can be remotely operated and/or automatically operated in a fashion similar to the disconnection device 440 described above to connect and disconnect the disconnection device 1930 to and from the pump 101, such as by using a remote structure similar to the remote structure 470 described above and/or a camera similar to the camera 480 described above.

The second end fitting 112 is coupled to one of the angled joints 114 using a rotatable joint 1940, such as a swivel joint, at the second end 108. The rotatable joint 1940 facilitates allowing the second end fitting 112 of the second end 108 of the flexible hose 106 to pivot (e.g., rotate) relative to the pump manifold 1905. The first end fitting 109 of the second flexible hose 119 is coupled to a flange 111 that is coupled to the fluid end 104 of the second pump 120. The first end fitting 109 is coupled to the flange 111 of the second pump 120 using a disconnection device 1931 at the first end 107 that is similar to the disconnection device 1930, and includes one or more of the features, components, aspects, and/or properties thereof. The second end fitting 112 of the second flexible hose 119 is coupled to one of the angled joints 114 through a rotatable joint 1948 at the second end 108 of the second flexible hose 119. The rotatable joint 1948 is similar to the rotatable joint 1940, and includes one or more of the features, components, aspects, and/or properties thereof. The rotatable joint 1948 facilitates allowing the second end fitting 112 of the second end 108 of the second flexible hose 119 to pivot (e.g., rotate) relative to the pump manifold 1905. The first ends 107 of the flexible hoses 106, 119 can be moved to pivot (e.g., rotate) the seconds ends 108 of the flexible hoses 106, 119 with the rotatable joints 1940, 1948 relative to the pump manifold 1905 such that the first ends 107 can be pivoted without needing to first disconnect the seconds ends 108 from the pump manifold 1905.

FIG. 18B is a schematic partial view of the pump manifold 1905 of the fluid injection system 1900 shown in FIG. 18A, according to one implementation. The pump manifold 1905 is shown in FIG. 18B with the flexible hose 106 and the second flexible hose 119 disconnected from the respective pumps 101, 120. Upon disconnection from respective pumps 101, 120, the disconnection devices 1930, 1931 can remain coupled to and supported on the flexible hoses 106, 119 (as shown in FIG. 18B) or can remain coupled to and supported on the flanges 111 of the respective pumps 101, 120. The disconnection devices 1930, 1931 and/or second end fittings 109 can be supported on support structures 1935 (such as saddles or frames of the trailer of the pump manifold 1905) or can be suspended from a crane or an articulation arm device. Using the fluid injection system 1900, the respective disconnection device 1930, 1931 can be disconnected from the respective pump 101, 120 and the respective flexible hose 106, 120 can be supported using the pump manifold 1905 while the respective pump 101, 120 is removed and a new pump is inserted into the fluid injection system 1900. Using the rotatable joints 1940, 1948, the first ends 107 can be disconnected from the pumps 101, 120 and moved (thereby pivoting the rotatable joints 1940, 1948) to be supported on the support structures 1935. The pump manifold 1905 can be transported (e.g., on a truck) with the first ends 107 supported on the support structures 1935.

The present disclosure contemplates that the second end fittings 112 can be disconnected from the rotatable joints 1940, 1948, and the disconnection devices 1930, 1931 are connected to the pumps 101, 120 prior to connecting the second end fittings 112 to the rotatable joints 1940, 1948.

FIG. 18C is a schematic cross sectional view of the rotatable joint 1940 shown in FIG. 18A and FIG. 18B, according to one implementation. The rotatable joint 1940 includes an upper sub 1941 and a lower sub 1942. At least a portion of the rotatable joint 1940 can be integrally formed with the second end fitting 112 of the flexible hose 106. In the implementation shown in FIG. 18C, the upper sub 1941 is integrally formed with the second end fitting 112 of the flexible hose 112 such that the upper sub 1941 is a part of the second end 108. In the implementation shown in FIG. 18C, the upper sub 1941 and the second end fitting 112 form a single integral body. The lower sub 1942 is coupled to one of the angled joints 114, such as through a clamp assembly 117. The rotatable joint 1940 includes a packing seal and a plurality of bearings 1943, such as ball bearings and/or planar bearings. The upper sub 1941 is rotatable relative to the lower sub 1942. The upper sub 1941 is received within the lower sub 1942. The present disclosure contemplates that the lower sub 1942 may be received in the upper sub 1941. The present disclosure contemplates that the upper sub 1941 may be a separate body that is separated from and coupled to a body of the second end fitting 112. In such an implementation, the upper sub 1941 may be coupled to the second end fitting 112 using, for example, a clamp assembly 117.

Figure 19:
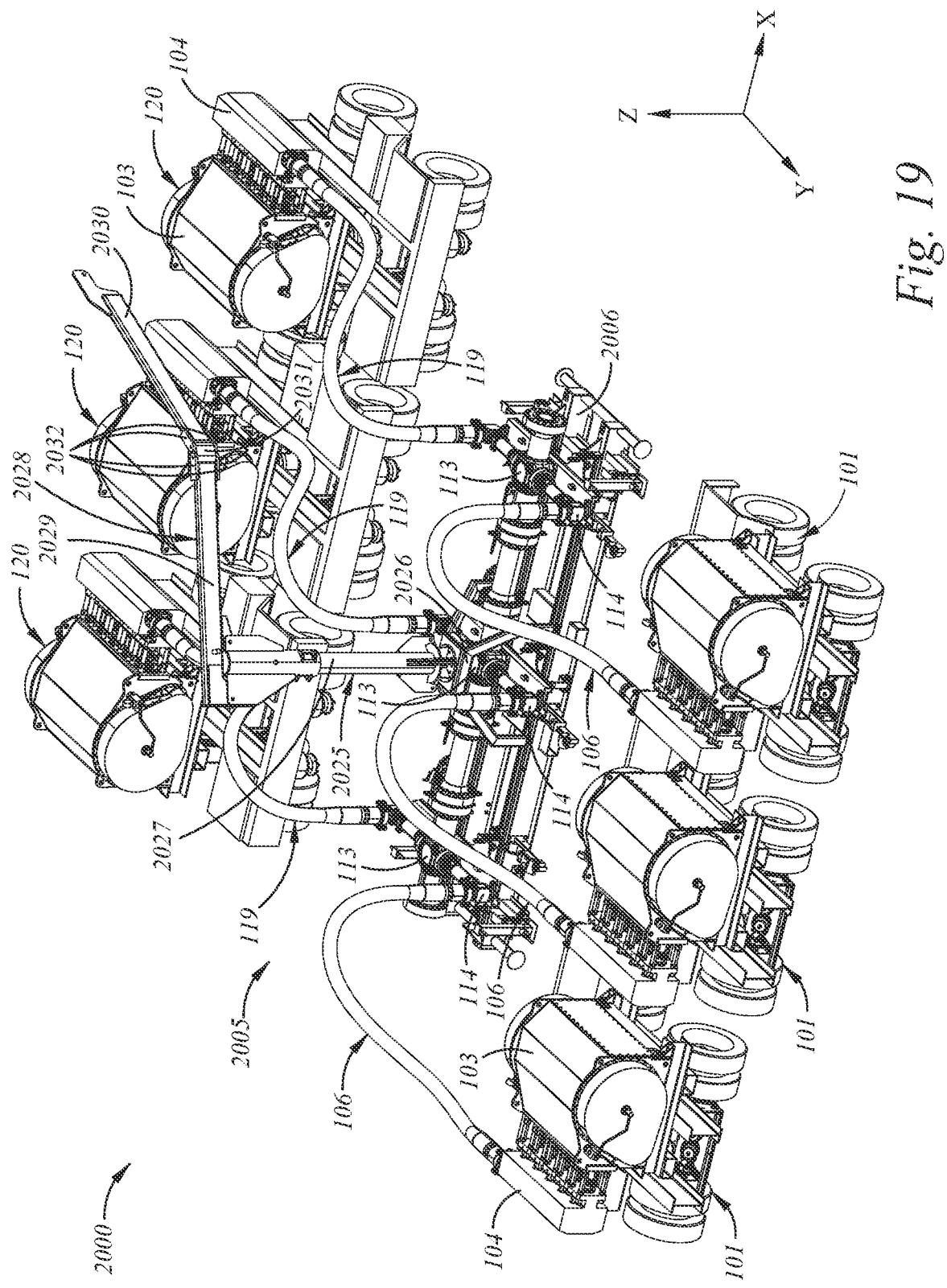
FIG. 19 is a schematic partial view of a fluid injection system deployed at a wellhead site, according to one implementation.

FIG. 19 is a schematic partial view of a fluid injection system 2000 deployed at a wellhead site, according to one implementation. The fluid injection system 2000 is similar to the fluid injection system 1900 shown in Figures FIG. 18A and FIG. 18B, and includes one or more of the features, components, aspects, and/or properties thereof. The fluid injection system 2000 includes a pump manifold 2005 that is similar to the pump manifold 105 shown in FIGS. 1A-1C, and includes one or more of the features, components, aspects, and/or properties thereof.

The fluid injection system 2000 includes a lift system 2025 mounted to a skid 2006 or trailer of the pump manifold 2005. The lift system 2025 is mounted above the manifold blocks 113. The lift system 2025 includes a base 2026 coupled to a frame of the skid 2006 or trailer, and a column 2027 coupled to the base 2026. An articulation arm device 2028 is pivotably coupled to the column 2027. The articulation arm device 2028 includes a first arm 2029 pivotably (e.g., hingedly) coupled to the column 2027 and a second arm 2030 coupled to the first arm 2029 through a pivot joint 2031 (e.g., a hinge plate) and a plurality of links 2032. Although not shown in FIG. 19, a connection device, such as connection device 328 (illustrated in FIG. 13D) or connection device 228 (illustrated in FIG. 2D) can be coupled to the second arm 230 to grab, lift, and move either end of the flexible hoses 106, 119 for connection and disconnection to and from the fluid ends 104, the manifold blocks 113, and/or the angled joints 114.

The lift system 2025 is shown in an extended position in FIG. 19. The lift system is retractable (e.g., collapsible) to a retracted position that reduces an overall vertical size of the lift system 2025 and an overall horizontal size of the lift system 2025. The lift system 2025 can be retracted, for example, using the pivot joint 2031 and the one or more pivotable coupling(s) between the first arm 2029 and the column 2027. The column 2027 is also pivotable downwardly using, for example, one or more pivot joints (e.g., hinges) between the column 2027 and the base 2026. The pump manifold 2005 comprising the lift system 2025 is transportable in the retracted position and having a smaller size.

In one implementation, a jib crane may be used in the lift system 2025 in place of the articulation arm device 2028. The jib crane includes a rail (e.g., an outriggging beam) pivotably coupled to the column, a trolley movable along the rail, and a hoist line coupled to the trolley. A connection device, such as connection device 328 (illustrated in FIG. 13D) or connection device 228 (illustrated in FIG. 2D) can be coupled to the hoist line (such as through a crane hook coupled to the hoist line) to grab, lift, and move either end of the flexible hoses 106, 119 for connection and disconnection to and from the fluid ends 104, the manifold blocks 113, and/or the angled joints 114.

The column 2027 can be rotatable relative to the base 2026, or the column 2027 can be rotatably fixed relative to the base 2026. The column 2027 can be rotatably fixed relative to the base 2026 and pivotably coupled to the base 2026 such that the column 2027 does not rotate relative to the base 2026 in the X-Y plane and the column 2027 can pivot relative to the base 2026 in the X-Z plane or the Y-Z plane between the extended position and the retracted position. In one embodiment, which can be combined with other embodiments, the column 2027 is rotatably fixed relative to the base 2026, and the articulation arm device 2028 (or the rail of the jib crane) is rotatable relative to the column 2027.

Figure 20:
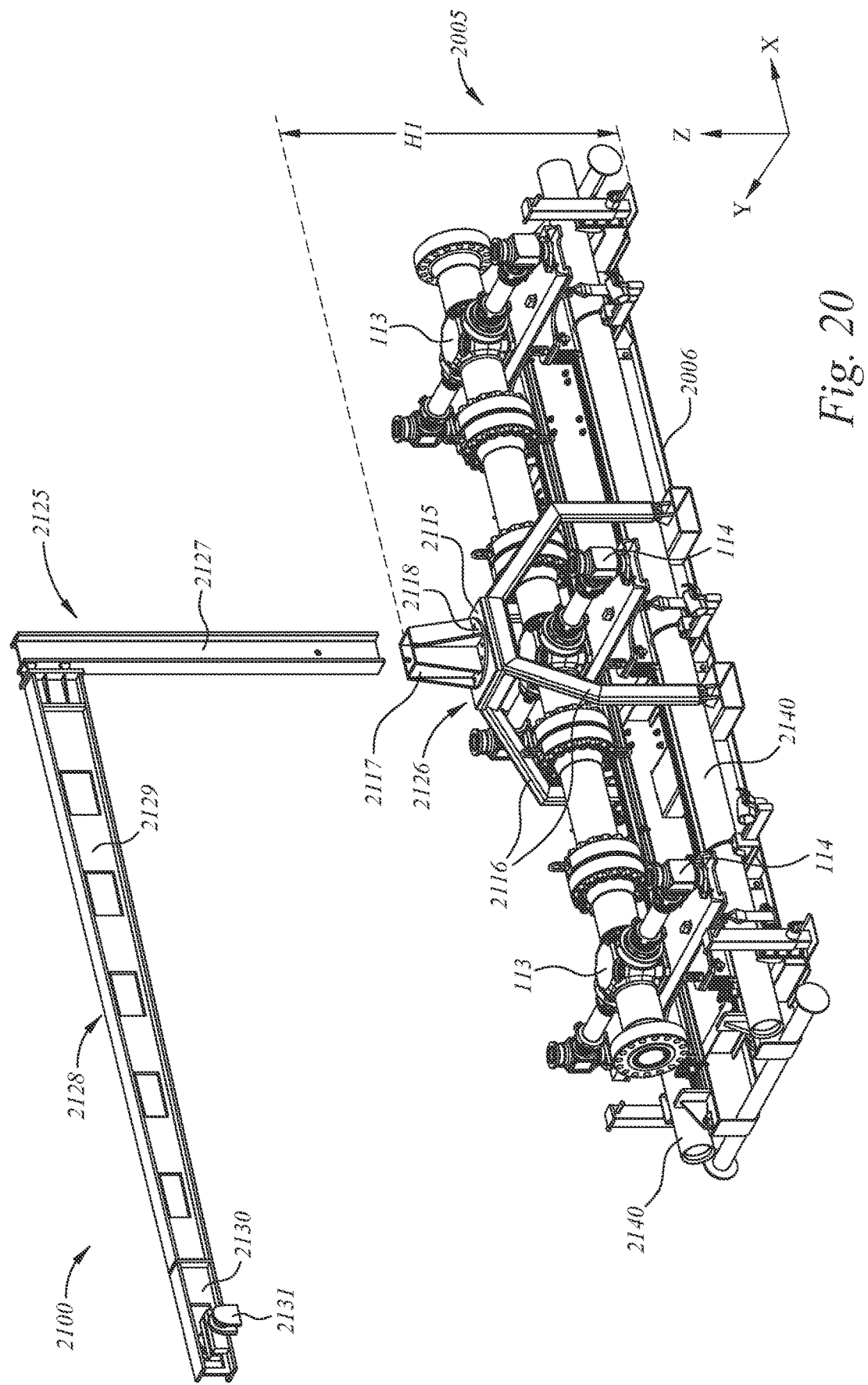
FIG. 20 is a schematic partial view of a fluid injection system deployed at a wellhead site, according to one implementation.

FIG. 20 is a schematic partial view of a fluid injection system 2100 deployed at a wellhead site, according to one implementation. The fluid injection system 2100 is similar to the fluid injection system 2000 shown in FIG. 19, and includes one or more of the features, components, aspects, and/or properties thereof. The fluid injection system 2100 includes a lift system 2125 mounted to the skid 2006 or trailer.

The lift system 2125 includes a base 2126 coupled to the frame of the skid 2006 or trailer. The base 2126 includes a base plate 2115 and a plurality of legs 2116 that couple the base plate 2115 to the frame of the skid 2006 of trailer. The plurality of legs 2116 are coupled to the frame at locations that are inwardly or outwardly of flow tubes 2140. In the implementation shown in FIG. 20, the plurality of legs 2116 are coupled to the frame at locations that are outwardly of the flow tubes 2140. The lift system 2125 includes a base receptacle 2117 coupled to a mount plate 2118. The mount plate 2118 is rotatably coupled to the base plate 2115, and the mount plate 2118 is rotatable relative to the base plate 2115. The lift system 2125 includes a column 2127 that is received in the base receptacle 2117. The column 2127 can be coupled to the base receptacle 2117 and/or the mount plate 2118. The base receptacle 2117 is a female receptacle, and a bottom section of the column 2127 is a male insert that is received in the female receptacle. The lift system 2125 includes a rail 2128 coupled to the column 2127, and a trolley 2131 movable along the rail 2128. The column 2127 includes a beam, and the rail 2128 includes two beams 2129, 2130 that are coupled together. Using the mount plate 2118, the column 2127, the beams 2129, 2130, and the trolley 2131 are rotatable relative to the base plate 2115. Each of the beams 2129, 2130 includes one or more openings formed therein. The base receptacle 2117 has an upper end that is mounted at a height H1 relative to a lower end of the pump manifold 2005. The height H1 is equal to or lower than a transportation height specified by a standard, such as a Department of Transportation Standard.

During transportation, the column 2127 is removed from the base receptacle 2117, and the column 2127, the beams 2129, 2130, and the trolley 2131 can be transported on a second skid or second trailer used in addition to the skid 2006 or trailer.

FIG. 20 shows the lift system 2125 in a partially exploded view, prior to inserting the column 2127 into the base receptacle 2117. The column 2127 is received in the base receptacle 2117 by lowering the column 2127 (e.g., parallel to the Z-axis) to insert the column into the base receptacle 2117. Although not shown in FIG. 20, a connection device, such as connection device 328 (illustrated in FIG. 13D) or connection device 228 (illustrated in FIG. 2D) can be coupled to the trolley 2131 to grab, lift, and move either end of the flexible hoses 106, 119 for connection and disconnection to and from the fluid ends 104, the manifold blocks 113, and/or the angled joints 114.

The present disclosure contemplates that the articulation arm devices 225, 325, 1325, 1425, 1825, 2028 described herein can be remotely operable using a remote system to lift, lower, extend and/or retract the respective articulation arm device 225, 325, 1325, 1425, 1825, 2028. The respective articulation arm device 225, 325, 1325, 1425, 1825, 2028 is remotely operated from a remote structure 1370, such as a data van, that is in communication with a controller 1351 that actuates the components of the respective articulation arm device 225, 325, 1325, 1425, 1825, 2028. A camera 1380 provides a live image feed of the respective articulation arm device 225, 325, 1325, 1425, 1825, 2028 and the flexible hose 106 to an operator in the remote structure 1370. In one example, the camera 1380 is mounted to the trolley 504 of the overhead crane 501 (as shown for the camera 480 in FIG. 5). The present disclosure contemplates that the camera 480, 1380 can be mounted to other components of the overhead crane 501, such as the bridge 503, for example the trolley support rail 509 of the bridge 503. In one example, the camera 1380 is mounted to a drone 1390. In one embodiment, which can be combined with other embodiments, the respective articulation arm device 225, 325, 1325, 1425, 1825, 2028 includes robotics systems for remote operation and/or automated operation of the respective articulation arm device 225, 325, 1325, 1425, 1825, 2028. In one embodiment, which can be combined with other embodiments, one or more of the remote structure 1370, the camera 1380, the drone 1390, the remote system, and/or the controller 1351 used to control the respective articulation arm device 225, 325, 1325, 1425, 1825, 2028 are the same as the remote structure 470, the camera 480, the drone 490, the remote system, and/or the controller 450 used to control the disconnection device 440.

Benefits of the present disclosure include at least quickly connecting flexible hoses to pump manifolds, ease of conducting maintenance, quickly conducting maintenance, ease of replacing assets, and quickly replacing assets, fracing continuously and on a 24/7 basis, increased operational efficiency, ease of installation, remote operation, reduction of iron assets required, and optimized flexible hose lengths and performance.

The flexible hoses used on high pressure equipment sides of frac pads can replace iron piping and reduce operating costs. Aspects of the present disclosure facilitate using flexible hoses between pumps and manifolds on a fleet production scale. Aspects of the present disclosure also facilitate preventing crushing of flexible hoses, and facilitate reducing bending moments of hoses. Additionally, aspects of the disclosure facilitate manipulating and moving flexible hoses when a crane cannot be used, such as when space constraints prevent use of a crane. Aspects also facilitate quickly making connections of flexible hoses and pumps to pump manifolds to quickly begin frac operations. Moreover, certain aspects of the present disclosure facilitate increased pumping time per day and the ability to frac all day and night without having to shut down the wellsite to remove a pump from service for maintenance or a failure while maintaining fracing on the well.

Aspects of the present disclosure include at least a hot stab remote connection/disconnection system that allows an operator to remove a connected iron/flex hose line from the pump to the manifold while the mainline is still under pressure. Aspects of the present disclosure also include a connection/disconnection device that includes a set screw, a mechanical latch, or some other quick connection device. The connection/disconnection device may be coupled to the second end of the hose. A vertical (non-horizontal) second end of a flexible hose is coupled to the manifold. Such aspects facilitating decreasing the bending load on the flexible hose end connections and also allows the flexible hose to be installed with a recommended single large radius bend which can work best in high pressure operation. In addition, the straight portions of the flexible hoses have negligible effect on how close a pump trailer can be to the manifold since the closeness is driven by the minimum bend radius of the flexible hose. If the flexible hose is too long for the application, the vertical orientation allows the additional length of flexible hose to just push farther up in the air and not cause any major additional crushing loads from a compound bend on the flexible hose body. Also, the effective remaining weight of the flexible hose to be overcome for installation on the manifold is much less influenced by the flexible hose taking some of the weight of the assembly and allowing for an easier installation for a typical frac hand operator.

It is contemplated that one or more of the aspects disclosed herein may be combined. Moreover, it is contemplated that one or more of these aspects may include some or all of the aforementioned benefits. As an example, it is contemplated that one or more aspects of the fluid injection system 100, the fluid injection system 200, the fluid injection system 300, fluid injection system 400, fluid injection system 500, the fluid injection system 600, the manifold device 700, the fluid injection system 810, the fluid injection system 910, the manifold device 1000, the fluid injection system 1010, the manifold device 1100, the fluid injection system 1210, the fluid injection system 1300, the fluid injection system 1500, the fluid injection system 1600, the fluid injection system 1700, the fluid injection system 1800, the fluid injection system 1900, and/or the fluid injection system 2000 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The present disclosure also contemplates that one or more aspects of the embodiments described herein may be substituted in for one or more of the other aspects described. The scope of the disclosure is determined by the claims that follow.

The invention claimed is:

1. A pump manifold system, comprising:
   a plurality of connection blocks;
   a plurality of conduits between the plurality of connection blocks; and
   a crane system comprising:
      a base;
      a column coupled to the base;
      a rail coupled to the column that extends relative to a first side of the least one of the conduits or connection blocks;
      a trolley movable along the rail; and
      a crane coupled to the base, wherein the crane extends relative to the first side of at least one of the conduits or connection blocks.

2. The pump manifold system of claim 1, wherein the column is rotatably fixed to the base such that the column does not rotate relative to the base.

3. The pump manifold system of claim 2, wherein the column is pivotably coupled to the base such that the column can pivot relative to the base.

4. The pump manifold system of claim 1, wherein the column is rotatable relative to the base such that the column rotates relative to the base.

5. The pump manifold system of claim 4, wherein the column is coupled to a base receptacle that is coupled to a mount plate, and wherein the mount plate is rotatably coupled to a base plate of the base.

6. The pump manifold system of claim 5, wherein the column is configured to be removably coupled to and from the base receptacle.

7. The pump manifold system of claim 6, wherein the base receptacle is a female receptacle, and wherein a bottom end of the column is a male insert that is received in the female receptacle.

8. The pump manifold system of claim 1, wherein the crane system further comprises a mount frame extending above the at least one of the conduits or connection blocks, and wherein a base plate of the base is coupled to the mount frame.

9. The pump manifold system of claim 8, wherein the mount frame is coupled to the at least one of the conduits or connection blocks and comprises a plurality of legs configured to support the base.

10. The pump manifold system of claim 8, wherein the mount frame comprises a plurality of legs configured to support the base.

11. The pump manifold system of claim 1, wherein the base is coupled to the at least one of the conduits or connection blocks.

12. The pump manifold system of claim 1, wherein the base is positioned above the at least one of the conduits or connection blocks.

13. A pump manifold system, comprising:
   a plurality of connection blocks;
   a plurality of conduits between the plurality of connection blocks; and
   a crane comprising:
      a column;
      a rail coupled to the column; and
      a trolley movable along the rail, wherein the column is positioned above at least one of the conduits or connection blocks, and wherein the rail extends relative to a first side of the at least one of the conduits or connection blocks.

14. The pump manifold system of claim 13, wherein the column is rotatably fixed such that the column does not rotate relative to the conduits or connection blocks.

15. The pump manifold system of claim 13, wherein the column is rotatable such that the column rotates relative to the conduits or connection blocks.

16. The pump manifold system of claim 15, wherein the column is rotatably coupled to a base plate of the crane, and wherein the base plate is positioned above the at least one of the conduits or connection blocks.

17. The pump manifold system of claim 13, wherein the crane further comprises a mount frame extending above the at least one of the conduits or connection blocks, and wherein the mount frame comprises a plurality of legs configured to support the column.

18. The pump manifold system of claim 17, wherein the plurality of legs extend on opposite sides of the at least one of the conduits or connection blocks.

19. The pump manifold system of claim 18, wherein the column is rotatably coupled to the mount frame such that the column rotates relative to the mount frame.

* * * * *

UNITED STATES PATENT AND TRADEMARK OFFICE
CERTIFICATE OF CORRECTION

PATENT NO.         : 12,078,047 B2
APPLICATION NO.    : 18/416596
DATED              : September 3, 2024
INVENTOR(S)        : Steven Post, Peter Middleton and Harry Hughes Page 1 of 1

It is certified that error appears in the above-identified patent and that said Letters Patent is hereby corrected as shown below:

In the Claims

In Column 25, Claim 1, Lines 11-15, please delete the following:
"a column coupled to the base;
a rail coupled to the column that extends relative to a first side of the least one of
　　　the conduits or connection blocks;
a trolley movable along the rail;"

In Column 25, Claim 1, Line 18, after "blocks" and before the period, please insert:
--, and wherein the crane further comprises:
a column coupled to the base;
a rail coupled to the column that extends relative to the first side of the at least one
　　　of the conduits or connection blocks; and
a trolley movable along the rail--

Signed and Sealed this
Seventh Day of January, 2025

Derrick Brent
*Acting Director of the United States Patent and Trademark Office*